Nov. 13, 1945.                R. L. EWALD ET AL                 2,388,682
                           FRUIT TREATING APPARATUS
                  Original Filed Jan. 17, 1938      24 Sheets-Sheet 6
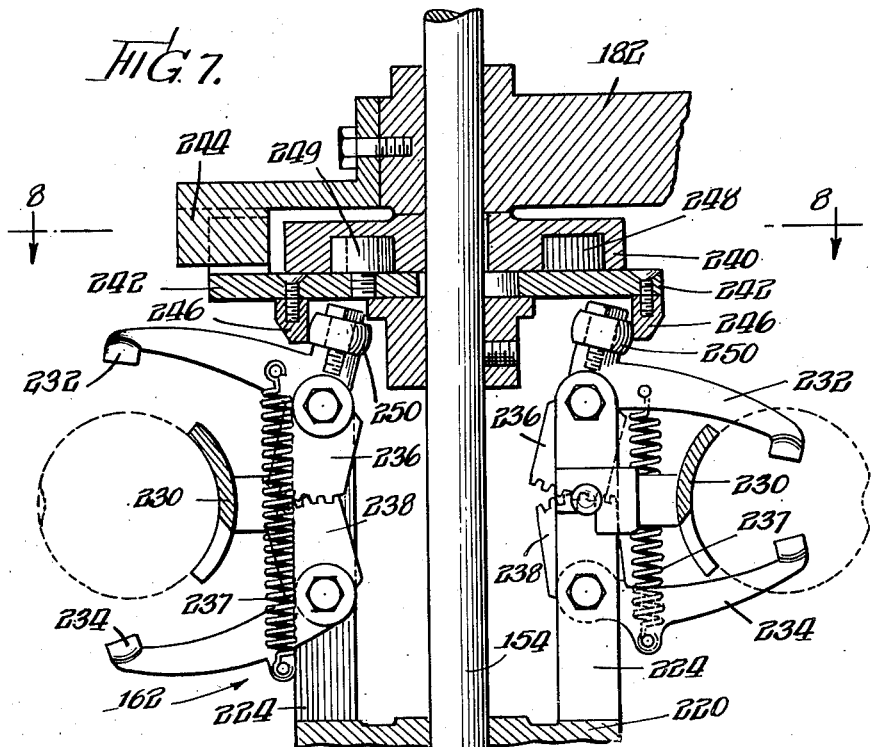
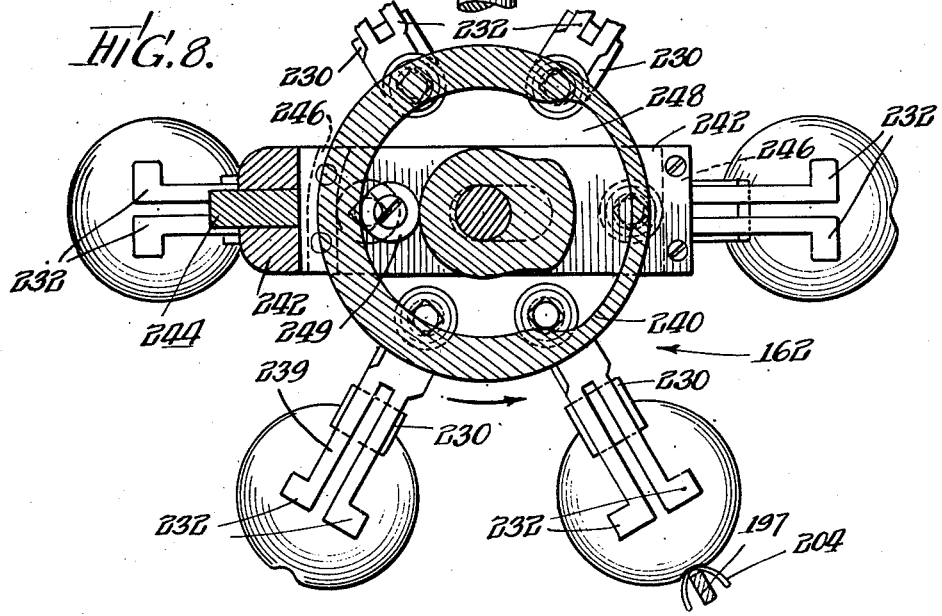
INVENTORS.
Raymond L. Ewald
BY: Henry A. Skog
Carl Moore & Olson attys.

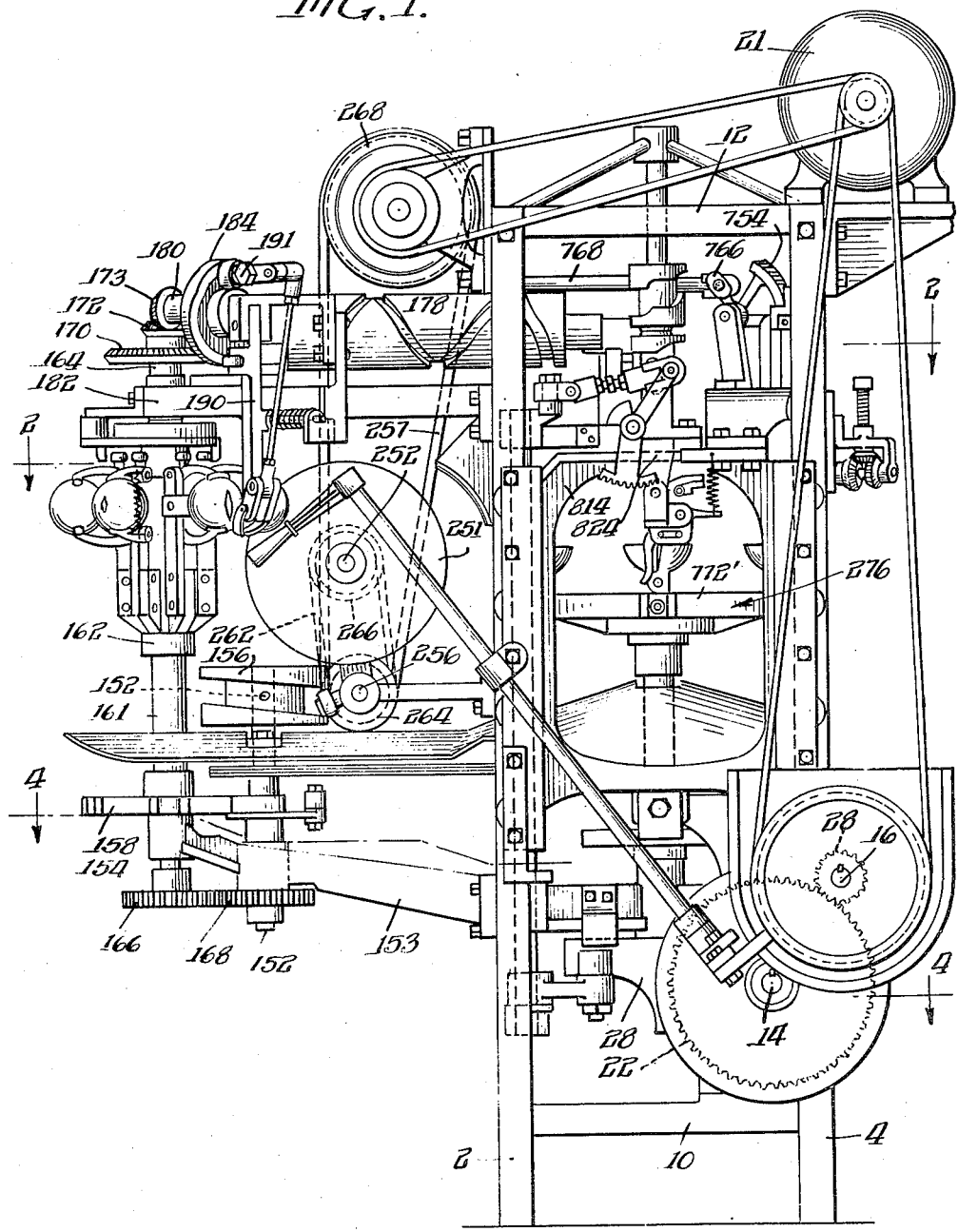

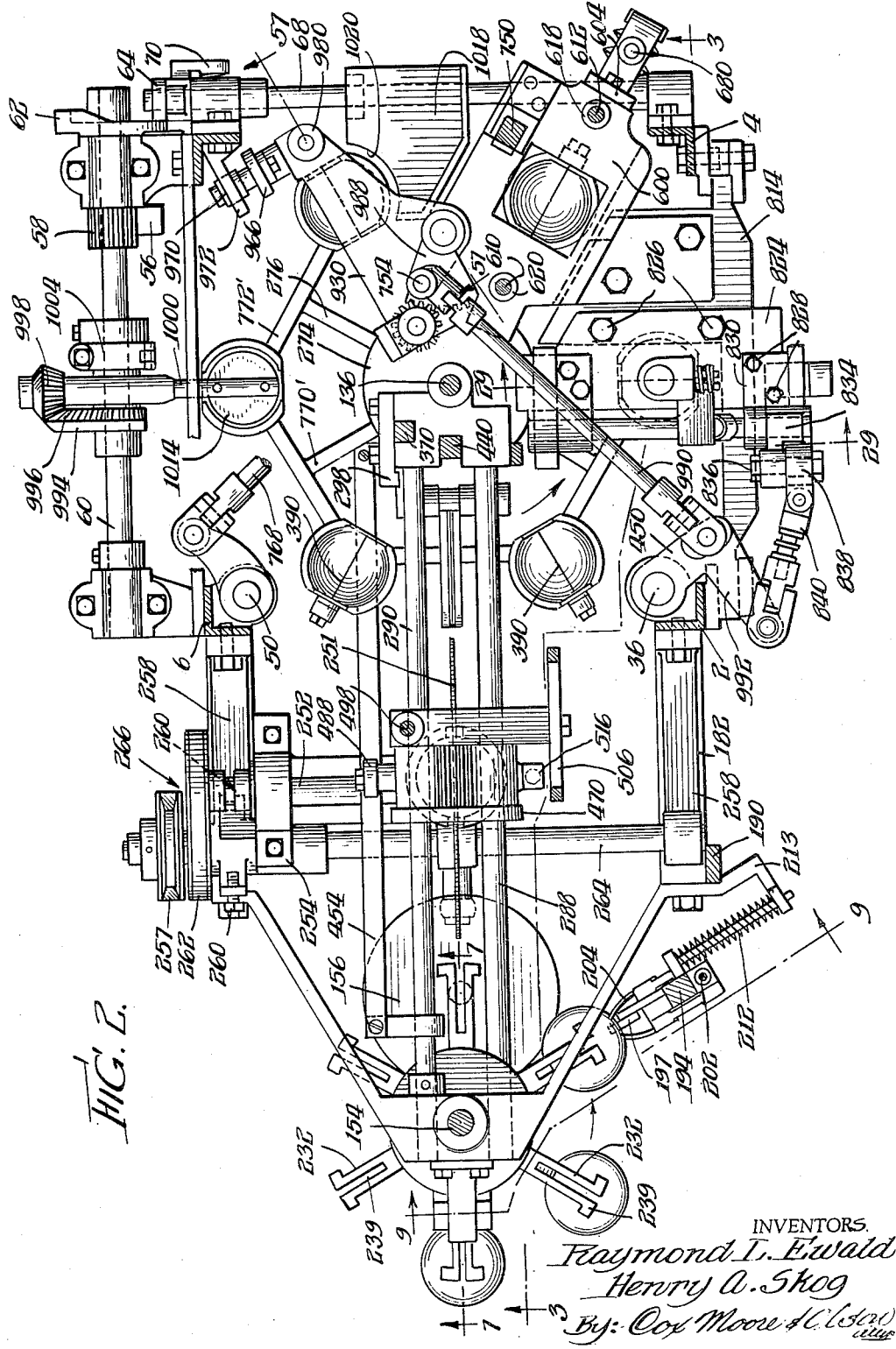

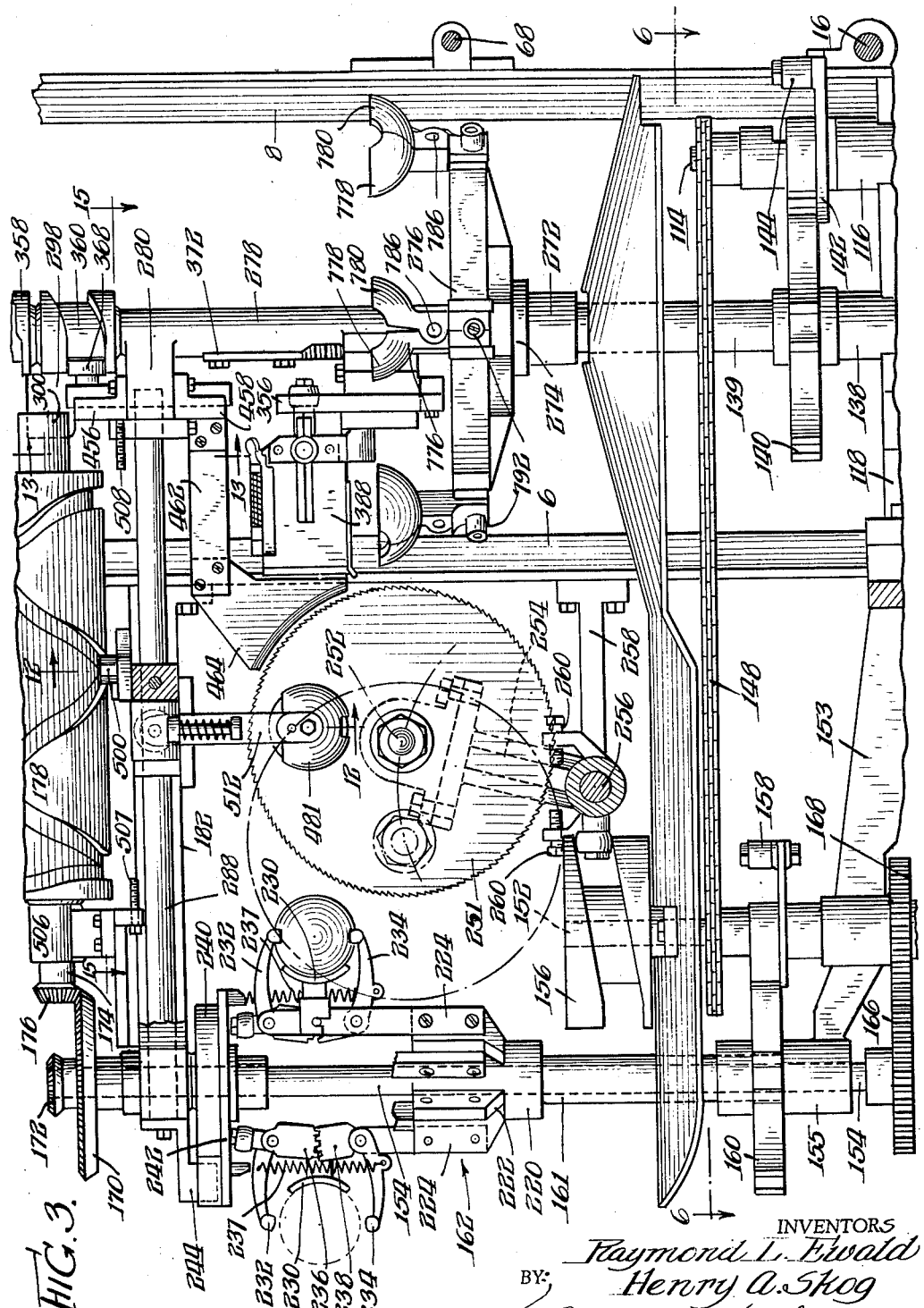

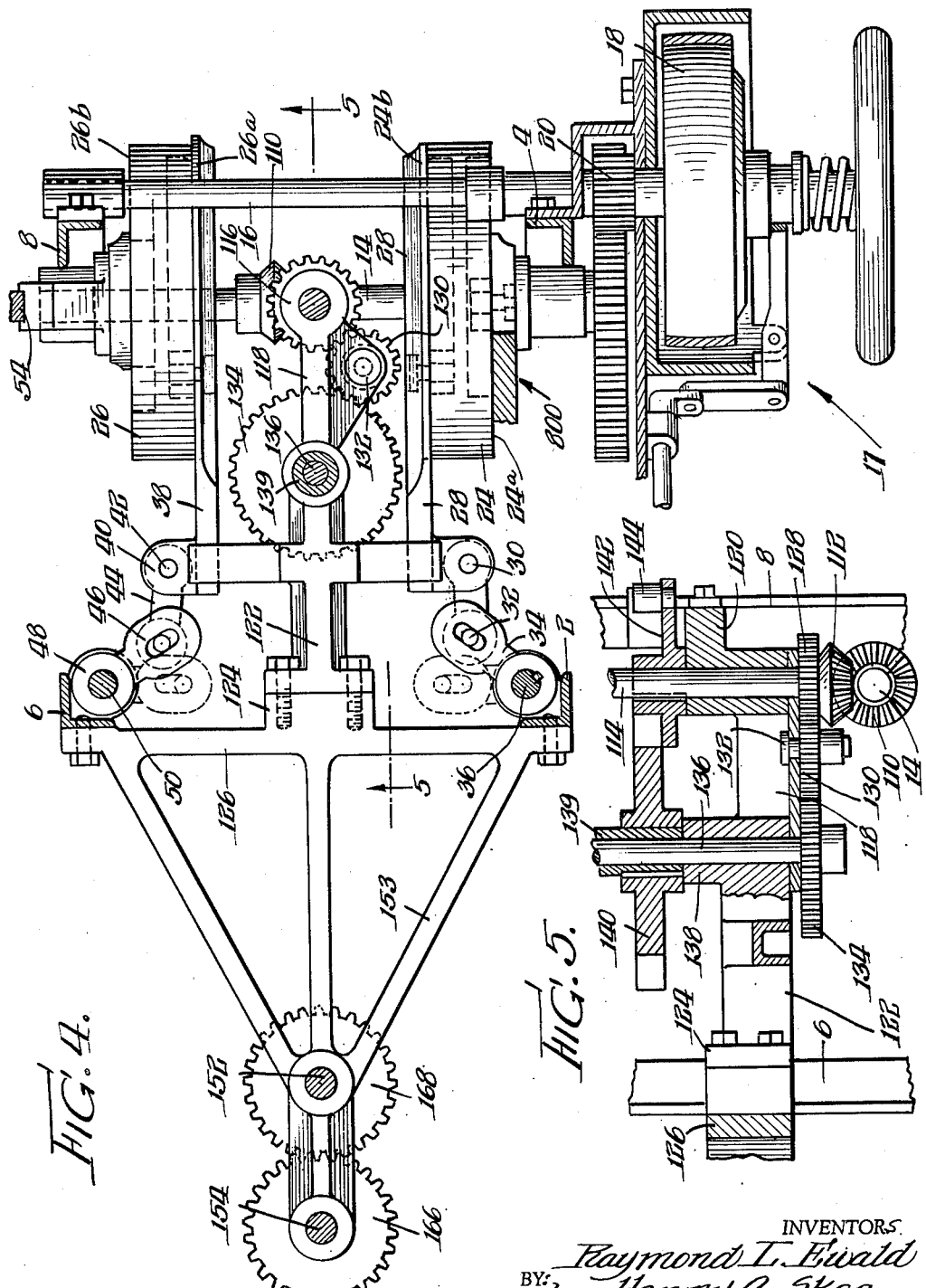

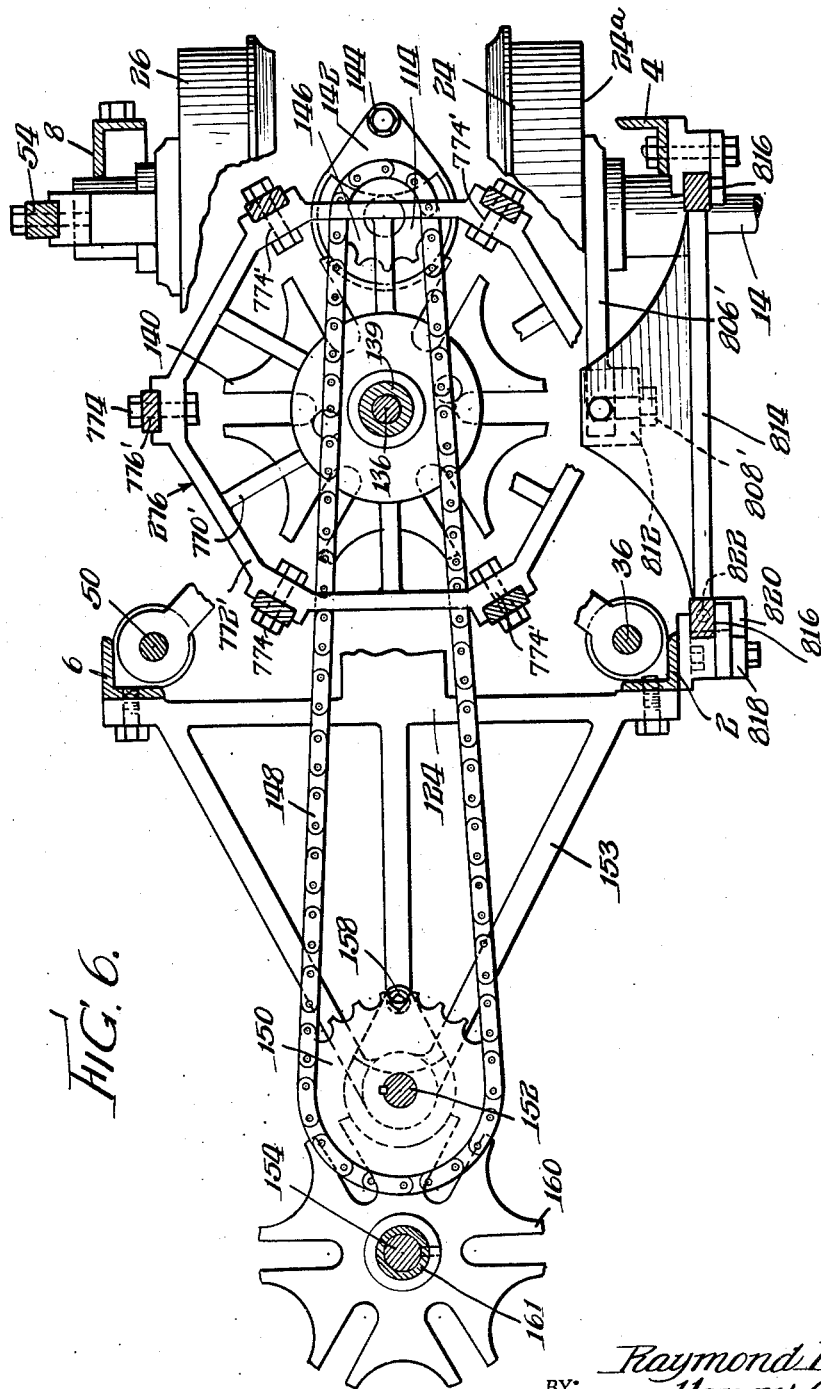

Nov. 13, 1945. R. L. EWALD ET AL 2,388,682
FRUIT TREATING APPARATUS
Original Filed Jan. 17, 1938   24 Sheets-Sheet 7
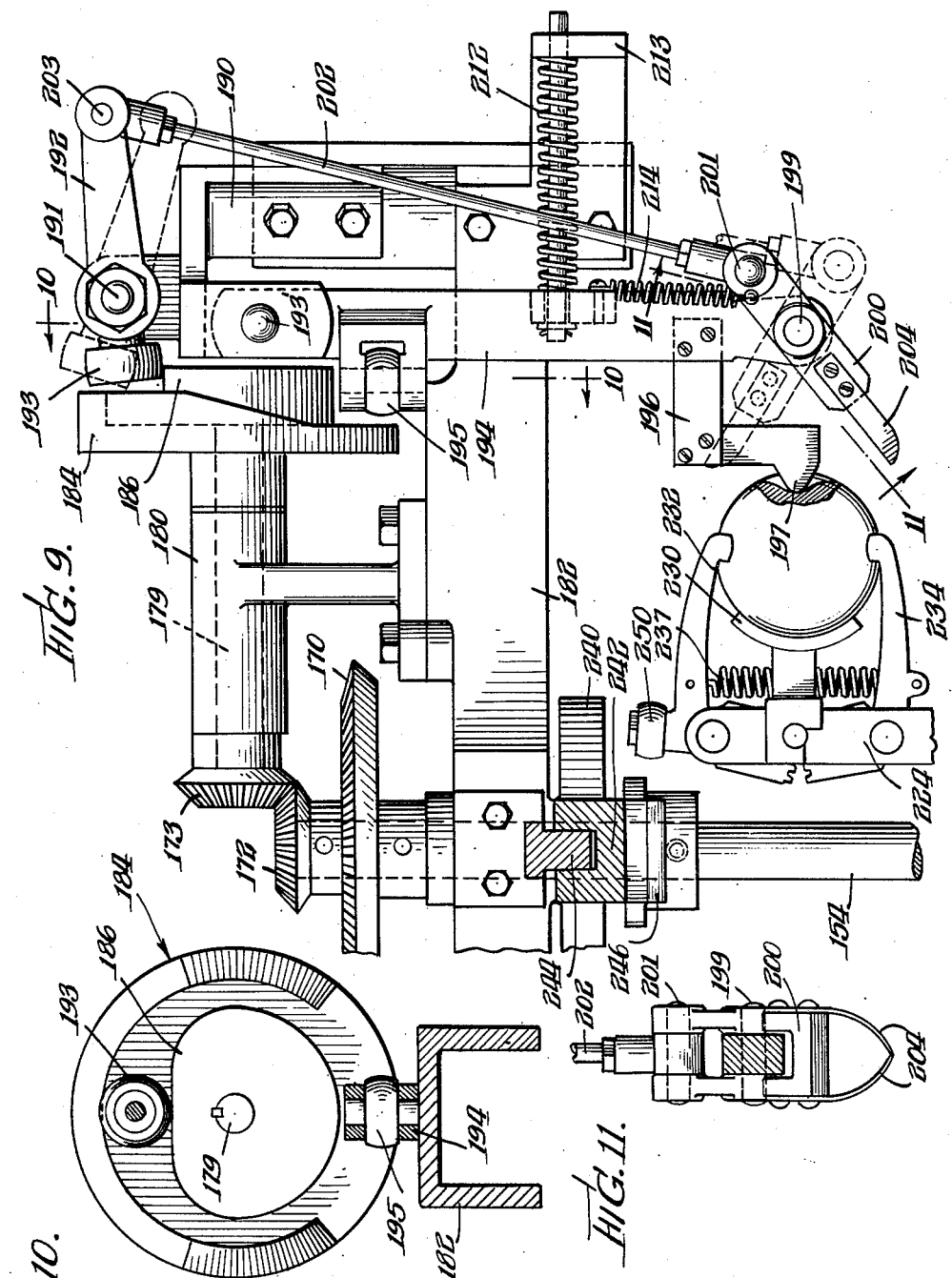
INVENTORS.
Raymond L. Ewald
Henry A. Skog
BY: Cox, Moore & Olson attys Nov. 13, 1945.    R. L. EWALD ET AL    2,388,682
FRUIT TREATING APPARATUS
Original Filed Jan. 17, 1938    24 Sheets-Sheet 8

INVENTORS
Raymond L. Ewald
Henry A. Skog
BY Cox, Moore & Olson attys.

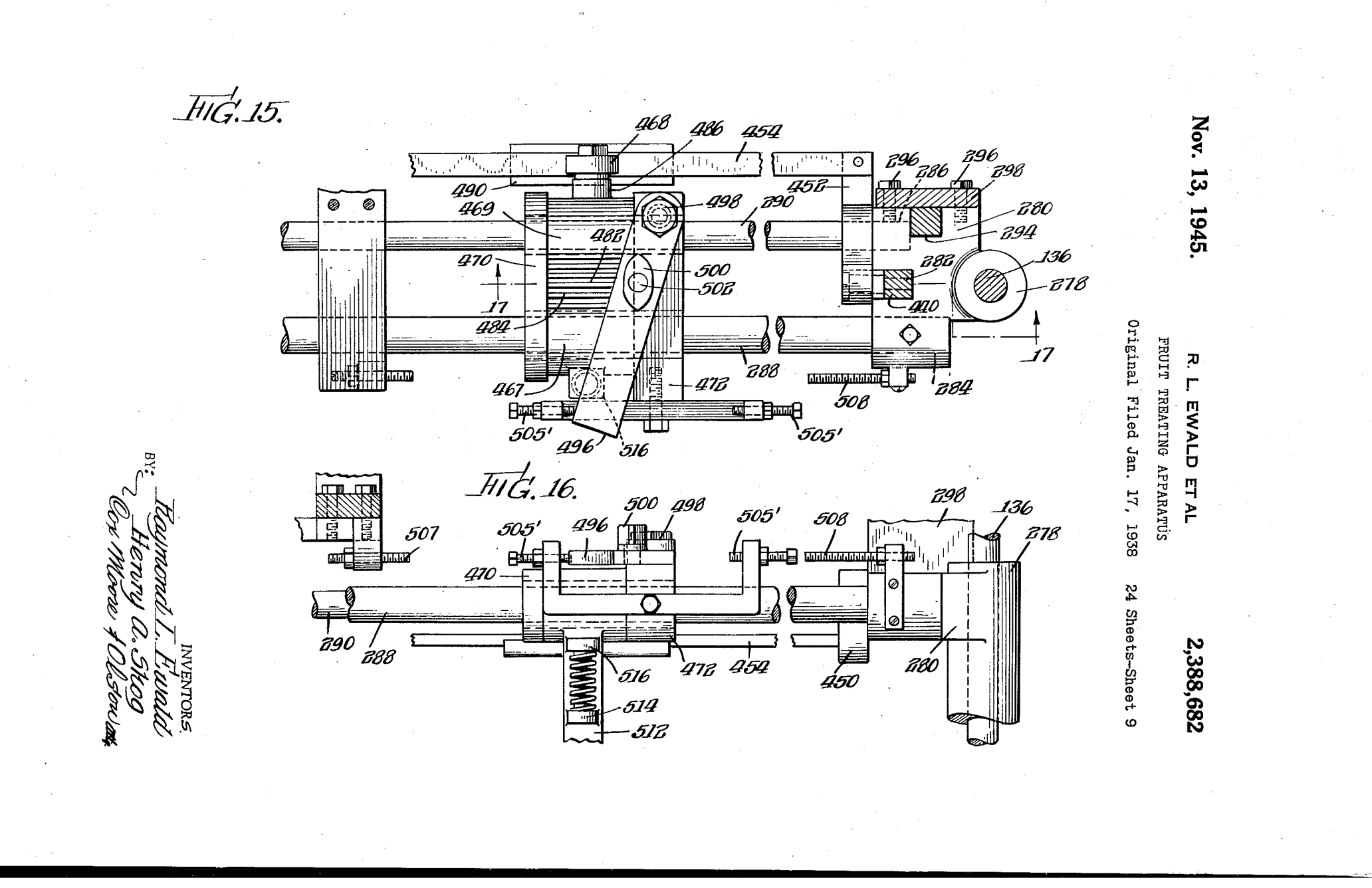

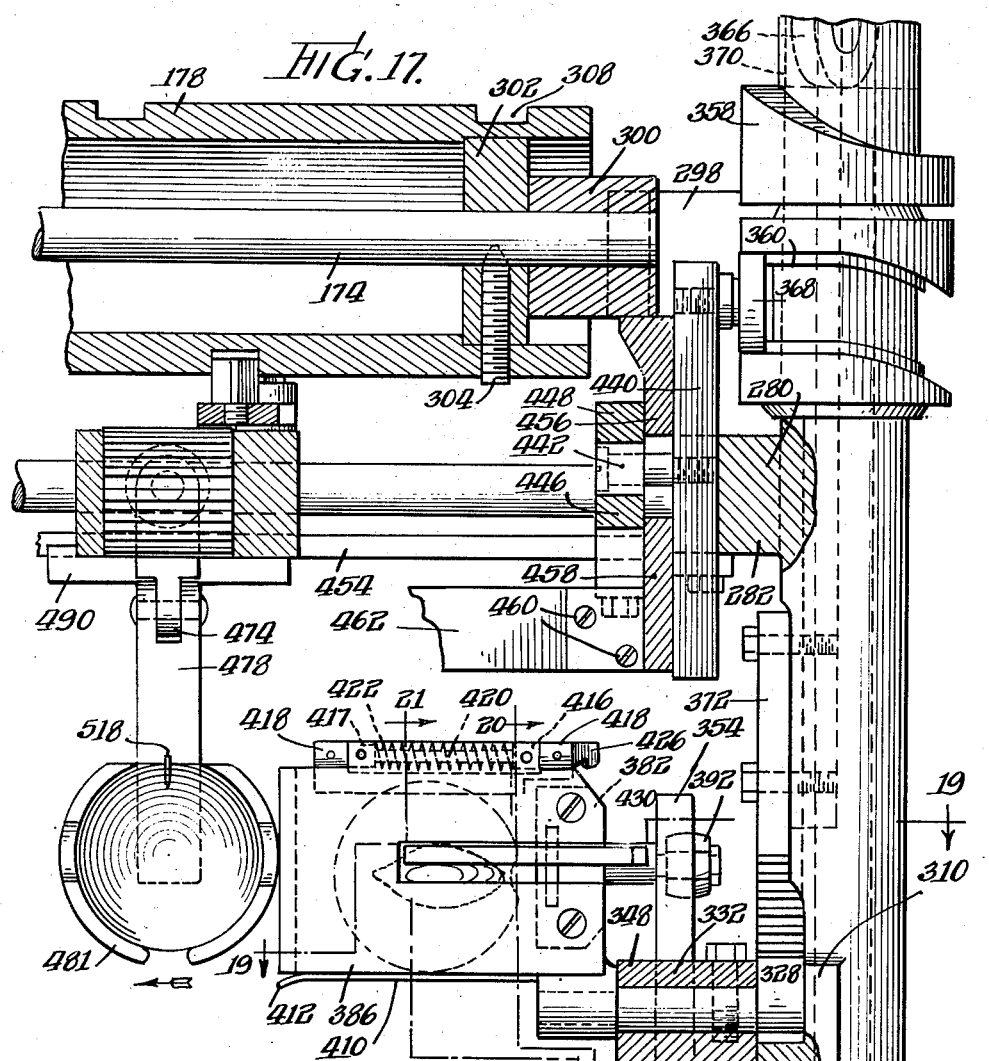

Nov. 13, 1945.    R. L. EWALD ET AL    2,388,682
FRUIT TREATING APPARATUS
Original Filed Jan. 17, 1938    24 Sheets-Sheet 11
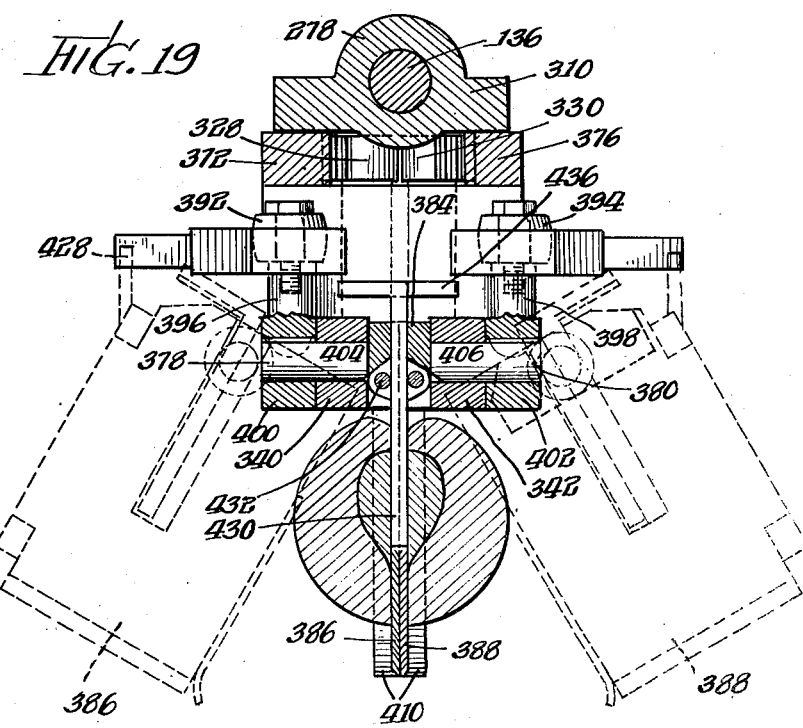
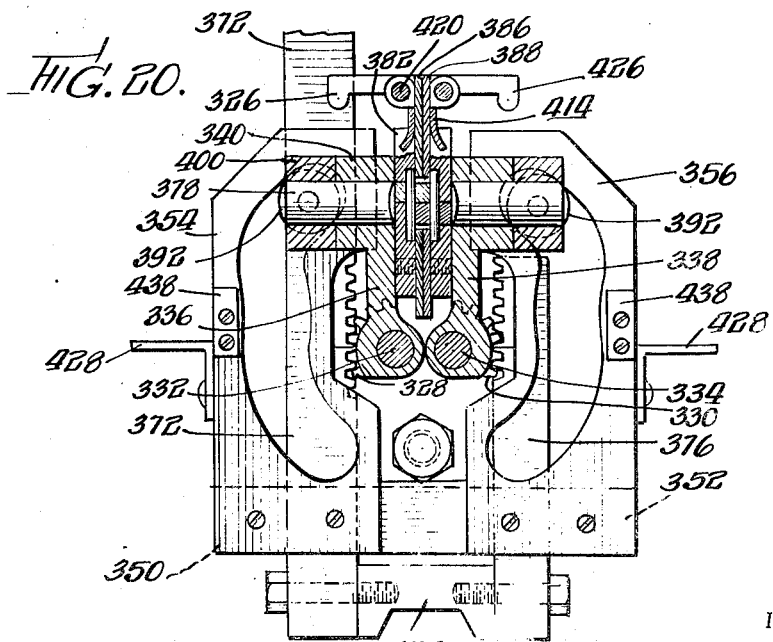

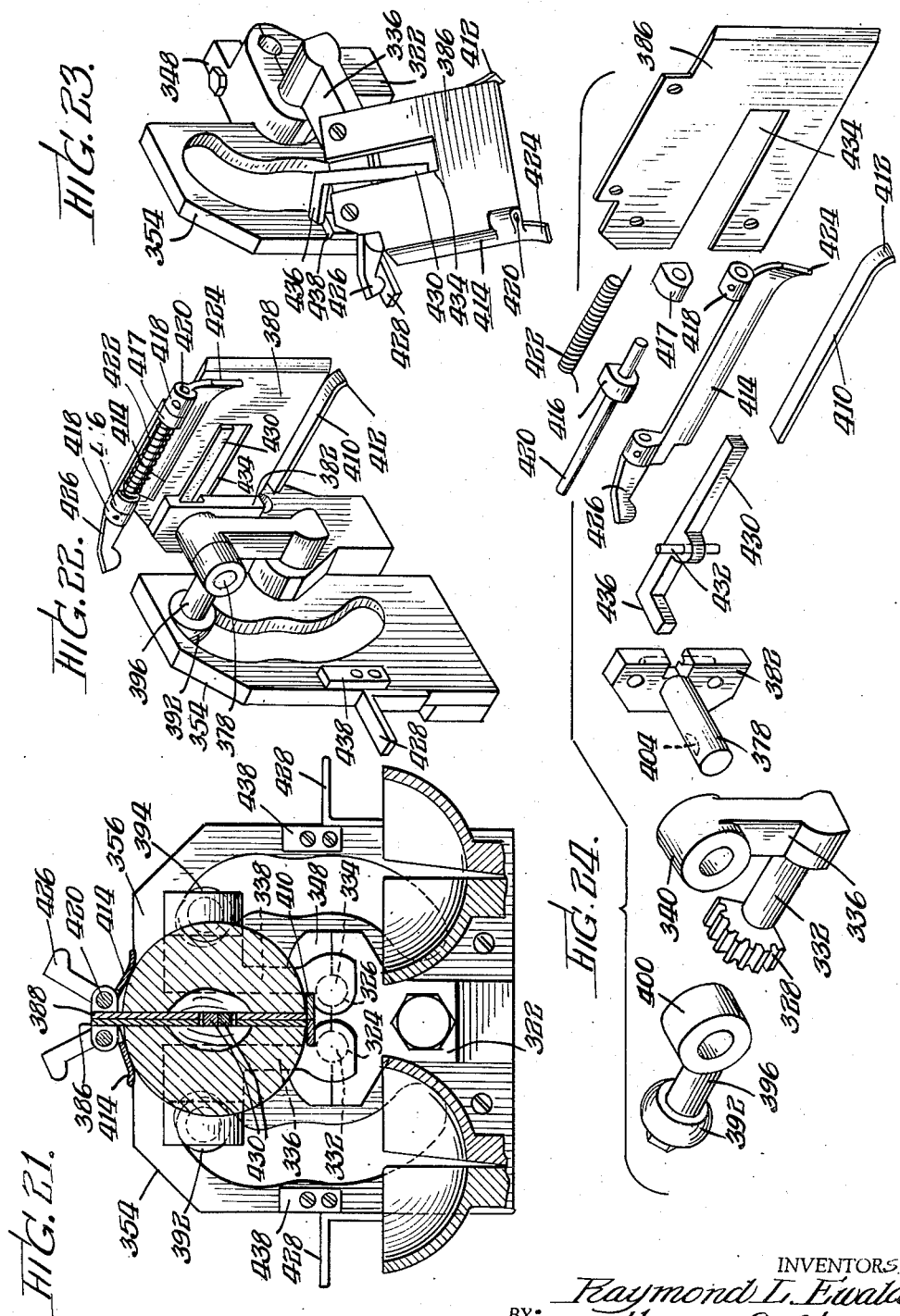

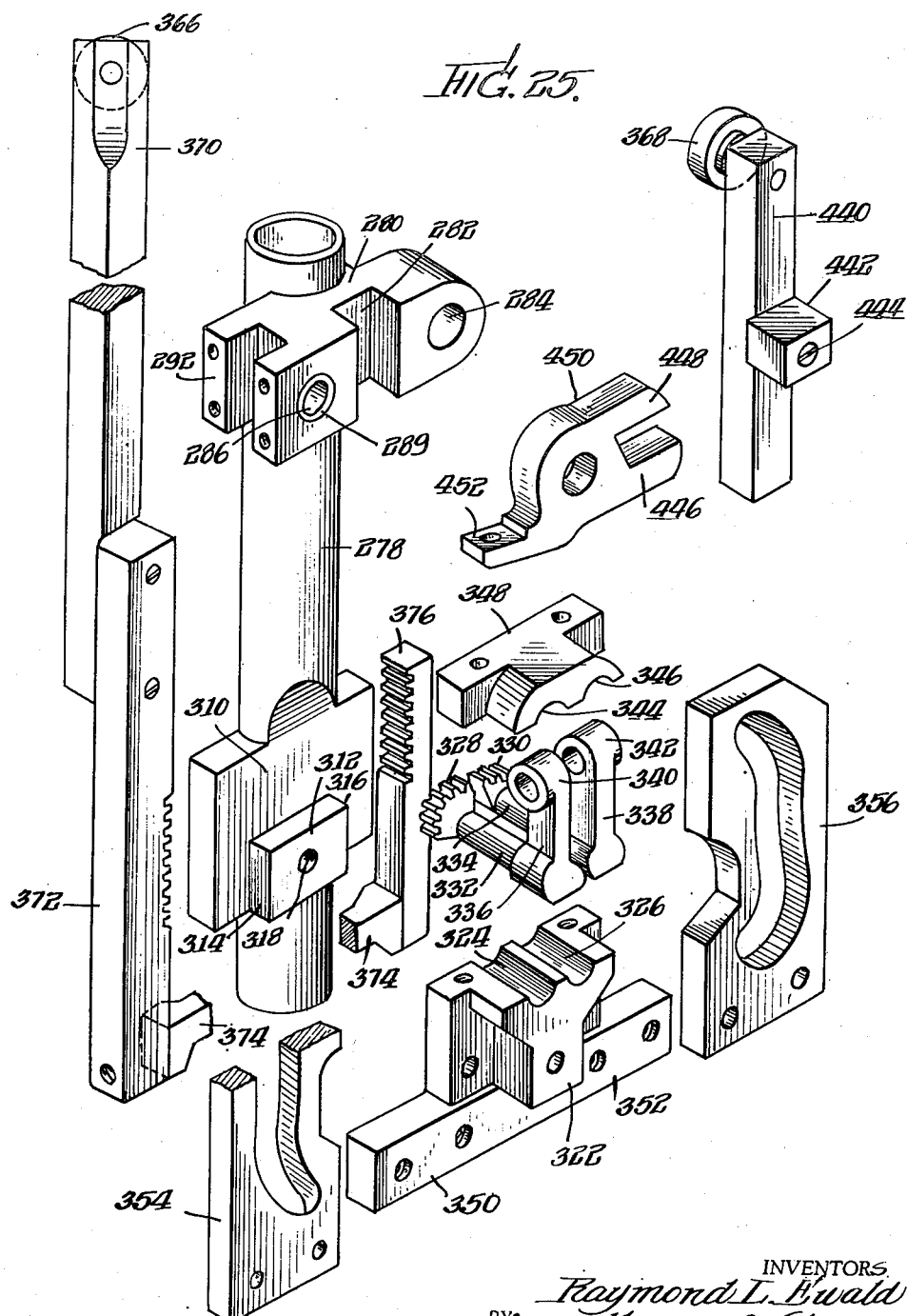

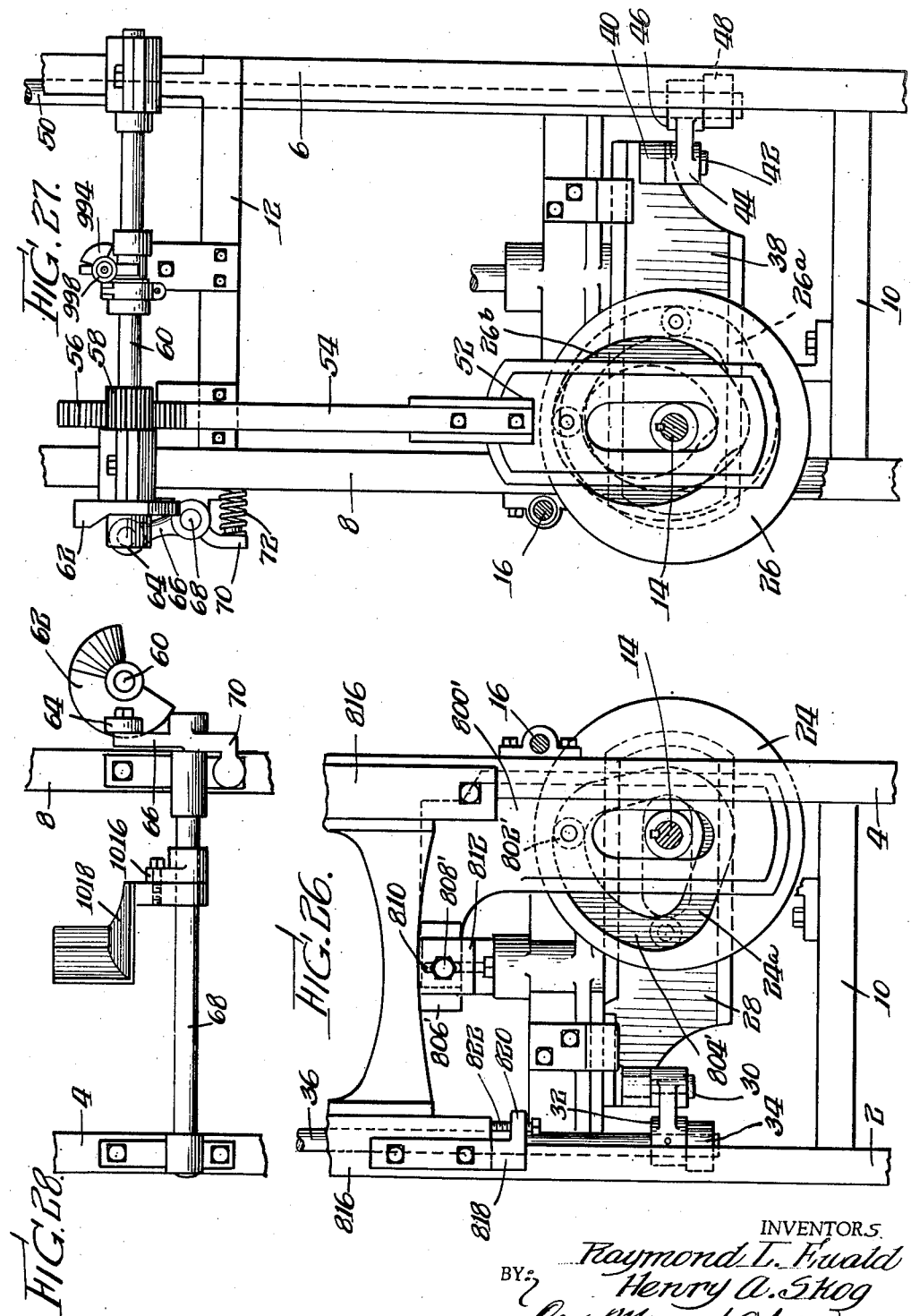

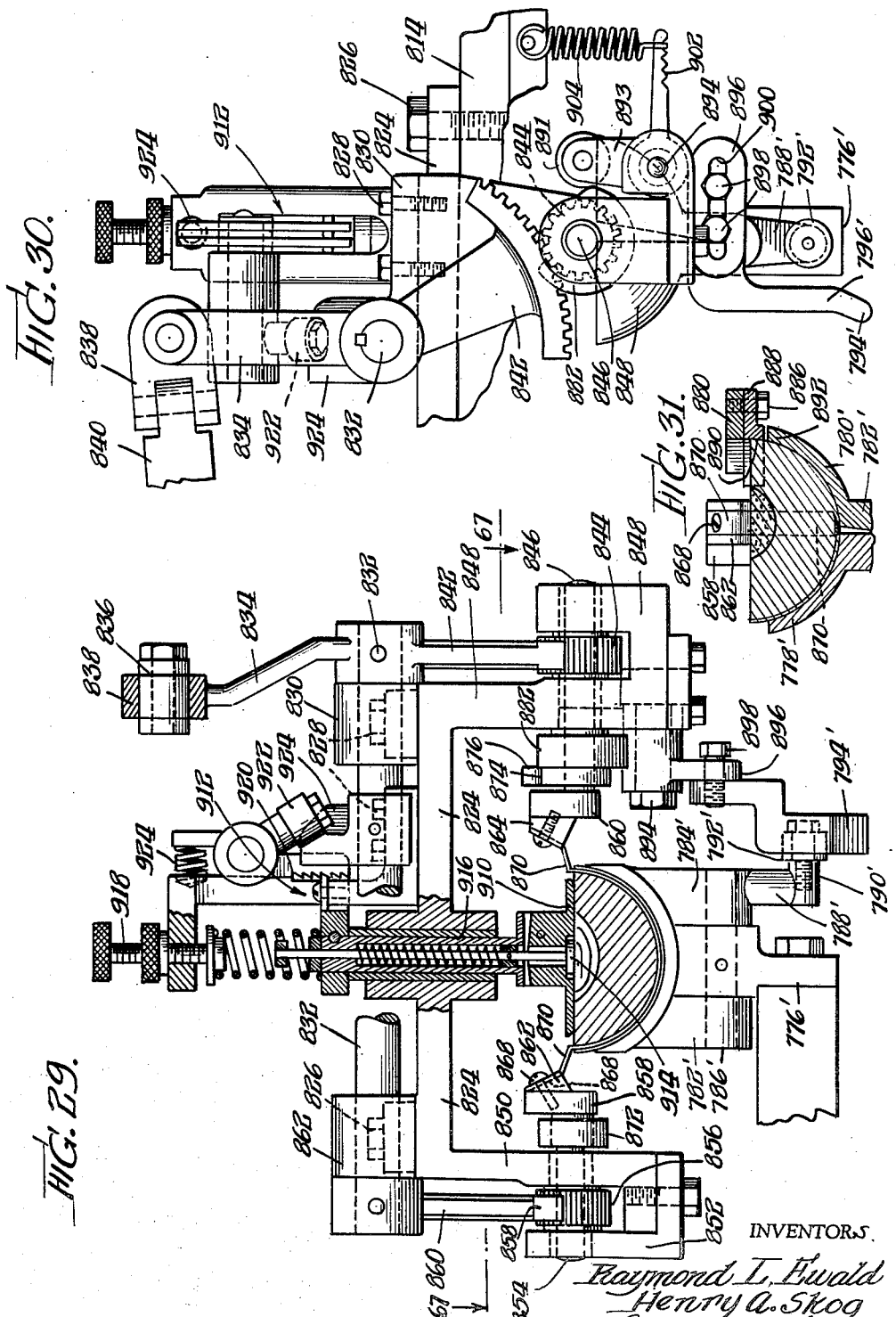

Nov. 13, 1945.  R. L. EWALD ET AL  2,388,682
FRUIT TREATING APPARATUS
Original Filed Jan. 17, 1938  24 Sheets-Sheet 16
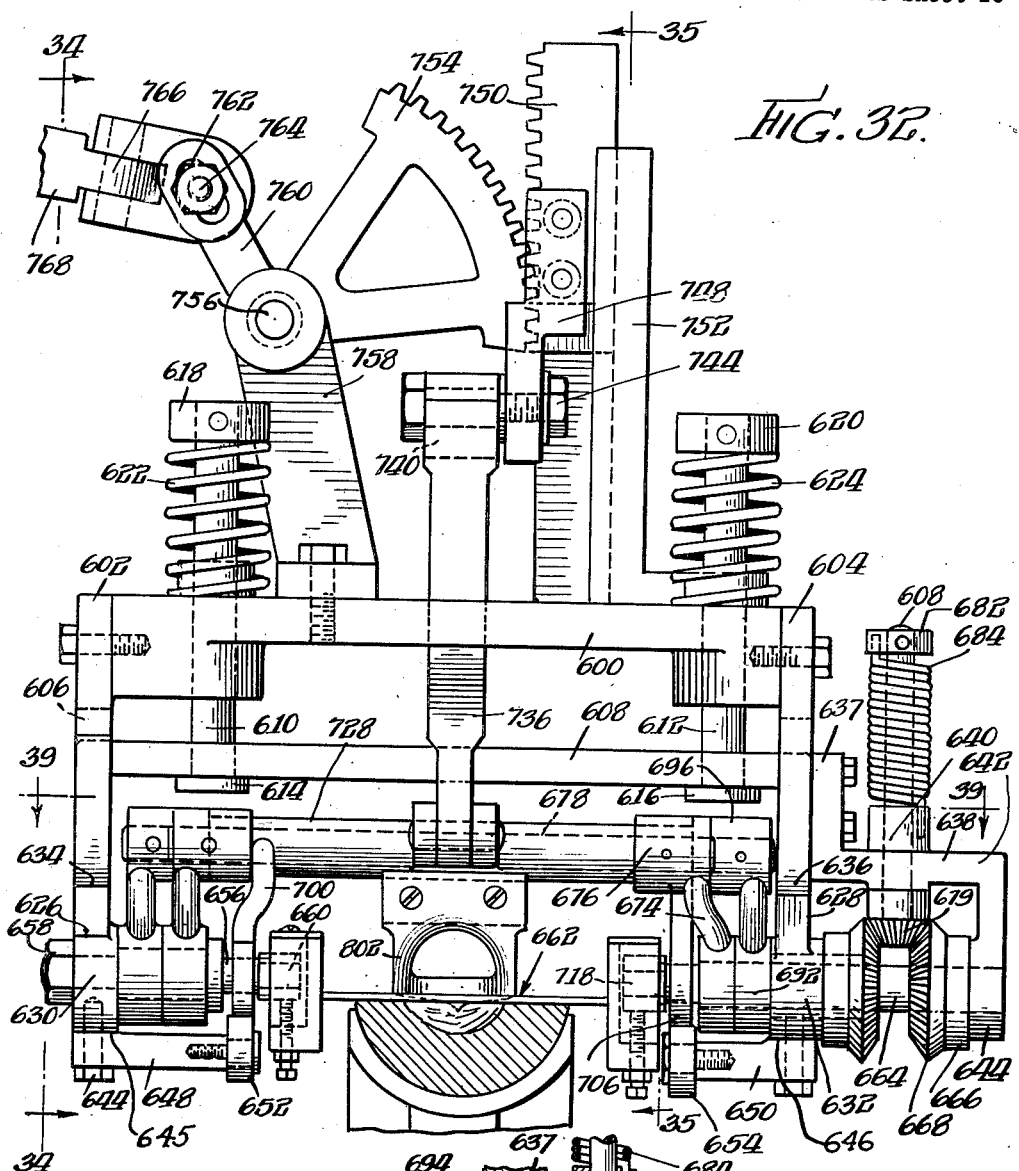
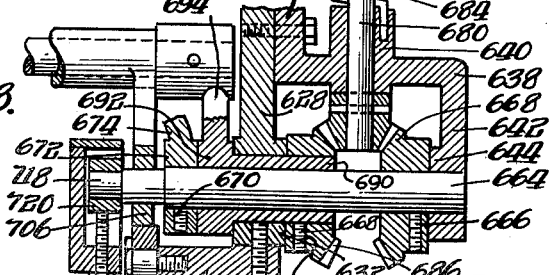
INVENTORS
Raymond L. Ewald
Henry A. Skog
BY: Cox, Moore & Olson  attys

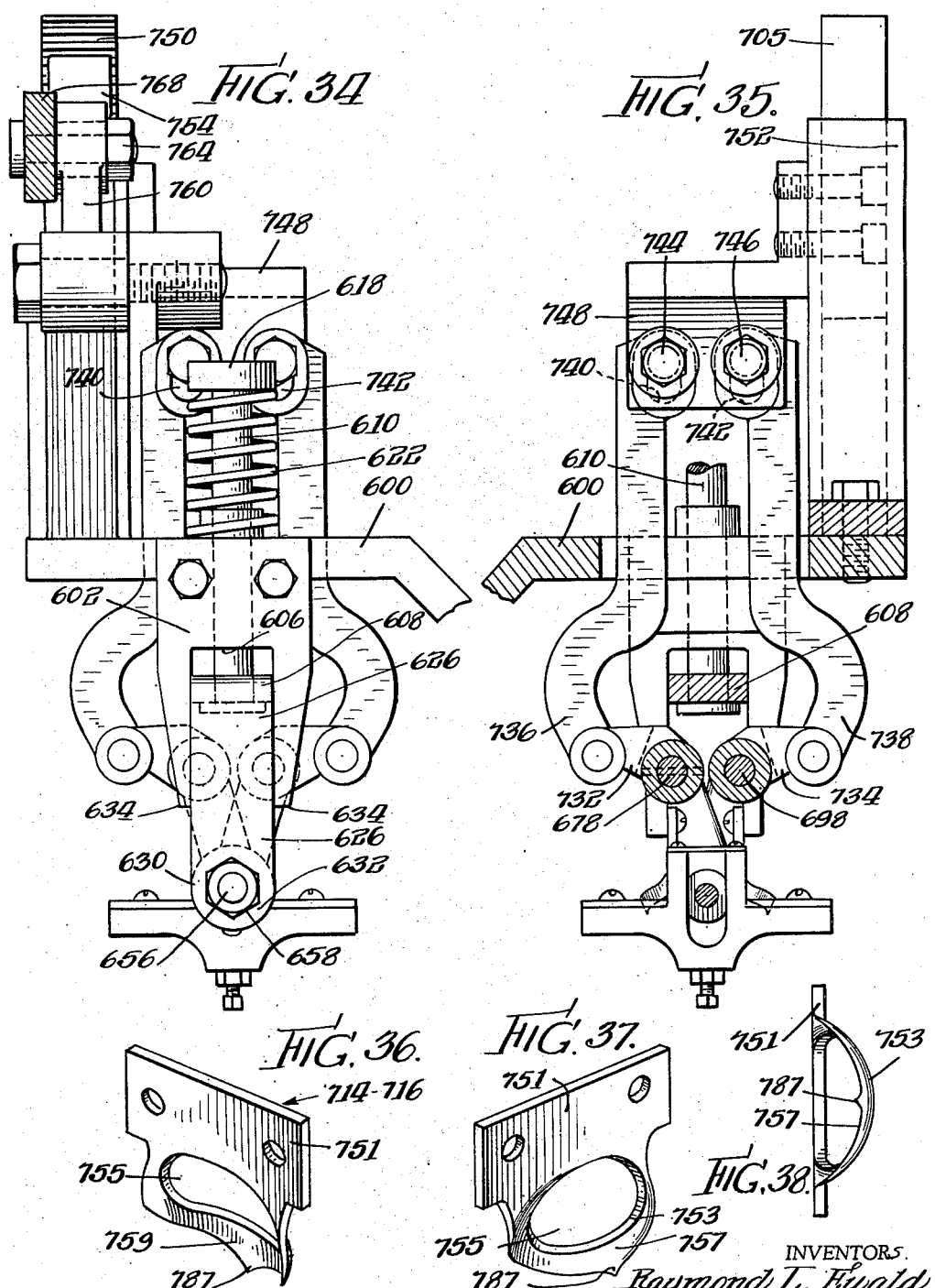

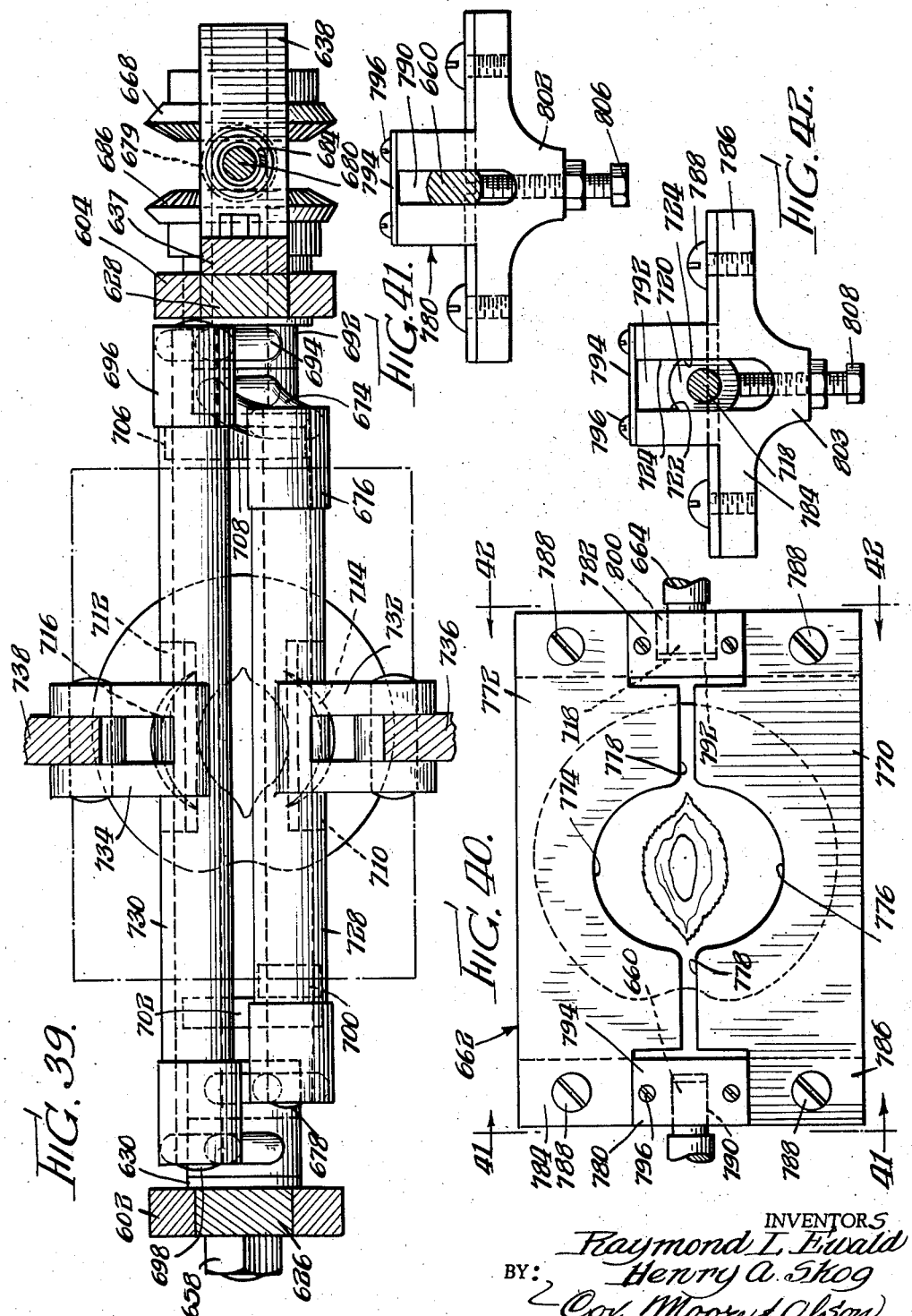

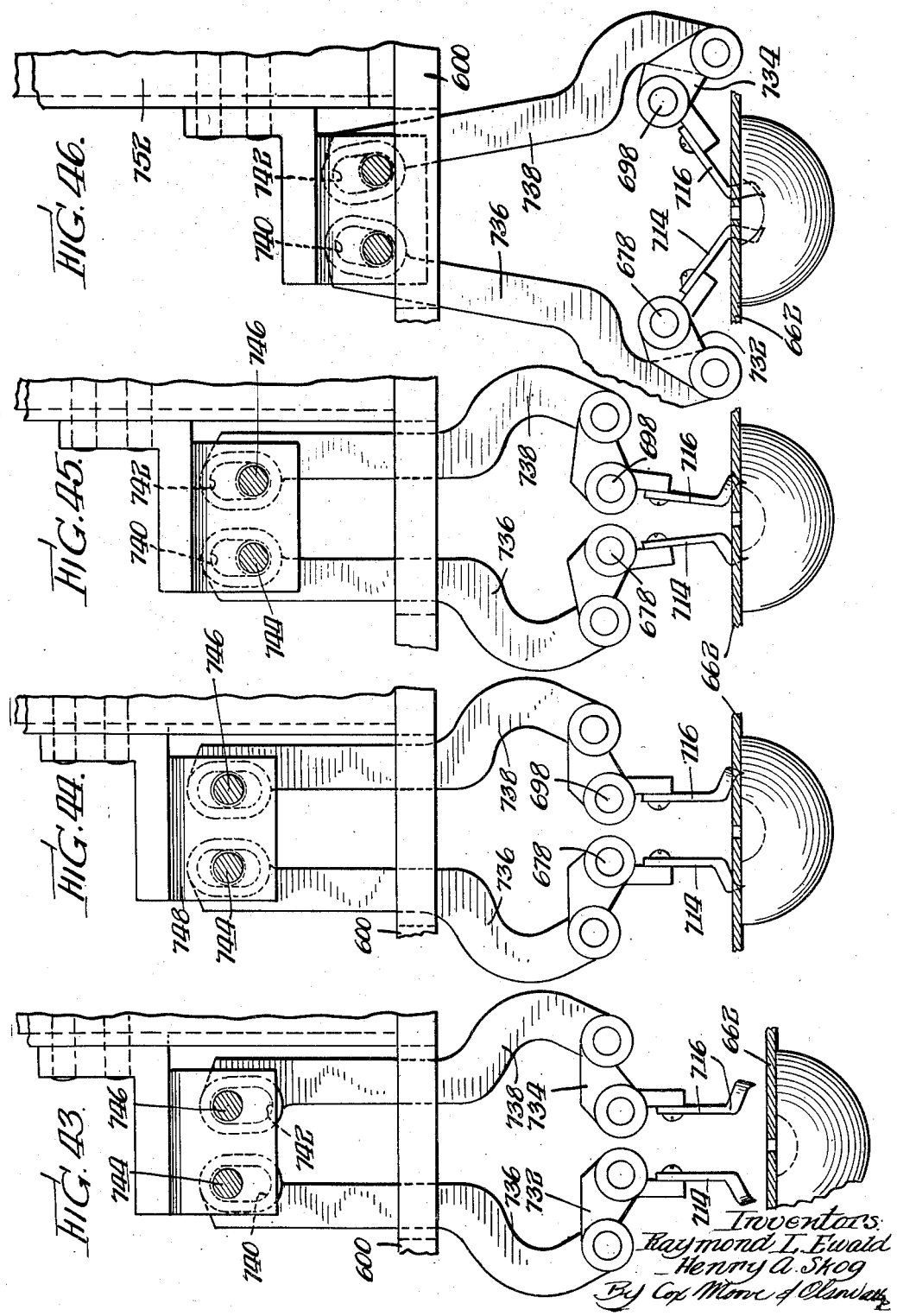

Nov. 13, 1945. R. L. EWALD ET AL 2,388,682
FRUIT TREATING APPARATUS
Original Filed Jan. 17, 1938   24 Sheets-Sheet 20
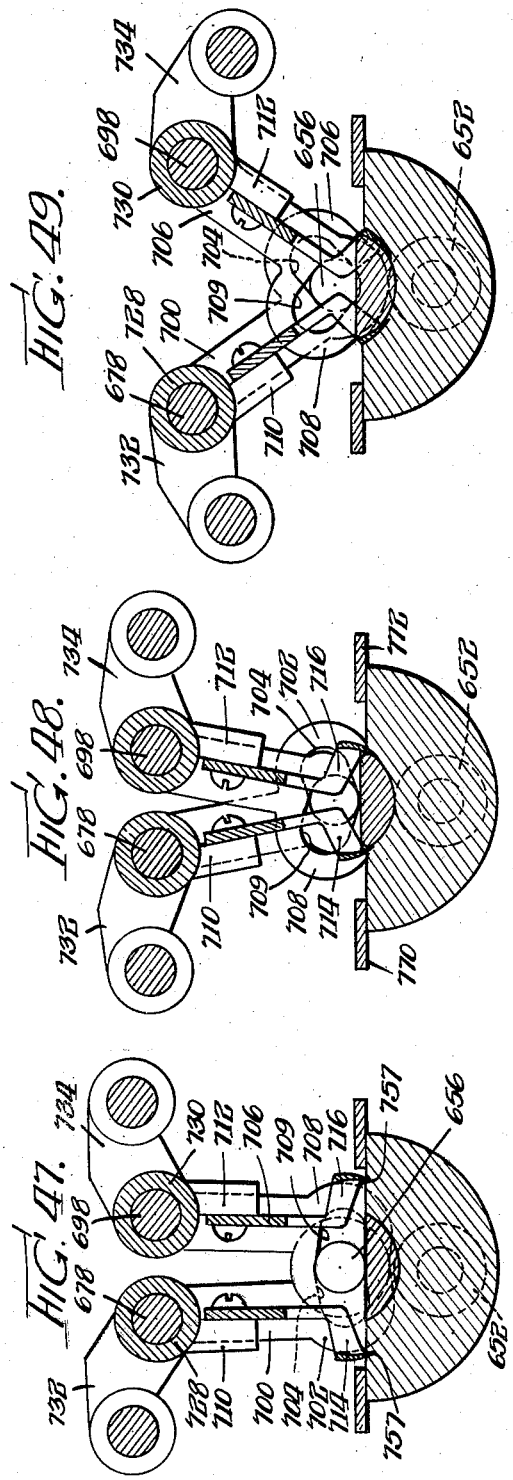
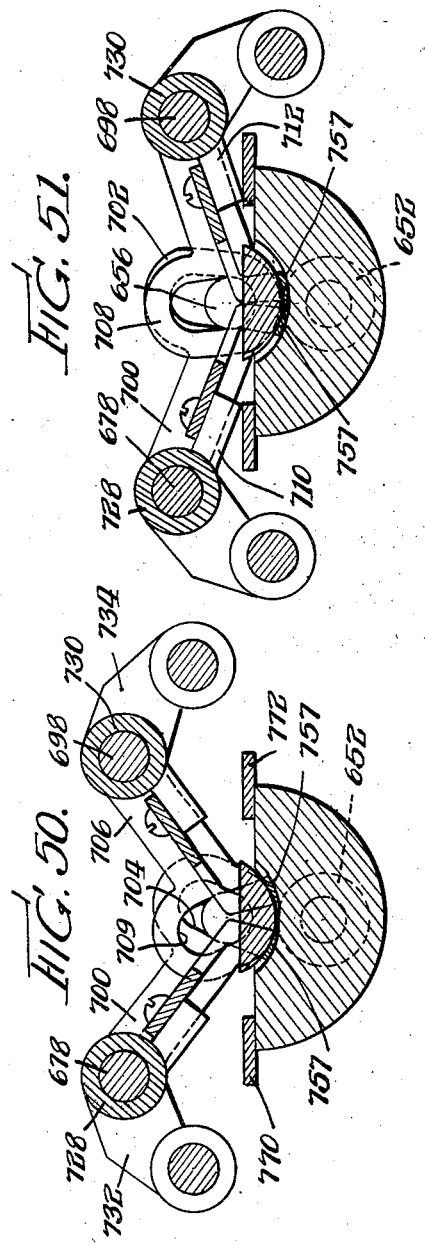
INVENTORS
Raymond L. Ewald
Henry A. Skog
BY Cox Moore & Olson attys.

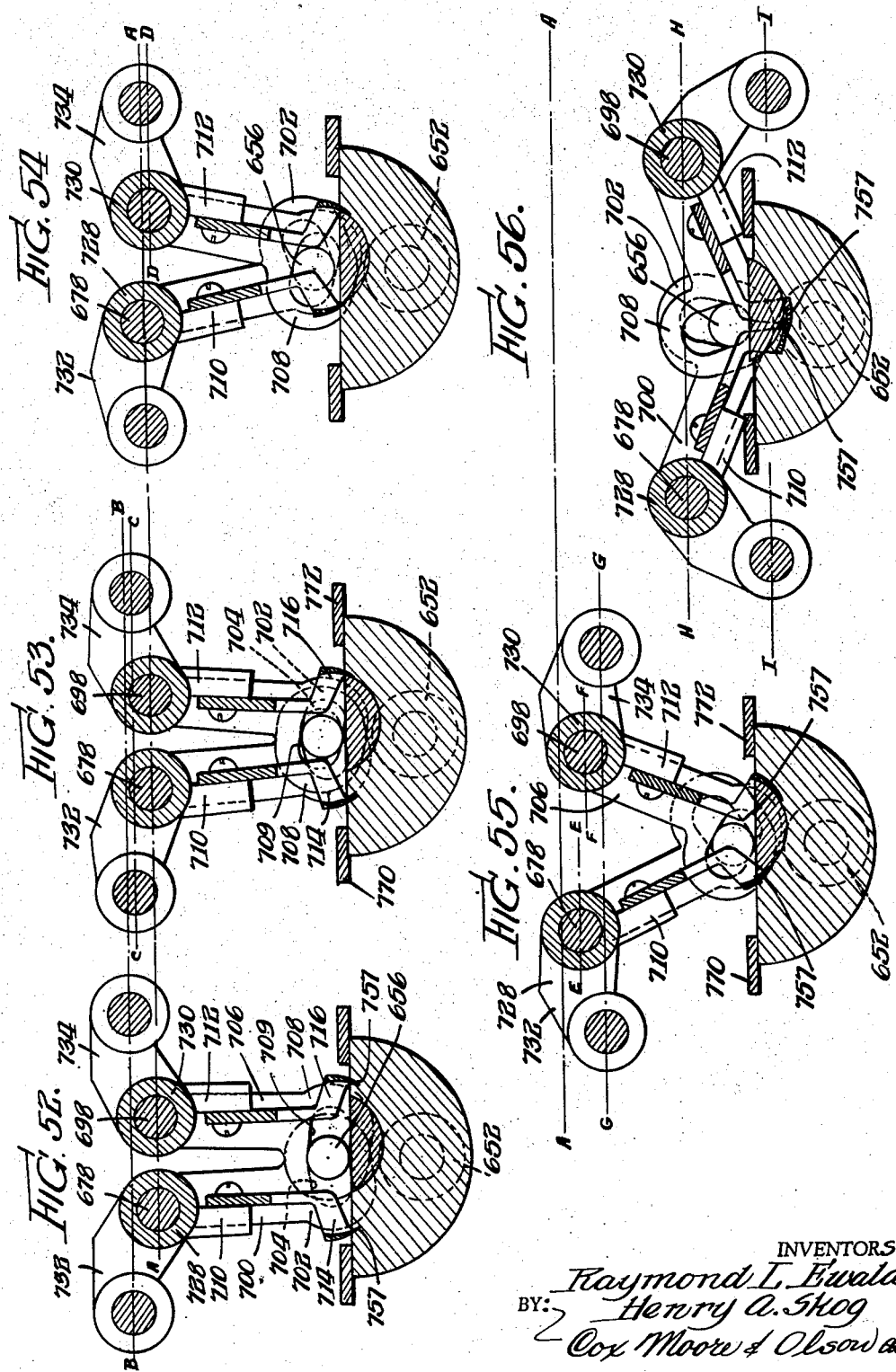

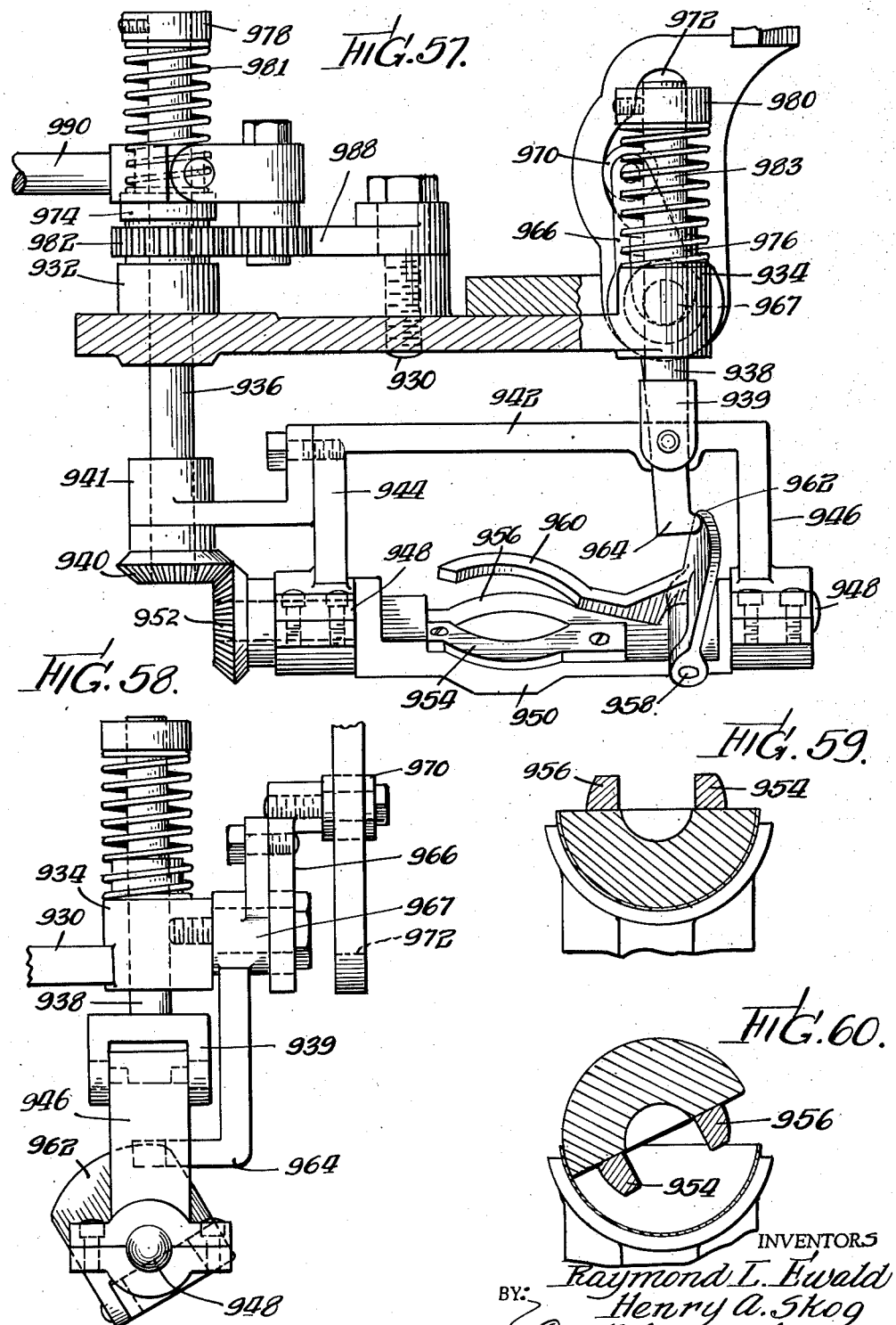

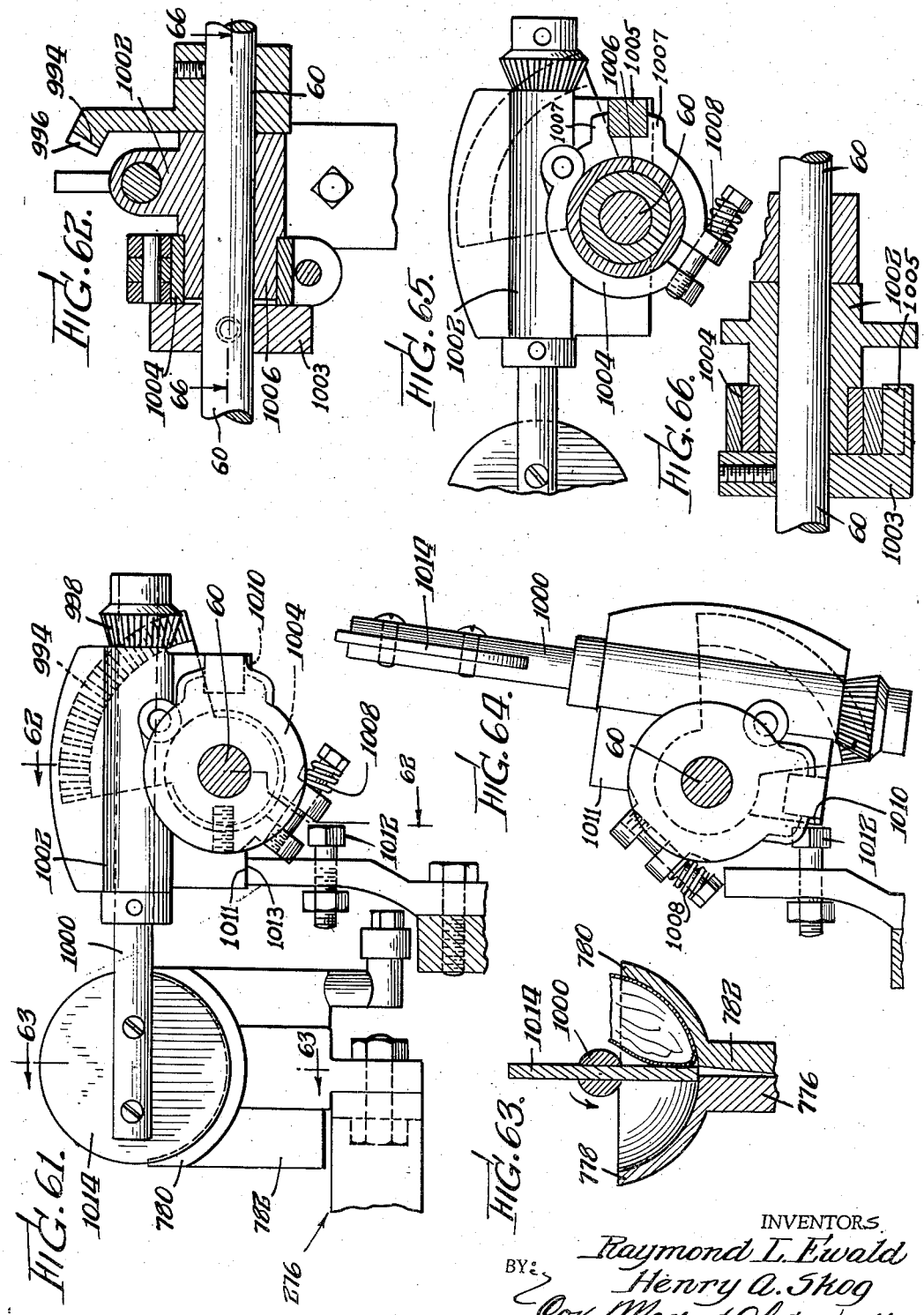

Nov. 13, 1945.   R. L. EWALD ET AL   2,388,682
FRUIT TREATING APPARATUS
Original Filed Jan. 17, 1938   24 Sheets-Sheet 24
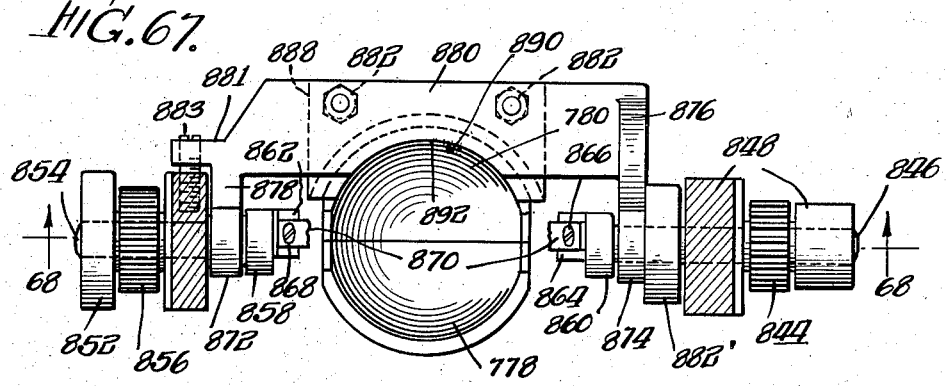
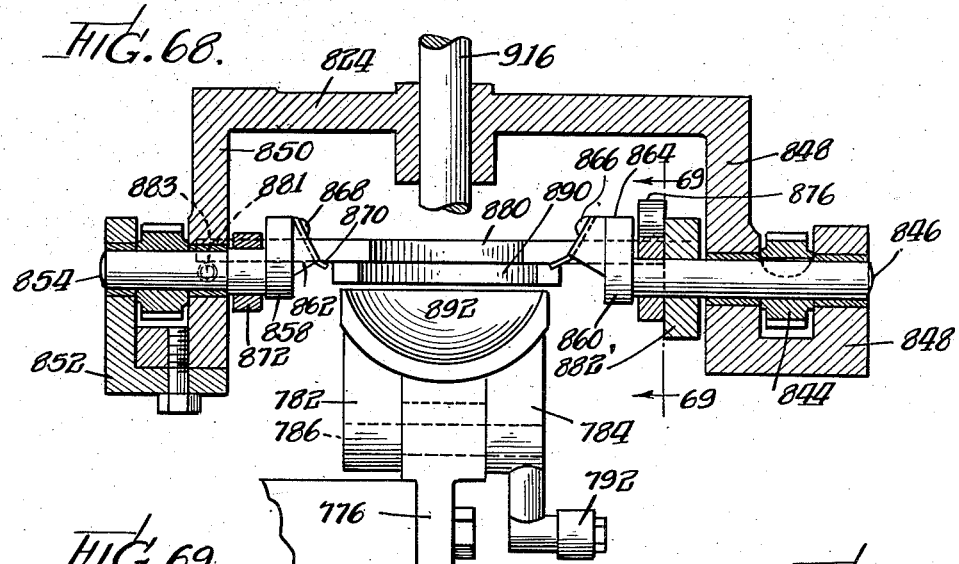
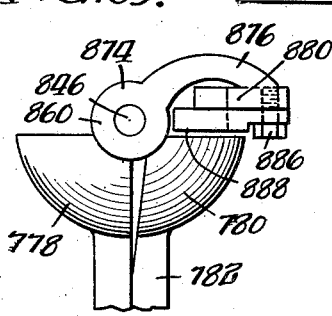
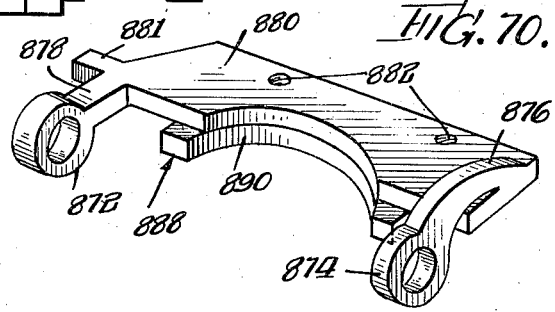
INVENTORS
Raymond L. Ewald
Henry A. Skog
BY Cox, Moore & Olson attys Patented Nov. 13, 1945

2,388,682

UNITED STATES PATENT OFFICE 2,388,682

FRUIT TREATING APPARATUS

Raymond L. Ewald and Henry A. Skog, Olympia, Wash., assignors to Special Equipment Company, Portland, Oreg., a corporation of Oregon Original application January 17, 1938, Serial No. 185,332. Divided and this application February 14, 1942, Serial No. 430,840

21 Claims. (Cl. 146—28)

This invention relates to fruit treating apparatus and more particularly to an organized machine adapted to process fruit halves.

The present application is a division of pending application, Serial No. 185,332, filed January 17, 1938, Patent No. 2,280,813, issued April 28, 1942.

The present invention contemplates the provision of an organized machine including an intermittently operable turret carrying a series of spaced fruit cups, each adapted to hold a half peach. In addition, spaced above the path of movement of the fruit cups are a series of mechanisms operable sequentially upon the contents of each cup to thereby peel the half fruit, pit the half fruit, discharge the peeled and pitted half fruit from the cup, and finally to discharge the peel and the pit separately from the cup.

The pitting operation is claimed separately as method of and apparatus for pitting fruit in a separate divisional application, which application has now issued as Patent No. 2,216,165, dated October 1, 1940. The pitting operation comprises a pitting head involving an apertured plate or a pair of members with flat underfaces and suitably spaced apart to provide an aperture therebetween, through which the pitting mechanism is adapted to pass when contacting the cut face of the half fruit and wherein these spaced pressure fruit contacting plates are adapted to contact the cut face of the half fruit on oposite sides of the pit zone for the purpose of pressing down upon the cut face of the half fruit during the pitting operation and during the time that the pitting blades are cutting through the flesh of the half fruit around the underside of the pit. At this time or during a part of this time the pitting blade or blades are given an upward movement in a direction opposite to that imparted to the flesh at the cut face of the half fruit on opposite sides of the pit zone whereby to cause the pitting knives or blades to make a shallower pitting cut.

In addition, the pitting knives or blades are given a preliminary lateral pit locating movement across the cut face of the half fruit from a point or points remote from the pit into contact with the periphery of the pit so as to locate the latter prior to the actual pitting movement of the blades through the flesh of the half fruit and around the underside of the pit. Inasmuch as this lateral pit locating movement of the blade or blades must be of sufficient extent to take care of the various eccentric positions of pits in variant shaped half peaches, the lateral pit locating travel of the blades in some instances must be of considerable extent and therefore in order to accommodate this movement the aperture in the plate or the aperture between the two plate members must be made relatively large. And since it is necessary that these pressure plates engage the cut face of the half fruit on opposite sides of the pitting zone, it is important that these pitting plates extend beyond the periphery of the half fruit being processed, which in turn means that the cut face of the half fruit must extend beyond the upper rim of the cup so that the plates will contact the cut face of the half fruit but will not contact the cup. This, therefore, means that each half peach must extend upwardly beyond the top rim of each cup.

Inasmuch as in this same organized machine, a peeling operation must be effected upon this same half fruit, and since in that part of the peeling operation where the peeling knife emerges or moves outwardly from the flesh of the half fruit at the completion of tht peeling cut, it is necessary at such portion to support the peripheral edge or peel of the half fruit being peeled, it necessarily follows that since the edge of the cup at this point is well below the peripheral edge of the half fruit being peeled, additional provision must be made whereby automatically to support this portion of the peripheral edge of the half fruit being peeled.

Therefore, one of the objects of the present invention is to provide an organized machine carying out sequential operations of peeling and pitting a half peach or other similar half fruit wherein separate cooperative means are provided for carrying out the foregoing necessary functions sequentially upon the same half fruit.

Another object of the present invention resides in providing an organized fruit treating machine for treating half peaches, half fruits, and the like, whereby means is provided for first splitting the half peaches or the like into two halves and thereafter depositing each half simultaneously into a pair of cups or fruit holders which are moved sequentially and singly past a succession of single peeling and pitting stations wherein a single half peach or fruit is pitted or peeled at one station and wherein thereafter the half peeled or the half pitted peach is presented to a subsequent station where the other or alternate operation is performed thereon, such for instance if the single half peach in the fruit holder is peeled at the first station and then when it is moved to the next station it is pitted simultaneously with the peeling of the half peach at the first mentioned station. In order to carry out the foregoing manner of feeding the half fruits, the second turret must move at twice the speed of the first turret, whereby the whole operation is accelerated and a more effective peeling, pitting, and fruit discharging and scavenging operation is provided.

A further object of the invention is to provide in an organized machine, in addition to the pitting and peeling means hereinbefore set forth, appropriate mechanism at a subsequent station to discharge the peeled and pitted half fruit from the fruit cup without discharging the peel therefrom, and in addition another object of the invention resides in providing a still further station at which the peel is discharged from the cup so that a new or fresh unpeeled and unpitted half fruit may be subsequently fed into said cup for a subsequent processing operation.

Still another object of the invention resides in the provision of an organized machine adapted to carry out sequential operations upon an identical half peach in the manner disclosed in the following specification and drawings, wherein:

Figure 1 shows a side elevation of one embodiment of the present invention, disclosing a completely automatic machine.

Figure 2 is a plan sectional view taken on line 2—2 of Figure 1.

Figure 3 is a vertical section taken on line 3—3 of Figure 2.

Figure 4 is a plan sectional view taken on line 4—4 of Figure 1, showing a part of the driving mechanism.

Figure 5 is a sectional view taken on line 5—5 of Figure 4, likewise showing a part of the driving mechanism.

Figure 6 is a plan sectional view taken on line 6—6 of Figure 3, showing part of the driving mechanism.

Figure 7 is a vertical sectional view taken on line 7—7 of Figure 2, showing the feed turret.

Figure 8 is a plan sectional view of the feed turret, taken on line 8—8 of Figure 7.

Figure 9 is a vertical sectional view of the means for cutting the peeling out of the stem end of the fruit, the view being taken on line 9—9 of Figure 2.

Figure 10 is a sectional view taken on line 10—10 of Figure 9, the view showing the cams that operate the cutter knives and the fruit holding means.

Figure 11 is a detail sectional view of a knife carrier, taken on line 11—11 of Figure 9.

Figure 15 is a plan sectional view taken on line 15—15 of Figure 3, and showing the means for imparting an additional movement to the transfer jaw carriage.

Figure 16 is a side view of the mechanism shown in Figure 15.

Figure 17 is a vertical sectional view taken on line 17—17 of Figure 15 and showing the carrier arms and separating blades.

Figure 18 is a detail plan sectional view showing the carrier arm approaching the separating blades, and also showing the fruit halves disposed upon the blades in dotted lines.

Figure 19 is a plan sectional view taken on line 19—19 of Figure 17, showing means for transferring fruit to the peeling cups, and also showing the separating blades in dotted lines indicating the positions they assume when depositing fruit into the fruit cups.

Figure 20 is a vertical section taken on line 20—20 of Figure 17.

Figure 21 is a sectional view taken on the line 21—21 of Figure 17, showing the fruit disposed upon the separating blades.

Figure 22 is a perspective view of one of the spreader means.

Figure 23 is a view showing one of the spreaders in a downward position.

Figure 24 is an exploded view of the parts of one of the spreaders and its operating means.

Figure 25 is an exploded view of the mechanism for operating the fruit spreaders.

Figure 26 is a fragmentary view of the lower portion of the right-hand end of the machine as viewed in Figure 1, showing part of the actuating mechanism.

Figure 27 is a fragmentary elevational view of the opposite side of the machine as that shown in Figure 1, with a portion of the frame broken away.

Figure 28 is a fragmentary view showing the mechanism for expelling the fruit from the machine.

Figure 29 is a vertical sectional view taken on line 29—29 of Figure 2, showing the peeling head.

Figure 30 is a front elevational view of the peeling head as it appears in Figure 29 when viewing it from the right.

Figure 31 is a sectional view taken through one of the peeling cups, showing the means for extending one of the inner walls of the cup sections.

Figure 32 is a side elevational view of the fruit pitting mechanism.

Figure 33 is a fragmentary sectional view of parts shown in the lower right-hand portion of Figure 32.

Figure 34 is a side elevational view of the pitter assembly, being viewed from the left as indicated by section lines 34—34, Figure 32.

Figure 35 is a vertical sectional view taken on line 35—35 of Figure 32.

Figures 36, 37 and 38 are front, rear and bottom plan views, respectively, of one of the pitter blades.

Figure 39 is a sectional plan view of a portion of the pitting mechanism, being taken on line 39—39 of Figure 32.

Figure 40 is a plan view of the presser plate.

Figure 41 is a sectional view through one end of the presser plate, being taken on line 41—41, Figure 40.

Figure 42 is a sectional view through the opposite end of the presser plate, being taken on line 42—42, Figure 40.

Figure 12:
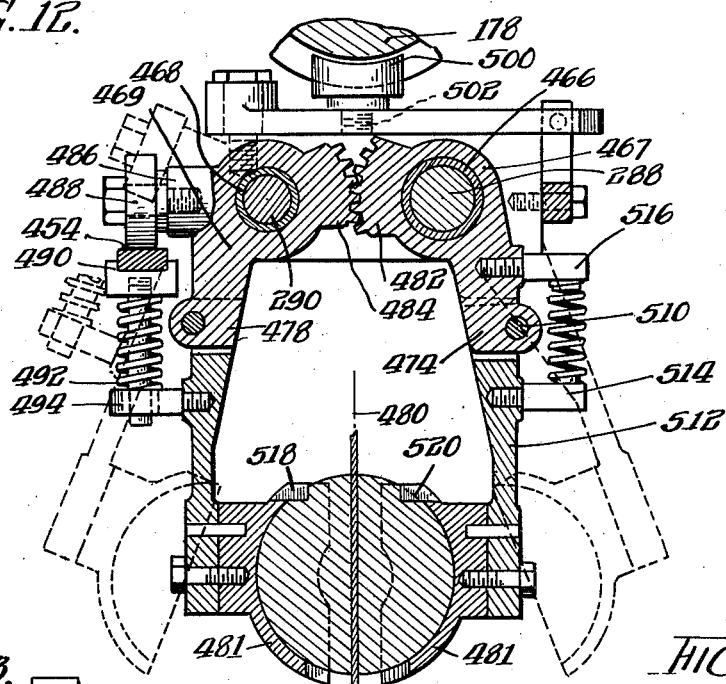
Figure 12 is a detail sectional view of the fruit carrying arm, being taken on line 12—12 of Figure 3.
Figures 13, 14:
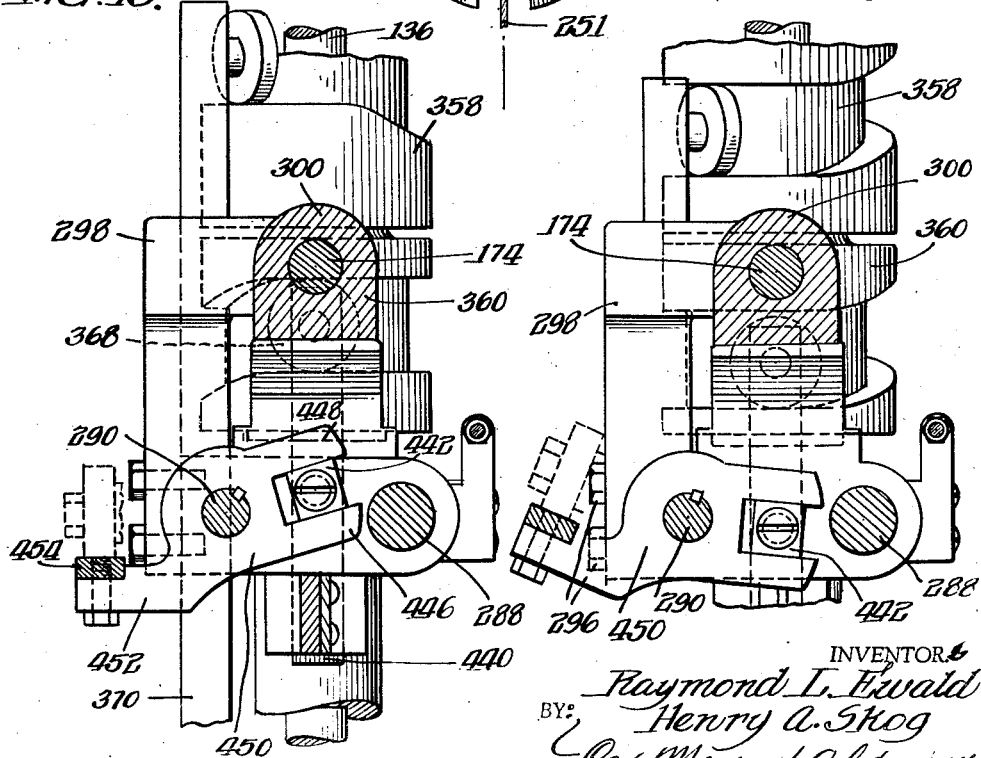
Figure 13 is a detail sectional view showing the means for operating the carrier jaws, the view being taken on line 13—13 of Figure 3.
Figure 14 is a view similar to Figure 13, but showing the mechanism in a different operating position.

Figures 43 to 46, inclusive, are successive views of the pitting mechanism, showing the operation of the link connection of the pitter actuating connections to the carriage mechanism.

Figures 47 to 51, inclusive, are successive views of the pitting operation when the half pit is substantially centrally located with respect to the half peach.

Figures 52 to 56, inclusive, are views corresponding to Figures 47 to 51, inclusive, but showing an instance wherein the half pit is eccentrically located with relation to the half peach.

Figure 57 is a detail sectional view of the processed fruit extractor and discharge mechanism, being taken on the line 57—57 of Figure 2.

Figure 58 is an end view of the mechanism shown in Figure 57 as it appears looking from the right.

Figures 59 and 60 are successive views of the manner of extracting the processed half fruit from the fruit holder.

Figures 61 to 66, inclusive, are detail views of the scavenger mechanism.

Figure 67 is a plan sectional view taken on line 67—67 of Figure 29.

Figure 68 is a vertical sectional view taken on line 68—68 of Figure 67.

Figure 69 is a detail sectional view taken on line 69—69 of Figure 68.

Figure 70 is a perspective view of the plate which forms the extension for the fruit cup during the peeling operation.

The present invention is best exemplified by reference to an organized, automatic machine adapted to receive a succession of whole fruit, such, for instance, as whole peaches, and particularly peaches of the clingstone variety, for continuously passing each of the succession of whole fruits through the machine and for discharging each whole fruit as two processed half peaches in a manner suitable for subsequent canning; specifically, each whole fruit first has the peeling at its stem end removed; the whole peach is then split or divided substantially in half, which includes a division of the pit itself; the two halves are then automatically transferred onto mechanism which deposits each half fruit into a fruit receiving means, which succession of fruit receiving means moves past a peeling station where the peeling of each half fruit is automatically removed, thence past a pitting station where the half pit of each half fruit is automatically removed; thence past a discharging station where a processed half fruit is discharged from the machine free of its peel, and thence past a scavenging station where the peel is discharged from the fruit holding means independently of the half fruit.

*Description of machine*

In order to exemplify various features of not only the broad but narrower aspects of the present invention, the same is described as applied to a type of machine disclosed in the drawings. It is, however, understood that such machine is but one form of the many different embodiments the invention is capable of taking, and that such illustration and disclosure is purely by way of illustration and not by way of limitation.

The machine of the present construction preferably takes the form of an upright, substantially square frame comprising four corner posts or angle irons 2, 4, 6 and 8, suitably braced at top and bottom by cross braces 10 and 12. In addition, other hereinafter described cross bars serve as rigid bracing for these upright members. In a general way, extending laterally from this rectangular frame, projects a supplementary frame adapted to be bolted or otherwise attached thereto, as clearly shown in Figures 1, 4 and 6. This supplementary frame is utilized to support the mechanism which initially receives the fruit, the mechanism which cuts the fruit in halves and transports it to the peeling, pitting, fruit discharging and peel and pit scavenging mechanism, the latter mechanism being supported on the rectangular frame. A fuller description of this arrangement will be given subsequently.

The upright frame hereinafter described is provided on a relatively low level thereof with horizontally disposed shafts 14 and 16. Shaft 16 is power driven through clutch mechanism 17, which includes a drive pulley 18 adapted to be driven from any suitable motor 21 carried on a bracket mounted on the frame of the machine. The clutch mechanism 17 on the power drive is similar to that described in the pending applications of Mark Ewald and comprises purely a clutch for connecting and disconnecting the electric power source to the main operating shaft of the machine, and no portion of the present invention is concerned with the details of the clutch mechanism.

Shaft 16 carries a gear 20 driving another gear 22 on the horizontal shaft 14. This shaft 14 carries two main cams 24 and 26 fixed on opposite ends thereof. Each of these cams is double faced so as to provide cam operating means on the two opposed faces of each cam. Cam face 24a comprises a cam track in which operates a roller, hereinafter described, of a vertically reciprocable slide for raising and lowering the main tool carrying slide, hereinafter described. Cam face 24b forms a roller race in which a roller on a horizontally reciprocable slide 28 shifts in a horizontal motion transversely of shaft 14, and carries on its outer end a bearing pivot 30 linked to a bearing pivot 32 on an arm 34 fixed on a vertical shaft 36 having fixed bearings in the corner frame 2 of the main upright frame of the machine. This vertical shaft 36 is oscillated by the slide 28 for operating the peeling mechanism hereinafter described and also for operating the fruit discharging mechanism hereinafter described by means of cranks fixed to the upper end of this vertical oscillatable shaft 36.

The cam 26 on shaft 14 has a cam face 26a formed as a cam race in which operates a roller on a somewhat similar horizontal reciprocable slide 38 and corresponding to slide 28, which slide 38 is also provided on its outer end with a bearing 40 for a vertical pin 42, to the lower end of which is pivoted a link 44. This link 44 carries at its outer end a link 46, the outer bearing 48 of which is pinned to a vertically oscillatable shaft 50 which is mounted in the corner post 6 of the frame and in an opposite manner to the vertical shaft 36. This shaft 50 carries on its upper end a fixed arm hereinafter referred to, which in turn pivotally connects at its outer end to a relatively long rod running diagonally across to a universal connection in turn connected to mechanism which operates a gear sector reciprocable on a horizontal axis for operating the mechanism which actuates the pitting knives, all as will be hereinafter set forth.

Cam race 26b operates a vertically reciprocable slide 52, see Figure 27, the upper end of which is provided with a rod 54 having a rack tooth portion 56 operating a pinion 58 on a horizontal shaft 60. This shaft 60 is oscillated by the rack and pinion to operate a cam 62 on the outer end of this shaft, which in turn is adapted through the instrumetnality of a roller 64, mounted on a pivoted arm 66, to operate a horizontal shaft 68 having bearings on the outside of the vertical frame member and on a level of the main fruit cup turret, hereinafter described and above the lower levels of the machine that carry the shafts 14 and 16.

The arm 66 which is carried by the shaft 68 has an extending portion 70 which engages a spring 72 mounted between it and the corner post of the main frame for normally pressing the roller 64 toward the cam 62. The shaft 68 operates the mechanism for (a) positioning the rubber pad over the fruit cup for vertically holding the peel therein, and for (b) oscillating the fruit discharge trough, preferably carrying this rubber pad. These mechanisms (a) and (b) will hereinafter be more fully set forth.

As clearly shown in Figure 2, the present machine provides a greater number of stations and operations than prior types of machines disclosed in the patents and pending applications of Mark Ewald. While the present invention is not limited to a machine having the exact sequence of apparatus for performing the different operations upon the fruit passing through the machine, the present disclosed arrangement is particularly desirable for the automatic treatment and processing of peaches and in the disclosed sequence of operations. In the present instance these stations and operations include:

1. A whole fruit feed station.
2. A peach stem cavity cutter and peeler.
3. A whole peach dividing and transfer station.
4. A spreader station where the cut halves are deposited in the half fruit receptacles on the main intermittently rotating turret mechanism.
5. A peeling station for peeling a single half peach or other half fruit.
6. A pitting station for pitting a single half peach or other half fruit.
7. A discharge station for discharging a single peeled and pitted half fruit.
8. A peel scavenging station.

In the present organized machine, particularly as distinguished from the prior Ewald type of machine, it is not practicable to discharge the half fruit from the machine at the same station at which the seed-containing section is severed. This, therefore, results in the provision of a separate station for effecting this half fruit discharge. So also it was not practicable to pit and/or peel two halves simultaneously. This present machine is arranged simultaneously to pit a half peach or other half fruit at one station while also peeling a half peach or other half fruit at another station. This in turn has made desirable a six half-fruit-holder turret instead of a four as heretofore provided. This six holder arrangement for the half fruit in turn makes desirable the disposition of single half fruit holders radially of the turret instead of in parallel pairs as heretofore; and this in turn, in conjunction with the six fruit holder feed-in turret for the whole fruit, requires means for spreading the fruit halves from a parallel position of the suture axes of the severed halves of a fruit to a position where such suture axes converge and lie radially of the axis of the second turret. This in turn has demanded a different motion of the half fruit spreaders as distinct from the single arcuate swing in the prior Ewald devices plus provision of means for driving the half fruit turret at twice the speed of the whole fruit turret whereby each half fruit holder of the latter turret is shifted say one hundred twenty degrees intermittently as the corresponding whole fruit holder is shifted sixty degrees to provide two spaced adjacent empty holders to receive the split halves of a whole fruit from each of the single holders of the whole fruit turret.

A second level of the main rectangular frame of the machine, bounded by the uprights 2, 4, 6 and 8, provides a location for the Geneva gears for driving the main half fruit holding turret and also the whole fruit feed turret, including the driving means therebetween, whereby the main half fruit holder turret is driven twice as fast as the whole fruit feed-in turret. For effecting this function, shaft 14 carries between its ends a bevel gear 110, see Figure 4, meshing with a bevel gear 112 on a vertical shaft 114 mounted in a bearing 116 (Figure 3) carried by a cross frame 118. This cross frame is supported at one end by suitable vertical bracing connected to a cross bar 120 (Figure 5) carried by the vertical upright frame members 4 and 8. The opposite end 122 of cross frame 118 is bolted to an end support by a projection 124 from a horizontal cross bar 126 carried by the opposite vertical uprights 2 and 6 of the main frame at about the level of the cross frame 118. This cross bar 126 is preferably an integral part of the substantially triangular-shaped supplemental frame carrying the whole fruit feed-in turret and the transfer mechanism.

Shaft 114 carries a bevel gear 112 and also carries above it a gear 128, which latter meshes with a second gear 130 on a bearing 132 on the cross frame 118. Gear 130 meshes with a larger gear 134 horizontally fixed on a vertical turret shaft 136 having a bearing in cross frame 118. Turret shaft 136 is surrounded by a bearing 138, above which is a long sleeve 139 upon which is fixed a Geneva gear 140 having six slots, cooperating with a Geneva member 142 on shaft 114. This latter Geneva 142 has the usual circular periphery provided with a roller 144 for cooperation with the six radial slots aforesaid, for rotating the Geneva wheel and sleeve 139 and for holding its stationary between partial turns. The upper end of the shaft 114 above the Geneva member carries a sprocket gear 146 (see Figure 6) driving a chain 148 running horizontally across the frame of the machine to a larger sprocket 150 fixed to shaft 152. This shaft 152 is mounted on a substantially triangular frame 153 carried by and integral with the cross bar 126. The outer end of frame 153 carries a bearing for the shaft 152 and also has a heavy extension bearing 155 (Figure 3) for whole fruit turret shaft 154 Both of these shafts are vertical and parallel to each other. Shaft 152 extends upwardly a short distance and is provided on its upper end with a disc-like cam 156 of the tracker type, for operating the saw shifting mechanism. Whole fruit turret shaft 154 extends vertically upwardly toward the top of the frame and carries the whole fruit feed turret sleeve 161 rotatably mounted thereon, Figure 3.

Shaft 152 at its lower end has a roller element 158 of a Geneva movement fixed to it, and sleeve 161 has a slotted element 160 of the cooperating Geneva part fixed to it. This slotted Geneva has fixed to it the sleeve 161, see Figure 3, which sleeve in turn carries the feed finger turret 162 provided with six whole fruit feed fingers.

*The whole fruit feed-in station*

Concentrically within sleeve 161 is the shaft 154, see Figuure 3, the lower end of which extends below the bearing 155, Figure 3, and which has fixed thereto a gear 166 meshing with a gear 168 on the bottom end of shaft 152, whereby as the Geneva part 158 intermittently rotates the sleeve 161, the gears 166 and 168 rotate the shaft 154. The upper end of shaft 154 is provided with a crown gear 170 having radially extending peripheral teeth, and shaft 154 is also provided with a bevel gear 172. Crown gear 170 drives a shaft 174 through bevel gear 176, which shaft rotates an endless screw 178 for operating the fruit transfer mechanism, hereinafter described, while bevel gear 172, through another bevel gear 173, drives a horizontal shaft 179, see Figure 9, rotating in a bearing 180 mounted on upper frame 182, which latter is a horizontal frame extension corresponding in general to the lower frame extension 153, see Figure 4, and in which upper extension 182 the shaft 154 has a bearing.

The stem cavity cutter or peeler

Means is provided for automatically peeling or cutting the peel of the whole peach within the cavity in which the stem is located. Referring to Figures 9, 10 and 11, on the opposite end of shaft 179 is fixed a compound cam comprising a large cam disc 184 having a peripheral high and low edge and a concentrical, cylindrical cam 186. On a support 190 mounted on frame 182 is pivoted, as at 191, a lever 192 having a cam roll 193 rotatable thereon, and adapted to cooperate with the edge of cam 186 for pivotally shifting lever 192 in a vertical plane. Pivoted at 193' to mounting 190 is a long lever 194, the lower end of which carries a substantially L-shaped arm 196 having a nose or holder 197 adapted to enter the stem indentation or cavity of the whole peach as the latter is held by the whole fruit feed mechanism hereinafter described, and is thereby brought opposite to and held by the feed fingers of said feed mechanism. The upper end of arm 194 below its pivot 193' is provided with a roller 195 adapted to be contacted by a lateral edge of cam disc 184 for shifting this lever 194 toward and from the feed fingers of the whole fruit feed turret. The lower end of arm 194 is also provided with a pivot 199 on which swings another arm 200, the rear end of which has a pivotal connection 201 with a rod 202. This rod 202 pivots at 203 to the rear end of the lever 192. The front end of lever 200 is provided with any desired means for cutting the peel within the stem cavity. In the present form this means includes opposed blades 204 spaced apart about one-eighth inch to allow the points to pass either the holder 197 or the end of the pit, depending upon the depth of the cut. By the foregoing mechanism, when a peach or similar fruit is fed or positioned with its stem indentation opposite the nose 197, and when the latter is swung outwardly to enter the indentation, the lever 200 will be automatically swung upwardly, carrying the knives 204 through the cavity and form opposed, spaced cuts thereacross to cut the peel free from such indentation, and particularly when the subsequent peeling operation is carried out as hereinafter will be described.

The rear of lever 194 has a coiled spring 212 abutting thereagainst, which also acts against a fixed arm 213 on support 190 for returning the lever 194 resiliently to press the nose 197 into the stem cavity of the whole peach. In addition, a coiled spring 214 connected to the rear end of lever 200 serves to pull the knives 204 downwardly after the cutting operation.

The whole fruit feed-in turret

Means is provided whereby an operator may feed whole peaches one at a time to the feed-in turret, and this feed-in means preferably comprises a plurality of conveying means, specifically, relatively movable fingers which are adapted to grasp the curved surface of each of the whole peaches and to convey them to the splitting or dividing station as hereinafter described. Whole peaches are of varying shapes. Some are lopsided with respect to the plane of the suture, others are symmetrical with respect to the plane of the suture. In the great majority of cases the maximum diameter of the pit of the peach is in the plane of the suture; in a smaller percentage of whole peaches, the maximum diameter of the pit may be positioned to one side of the plane of the suture. In any event, it is desirable to cleave or cut through the flesh of the fruit and also the pit in a plane parallel with the plane of the maximum diameter of the pit. The feed-in turret for the whole peaches, in the present invention, is constructed and arranged so that the whole peaches are positioned in the holding mechanism of the feed-in turret in such a way that the plane of the maximum diameter of the peach, irrespective of the plane of the suture, is centrally located with respect to the grasping or holding means of the feed-in turret whereby when the feed-in turret is intermittently moved to the peach dividing position, the plane of operation of the dividing mechanism will be parallel with the plane of the maximum diameter of the pit. In the present instance, also, the feed-in turret and dividing station are constructed and arranged so that the peach, together with its whole pit, is divided while the whole peach is held within the grasping means of the turret and in such a manner that the contacting pressure of the grasping means is disposed on opposite sides of the peach dividing means and relatively close to the line of cleavage whereby any lateral pressure of the grasping means in holding the peach during the cleaving operation is avoided, and whereby a clean cut is effected. In addition, the peach is positioned and held in the holding means of the turret with preferably the longer axis of the pit disposed horizontally and also radially of the axis 154 of the turret.

Referring now to the specific mechanism for accomplishing the foregoing and other functions, fixed on the upper end of sleeve 161, see Figures 3 and 7, is a feed head comprising a second sleeve 220 having in the present instance six radially disposed outstanding lugs 222, to each of which is fixed upstanding support bars 224 carrying the relatively shiftable feed fingers which comprise the whole peach holding means. Each feed finger device includes a relatively fixed replaceable holder or finger 230, which finger may be of varying sizes and suitably curved to receive and position the butt end or blossom end of the whole peach. Any suitable means may be provided for detachably holding the finger 230 in place. In addition there are upper and lower fingers 232 and 234, each having an integral toothed sector 236 and 238, respectively, intermeshing to provide simultaneous opening and closing action. A spring 237 connecting the arms 232 and 234 normally tends to bring the fingers to relatively closed position whereby to hold the whole fruit therebetween. As shown more clearly in Figures 2 and 8, each of these fingers is provided with radially extending slots 239 which extend back for substantially the entire length of the fingers whereby to permit the saw or cutting means, hereinafter referred to, to pass substantially through an entire whole fruit and completely to cut the pit of the whole fruit while the whole fruit is held stationarily between these fingers 232 and 234. It will be noted that these slots 239 substantially provide divided fingers which engage the whole fruit laterally and adjacent the line of cut so that the whole fruit is held substantially at the line of cut and not by any means that tends to press at an angle to and particularly at a right angle to the plane of action of the cutting means. It is important that the minimum lateral pressure be exerted on the whole fruit during the sawing action of the pit. This lateral pressure tends to press together the flesh of the fruit during the cutting action, and what is more important, tends to make jagged cuts in the marginal edges of the peach during the severance of the pit. This tends seriously to impair the appearance of the half peach sections during subsequent pitting, and tends to embed the slivers of the pit into the flesh of the fruit, thereby impairing its flavor, appearance and quality.

Means is provided for positively opening the fingers and for permitting the spring resiliently to close these fingers whereby to engage and releasably hold the whole fruit therebetween during the cutting or sawing operation of the peach and whereby also to hold the two severed halves and to permit them to be grasped and transferred to the mechanism for depositing each half into a holding means, herein specifically illustrated as a cup. Beneath the support extension frame 182 and keyed on the upper end of shaft 154 is a cam 240. Below this cam is slidably disposed a cross slide 242 guided by a lug 244 on the under side of frame 182. This slide 242 has two depending lugs 246 forming extensions thereof and which lugs are 180 degrees apart. Cam 240 is provided with a cam race 248 which extends approximately 360 degrees of the total annular travel of the cam 240. Cam slide 242 has a roller 249 pivoted on its upper surface which runs in the cam race 248 on the under side of cam 240 to shift the slide 242 back and forth with a straight-line motion. When this slide 242 is moved toward the feed-in station of the machine, i. e., away from the pitting station, the depending lug 246 nearest the pitting station moves toward the feed-in station end, and thereby pushes the roll 250 on the top of the upper finger 232, see Fig. 7, inwardly toward the shaft 154 to open the fingers 232, 234. At the same time, the lug 246 which is spaced 180 degrees therefrom moves in the same direction to permit the spring 237 to close the oppositely located fingers and thereby hold the whole fruit between the fingers. The whole fruit, which is herein illustrated as a whole peach, is thus fed in step-by-step rotation of the feed turret, which carries the peach first to the stem cavity cutter for trimming the stem indentation and thence to the dividing or sawing station, at which station the feed fingers 232 and 234 are positively opened by a cross slide lug 246 in properly timed relation to permit the transfer fingers, hereinafter mentioned, to grasp and carry the severed halves or substantially severed halves of the peach from the sawing or dividing station to the spreading mechanism hereinafter mentioned.

By means of the foregoing mechanism, once the whole peach is placed manually with its suture line in a plane parallel with the plane of action of the rotary saw and with the maximum diameter of the peach placed centrally of the fingers 232 and 234, the whole peach will be firmly held in such position by these fingers and with the longitudinal axis of the pit extending radially of the turret. Thus held it will be positioned first opposite the trimming mechanism and thereafter will be laterally shifted by the turret into the plane of action of the rotary saw, whereby the stem end of the peach is first trimmed and thereafter sawed into two sections and in a plane parallel with the plane of maximum diameter of the pit, the line of severance made by the saw taking place through the plane of maximum diameter of the peach, which may or may not be through the plane of suture of the peach, although it will be parallel with the plane of suture of the peach.

The flesh and pit dividing means

Means is provided for splitting, cutting or sawing the flesh of the fruit and also the pit, and this is accomplished in a plane parallel with the plane of maximum diameter of the pit and while the whole fruit is held stationarily in the feed-in turret fingers as hereinbefore described. The fruit and pit dividing means preferably comprises a rotating saw 251 (Fig. 3) which is mounted on a shaft 252 carried in a swinging arm 254 in turn mounted on a shaft 256. This latter shaft is carried in bearings on arms 258 rigidly mounted on the main upright frame of the machine.

Opposed stops, i. e., screws 260, adjustably limit the oscillatory movement of the saw. The saw shaft 252 is rotated by a belt 262 (Fig. 1) through the instrumentality of a double pulley 264 and a pulley 266. A second and larger belt 257 runs on the pulley 264 and thence to a larger pulley 268 which latter is driven by the motor 21 mounted on the top of the main upright frame. This same motor 21 is utilized for driving the main driving pulley and clutch mechanism of the entire machine.

The whole peaches are hand fed between the open fingers 232 and 234 on the feed-in turret. As so fed, each peach is positioned with its crease vertical and its stem end outwardly. The upper and lower fingers 232 and 234, due to their intermeshing connection and their springs, always come to the same closed position with respect to a center line horizontally disposed half-way between the pivotal axis of the fingers 232 and 234. Peaches not being all of the same shape, some being generally round and others being lop-sided, it is necessary to position or feed the peaches between the fingers with the largest diameter of the peach centrally located with respect to the central plane of the fingers, and with the crease or suture line parallel to a vertical plane passing through the fingers. When the fingers are swung to position the whole peach opposite the saw, as shown in Fig. 3, the inner curved wall of the peach will be supported by the finger 230 and the upper and lower curved wall of the peach will be supported by the spaced apart fingers 232 and 234 and on opposite sides of the slots 239, the fingers being spaced apart by these long slots. In this position the rotary saw 251 will advance about its pivot 256 to saw through the flesh of the whole peach as well as through the pit. The line of severance will pass through the peach on a plane parallel with the greatest diameter of the pit and preferably through the greatest diameter of the pit, if such diameter of such particular peach happens to coincide with the fixed plane of oscillation of the rotating saw. In a large percentage of instances, the saw cut will occur to one side of the largest diameter of the pit. The oscillation of the saw is such that it passes into the slot in the upper and lower fingers 232 and 234 as well as through a vertical slot in the bottom of support 230. The saw in its upward movement is arranged to sever the peach into two parts. If desired, the swinging movement of the saw in its forward movement may be arranged to sever all but a relatively small cord of the whole peach. It will be noticed that during this sawing action the peach is supported on each side of the upper and lower peripheries, close to the line of severance, and not at points at right angles to the line of severance. This eliminates the tendency of the saw to bind as it goes through the hard pit.

The main fruit holding turret

Means is provided for holding the divided or half fruit sections in a manner so that such sections may be subjected to one or more treatments; specifically, so that the half peach sections carrying the half pits therein uppermost may be held preferably with the longer axes of the pits substantially coinciding with the radius line of the turret that passes through the fruit holder holding such half fruit, whereby the axis of movement of not only the pitting means but also the peeling means will lie approximately parallel to the longer axis of the pit, and whereby the peeling, pitting and discharging of the half fruit from the holding means is facilitated.

In the present instance there is provided a sleeve 139 which turns loosely on the main vertical shaft 136 and extends upwardly above the Geneva disc 140. This disc is fixed to the lower end of sleeve 139. The upper end of sleeve 139 carries a boss 272, see Fig. 3, having an upper disc 274 to which the bottom-most spider of the fruit holding turret 276 is adjustably bolted, the adjustment serving to provide angular adjustment of the fruit holding turret relative to its turning sleeve, whereby to provide an adjustment for insuring that the half fruit receiving and spreading transfer wings or members, hereinafter described, are at the proper closed together position at the time the fruit halves come onto them.

As clearly shown in Fig. 2, the turret disc is provided with a spider providing a mounting for the half fruit receiving means, herein specifically shown as cups. There are six of these cups, each disposed with its center located radially of the shaft 136.

Directly surrounding shaft 136 above turret 276, is located a long sleeve 278, see Figs. 17 and 25. This sleeve forms a mounting for a plurality of devices. It is formed at its upper portion with a preferably integral outstanding projection 280 which faces toward the transfer jaws. As shown clearly in these figures, this projection 280 is formed somewhat generally rectangular. In the side facing the feed-in station it is formed with a substantially central vertical guideway 282 of rectangular cross section. On either side there are provided horizontal bores 284 and 286. Bore 284 receives stationarily one of the rails 288 (Fig. 15) for the slidable carriage of the transfer jaws. The rail is held fixed therein by means of a set screw. The other bore, 286, receives a bushing 289 (Fig. 25) into which is turnably mounted the other round rail 290 (Fig. 15) forming the carriage slide. Lateral face 292 of the projection 280 is formed with a vertical guideway 294 of rectangular cross section. In addition, the walls of this lateral face 292 are provided with bolt holes to receive bolts 296 attaching to this face and closing the face of the guideway 294 a vertically extending bracket 298, the top of which overhangs the projection 280 and is formed with a laterally extending arm terminating in a bearing sleeve 300 in which is loosely mounted shaft 174, see Fig. 3. Shaft 174 is driven by shaft 154 of the feed-in turret and has a circular collar 302 pinned thereto, as at 304, which circular collar supports fixedly thereto by means of the same pin 304 the cylinder 178, upon the outer wall of which an endless screw 308 is formed.

The lower portion of long, vertical sleeve 278 is formed with a preferably integral, substantially rectangular, flat portion 310 which extends laterally of the sleeve. This plate is likewise provided with a rectangular raised boss 312 which terminates on each side short of the vertical sides of the flat portion 310 to provide two spaced guides 314 and 316. The front face of the raised boss 312 is formed with a threaded bore 318 into which passes a bolt 320 (Fig. 17) for firmly fixing to the raised boss a bearing block 322, having on its top spaced half bearings 324 and 326 so that the upper inner faces of the half bearings 324 and 326 are spaced from the front face of the flat portion 310 to provide room for intermeshing sectors 328 and 330 fixed on the inner ends of short shafts 332 and 334. These shafts oscillate in the bearings 324 and 326, and their outer ends have fixed thereto short levers 336 and 338, which each have at their upper ends outwardly and oppositely facing bushing sleeves 340 and 342. Bearings 324 and 326 are closed by upper half bearings 344 and 346 formed in a cap 348 fastened to the block 322. This bearing block 322 is formed at its bottom with opposed extensions 350 and 352 having threaded bolt holes. To each extension is bolted a vertically extending cam 354 and 356.

Means is provided for operating the half fruit spreaders from the central rotatable vertical fruit turret shaft 136 and for likewise operating therefrom the fruit transfer jaw mechanism. Above the upper end of the long, vertical sleeve 278 and adjacent the overhanging bracket 300 are positioned two cams 358 and 360 (Fig. 17). These cams directly surround shaft 136 and are pinned thereto for rotation with shaft 136. Each of these cams is formed with an endless cam race of desired shape, in each of which operates a roller 366 and 368. Roller 366 is mounted upon the upper end of a vertically reciprocable rack rod 370 which slides in guideway 294 of the upper bearing 280 on sleeve 278. This rack rod has fixed to its lower end a rack 372, the teeth of which, as shown in Figs. 17 and 25, mesh with the teeth of the sector 328.

The half fruit spreaders

This rack rod 372 slides against face 314 of the bushing 312. The bottom of this rack has bolted thereto a cross bar 374, to the other end of which is bolted a shorter, vertical rack 376 which slides against the face 316 of bearing 312. The teeth of this rack mesh with the teeth on the second sector 330, wherefore upon vertical reciprocation of the racks 372 and 376, the shafts 332 and 334 and their arms 336 and 338 will be oscillated.

Loosely turnable in each of the bearing sleeves 340 and 342 are short shafts 378 and 380 (Figs. 19 and 24). Each such shaft has integrally, as a part of one end, a small plate 382, 384, see Fig. 24, extending at right angles to the shaft. These plates carry the spreader arms or plates 386, 388, which are relatively thin, flat and preferably rectangular.

Means is provided for oscillating each spreader plate from the vertical position, in which position the plates abut one another, and in which position the fruit halves are received on either side thereof, as shown in Fig. 21, to a position in which the two plates are substantially horizontal and wherein each plate is immediately over a fruit holding cup and approximately three-quarters of an inch, more or less, thereabove. This is the half fruit depositing position, and is accomplished by the racks 372 and 376 and the toothed sectors 328 and 330 heretofore described.

Means is provided for throwing the center line of each spreader plate exactly 30 degrees from the parallel central axis of the two parallel shafts 332 and 334 which oscillate the blades to a position wherein the blades will lie, when horizontal, radially of the fruit turret 276 to correspond with the radial position of the center line 390 of the fruit cups, which line lies on the radius of the central axis of the vertical shaft 136 of the fruit turret, as shown in Fig. 2. This means includes the two spaced cams 354 and 356 cooperating with the rollers 392 and 394 mounted on the ends of short arms 396 and 398, each having a sleeve 400, 402 keyed as at 404, 406, on the two shafts 378 and 380, see Figs. 17 and 24.

This motion of the spreaders demands that the outer ends of the spreaders describe a much greater arc than the innermost ends, in order to overlie the radial cups. This in turn requires means cooperating with the spreaders, and preferably on the spreaders, for positively holding the severed peach halves on the spreaders during this arcuate movement. In the prior Ewald machines disclosed in pending applications, the spreaders are provided with substantially central sharp fins that cut into the central relatively soft core of the half pears or other half fruits and tend to hold the half pears on the spreader during the quick downward flip thereof. In addition, the transfer jaws were positioned relatively close to the half pear on the spreader and moved directly outwardly away from the spreader and half pear as the spreader moved downwardly to deposit the half pear in the cup, whereas in the present peach machine, due to the necessity of the additional arcuate movement imparted to the outer portion of the spreader, the transfer jaws cannot be positioned so close to the spreader to provide the additional support for the peach. Also, due to the presence of the hard pit, no cutting fin or blade can be placed on the spreader to hold the half peach from slipping down on the spreader. Therefore it is necessary to provide a bottom shelf or ledge on the bottom side of the spreader with outwardly flaring outer ends to guide and support the bottom peripheries of the half peaches, and likewise to provide a top holding means with outwardly flaring entry edges to guide and to overlie the upper peripheries of the half peaches as each half peach is transferred onto the spreader. This upper holding means is spring pressed normally to closed position and is moved outwardly by the entering half peach so as to close over the upper edge of the half peach and to hold it on the spreader.

Means is also provided for automatically shifting the holder outwardly in the down position of the spreader to release the half peach into the cup. To this end the bottom outer face of each spreader, see Figs. 21-24, is provided with a narrow ledge 410 having a downwardly flaring front lip 412. The upper outer face of each spreader is provided with a retaining clamp 414 formed by providing the upper outer face with two spaced outstanding lugs 416 and 417 bored to receive a pin 420 which also passes through two spaced lugs 418 on the outer face of the elongated clamp 414. A tension spring 422 is coiled about the pin and arranged normally to resiliently hold the clamp 414 snugly against the upper outer face of each spreader. The front wall of each elongated clamp flares outwardly as at 424 so as to direct the peripheral wall of the half peach beneath the clamp, thereby slightly to open the clamp and to hold the upper edge of the half peach against the spreader plates 386 and 388 while at the same time the ledges 410 will hold the lower edge of each half peach. The rearmost portion of each pivoted clamp is provided with an integral releasing arm 426 which, when the spreader plates reach horizontal discharging position, as shown in dotted lines in Fig. 19, contacts a fixed stop 428 on a stationary part, whereby to open the clamp against the spring tension. In addition, each spreader plate is provided with means for ejecting the half peach from its surface when the spreader reaches horizontal position. This comprises an arm 430 pivoted at 432 within a cut-out 434 in each spreader plate and normally lying within the outer face of the spreader plate. Each such arm is provided with an extension 436 adapted on horizontal positioning of the spreader plate to contact a fixed stop 438 and swing the longer arm 430 of the ejector outwardly forcibly to eject a half peach downwardly into its cup. This ejecting movement takes place substantially simultaneously or in adjustably timed relation with the action of the arm 426 against the stop 428 for releasing the peach from the swinging peach distributing or spreader plates 386, 388.

*The fruit transfer mechanism*

Means is provided in association with the feed-in turret fingers and saw and spreader plates for transferring the severed or partly severed whole fruit from the first feed-in turret, past the saw, and for delivering the divided sections or half peaches onto the spreader plates for subsequent delivery into the fruit cups. To this end two parallel rod rails 288 and 290 are supported at one end in the bores 284 and 286, respectively, of the enlargement 280 on the upper end of the vertical sleeve 278, see Figs. 12-17. The opposite ends of these rails are supported in bearings on a cross brace carried by the frame at the vertical shaft 154 which operates the feed-in turret. Rail 288 is fixed against turning, whereas rail 290 is mounted in its bearing 289 and its opposite bearing for oscillation. Cam 360 through its roller 368 vertically reciprocates a slide 440 carrying a pivotally mounted block 442, which block slides between furcations 446 and 448 on an arm 450 keyed on shaft 290. The opposite end of arm 450 carries an offset arm 452 on which is rigidly mounted an elongated rail 454 extending parallel to the rail rods 288 and 290. Bolted to the upper side and under side of the projection 280 are two guides 456 and 458 which form a vertical slideway for the vertical slide 440. In addition, the lower guide 458 has bolted to its front, as at 460, a bracket 462 for supporting a stationary spreader blade 464 interposed between the rear position of the saw 250 and the oscillatable spreader blades 386 and 388, see Fig. 3. This stationary blade shifts the peach halves laterally out of contact with the saw and onto the oscillatable spreaders.

A transfer jaw carriage is composed of two parallel sleeves 466 and 468 connected at opposite ends by castings 470 and 472. Rotatably mounted on sleeves 466 and 468 by means of concentrically surrounding sleeves 467 and 469 are two depending arms 474 and 476 maintained always at the same distance mutually from the center line 480 by means of intermeshing gear sectors 482 and 484.

Projecting from one side of sleeve 469 is a lateral lug 486 carrying a roller 488 which is adapted to lie on the rail 454. Slidable on the rail 454 is a shoe 490 having a pin threaded into its under side and depending therefrom. A coiled spring 492 surrounds this pin between the shoe and a lug 494 which is screwed into the lower part of arm 478, and through which the pin moves freely. The function of this spring connection is to permit the cam mechanisms 360 and 368 and the arm 452 that oscillates the rail 454, to force the rail to its down position even if the arm 478 is pushed outwardly due to an oversized or larger half fruit engaged by the cup on the arm 478. This spring 492 also serves to maintain a proper tension upon the jaws on arms 474 and 478 to transfer the fruit.

The transfer jaw carriage is provided with an adjustable travel over and above the travel given to it by the screw 178. This is done by a lever 496, see Figs. 15 and 16, pivoted to casting 472 by a stud 498. This lever carries a dog 500 which is secured to the lever 496 by a stud 502 and which runs in the endless groove of the screw 178. As the carriage moves to the left through the endless groove and its dog 500, it reaches a point where the lever 496 contacts an adjustable pin 507 dependent from a bearing support casting 506, see Fig. 3. Since this contact stops further movement of the outer end of the lever 496, and since at this point the dog 500 on the lever is still continuing to travel to the left, the outer end of lever 496 will be swung to the left about stop 507 as a fulcrum, and since the transfer jaw carriage is rigid with the pivot 498, the carriage itself moves to the left an additional distance beyond the distance it is caused to travel by its endless screw. In addition, this mechanism provides a longer rest period at the points or times when the jaws are transferring fruit from the feed-in jaws to the transfer jaws and from the latter to the spreaders.

On the return movement of the carriage, the first action is that of dog 500 in shifting the lever 496 about its pivot 498 in a direction to the right until the free end of this lever strikes an oppositely adjustable stop 508, whereupon the continuing movement of the dog to the right compels movement of the carriage to the right through the pivotal connection 498. This additional travel of the carriage on the rails is limited by adjustable stop means 505'.

To accommodate differences in thickness of relatively thicker or thinner halves of fruit on the same peach when grasped by the transfer jaws 474 and 478, one of these jaws is broken and hinged and provided with supplemental springs to make up this difference in thickness. For instance, arms 474 and 478 come together in unison to a common distance from the central plane 480, Fig. 12. Arm 474 is provided intermediate its height, as at 510, with a pivotal connection to a lower portion 512. Arm 512 below pivot 510 has an outstanding lug 514 between which and another lug 516 on the upper part of arm 474 a coiled spring is confined at each end. In operation this provides the necessary resilience to take up the variation in thicknesses. If desired, both arms may be provided with this type of resilient adjustment.

To provide against turning the peach as it is dragged over the surfaces of the saw, after splitting, there is provided on the inner surface of the transfer cups 481 sharp, knife-like fins 518, 520, which lie in a vertical plane to prevent the peach halves turning in the transfer cups about horizontal axes. This means preserves the positions of the halves of the peaches during the transfer from the sawing station to the pitting station.

The pitting mechanism

The pitting mechanism includes a preferably vertically reciprocating carriage 600 (Figs. 32 to 35 and 43 to 46) which is preferably horizontally disposed. This plate 600 has its opposite ends provided with depending furcations 602 and 604 suitably bolted thereto, as shown in Figs. 32 and 34. These furcations provide vertical guideways 606 for slidably receiving a vertically, resiliently adjustable pitting frame 608. This frame 608 has spaced portions receiving pins 610, 612, which pins have heads 614, 616 on their bottoms below the frame. The upper portions of these pins pass through the bores of the carriage 600 and are provided thereabove with adjustable stop collars 618 and 620 which determine the lowermost positions of this pitter frame 608 with respect to the carriage 600. The upper ends of these pins 610 and 612 are provided with coiled springs 622 and 624 spaced between the collars 618, 620 and the top of the carriage 600. These springs resiliently support and balance the frame 608 on the carriage. One end of the pitting frame 608 is heavier than the other because of the gearing thereat. These two adjustable springs 622 and 624, when adjusted, serve to balance the weight of the main pitter frame 608 with respect to the carriage 600, and also reduce to a minimum the pressure exerted on the tender face of the peach. This pitter frame 608 is preferably formed like an inverted yoke and comprises a horizontal cross portion and two legs 626, 628. Each of these legs is a straight, vertical leg and is provided with a bearing. Leg 626 is provided with a bearing 630 and opposite leg 628 is provided with a bearing 632. The bottoms of the vertical guideways 602 and 604 of the main carriage 600 terminate at 634 and 636 respectively. Vertical leg 628 has bolted to it an extension leg 637 formed with a lateral horizontal extension 638, provided in turn with an upstanding boss 640. The boss and the lateral extension are bored to receive a vertical shaft, later to be described. Extension 638 is formed with a vertical leg 642 having a bearing 644 which is bored and is in registration with the bore in the bearing 632 of the adjacent leg 628. Thus the vertical legs 626, 628 and 642 slide vertically in the vertical guideways of the carriage 600. The two bearings 630, 632 each have bolted to the under side thereof, as at 645 and 646, a short bar-like support 648, 650, which supports extend inwardly and each has a roller 652, 654 rotatably supported thereon. These rollers form supports for mechanism hereinafter described.

Bearing 630 clampingly supports a fixed shaft 656 by means of a nut 658, which shaft has on its opposite innermost end a boss 660 which is flattened on its opposite vertical sides to form a guide for slidingly supporting and guiding the apertured presser plate 662. A second short shaft 664 is loosely disposed on bearings 644 and 632. This shaft 664 has pinned thereto, as at 666, a bevel gear 668, and also has pinned thereto, at 670, in spaced relation therefrom, a collar 672 carrying a lever 674 which at its upper end is formed as a bored collar 676, to which is pinned a cross shaft 678. Bevel gear 668 meshes with a bevel pinion 679 fixed to shaft 680 which passes through the boss 640 on the extension arm 638. The upper end of this shaft is formed with an adjusting collar 682 and a coiled spring 684 is fixed to the collar and to the extension. A second bevel gear 686 meshes with pinion 679. This bevel gear 686 is pinned at 688 to a sleeve 690, through which the shaft 664 passes. This sleeve 690 oscillates in bearing 632 and extends inwardly to a collar 692 which is integral therewith. This collar 692 has an integral lever 694 which has on its upper end another collar 696 pinned to a second cross shaft 698 running parallel to the first shaft 678. Each of these shafts 678 and 698 has a long sleeve 728 and 730 loosely surrounding it. Each of these sleeves has intermediate its length a lug or arm 710, 712, to which are detachably fastened the pitter blades 714 and 716, illustrated in Figs. 39 and 43 to 56 and hereinafter described. Sleeve 728 has in addition an integral arm 700 having on its bottom an enlargement 702 (Figs. 47 to 51) formed with an elongated slot 704 through which passes the fixed extension shaft 656 carried by the bearing 630. This slotted enlargement cooperates with roller 652 so that such roller in certain positions of the enlargement will limit its downward movement.

The other elongated sleeve 730 likewise has integrally depending therefrom an arm 706, the bottom part of which forms an enlargement 708, likewise provided with an elongated slot 709. This enlargement 708 in turn cooperates with roller 654 so that the latter in certain positions of the enlargement will limit the downward movement of the enlargement 708.

The extreme inner end of shaft 664 is of reduced diameter, as shown at 718, Fig. 42, and is provided with a bushing 720 which is flattened on its two opposite vertical sides 722, 724 slidingly to support and guide the opposite upstanding block 782 on the apertured presser plate 662.

The slots 704 and 709 in the enlargements of arms 700 and 706 are on an arc that corresponds to the distance between the center of rotation of the sleeves and the center of rotation of the shafts on which they are pivotally supported for oscillation.

The rollers 652 and 654 comprise means for preventing these slotted enlargements from dropping down when the arms 700 and 706 are swung to substantially a horizontal or diagonal position with respect to the presser plate 662, as shown in Fig. 49. If these arms 700 and 706 were to drop downwardly at this time it would permit the pitter blades carried by the sleeves 728 and 730 to open and to swing downwardly and into the body of the peach during the pitting operation, whereas it is necessary to cause the pitter blades to move in a truly circular arc and to keep them together to complete the severance of the under side of the half fruit. To this end the bottoms of the main pitter frame 608 are provided with these rollers 652 and 654 which are thus positioned immediately under the path of oscillation of each of these slotted arms 700 and 706 to permit free, unsupported swinging movement of each of said slotted arms 700 and 706 for about a distance equivalent to less than one-third of the way around the under side of the pit, at which time the under surfaces of these slotted enlargements come in contact with the rollers 652 and 654, thereby preventing each arm from dropping down and compelling each arm and hence each pitting blade to swing in a truly circular path and hence follow closely the contour of the under side of the pit. The ends of the slots 704 and 709 cooperating with the shaft 656 and 664 give control of the cutting edges so that they will meet properly at the finish of the cutting.

The function of the bevel gearing 668, 679 and 686 and the spring 684 is to provide tension between the pitter sleeve arms 700 and 706 through the bevel gears whereby to keep these arms together in their uppermost positions, see Fig. 33, and to provide sufficient spring resistance to be greater than the resistance offered by the drag of the pitter blades across the face of the flesh of the half fruit into contact with the marginal walls of the pit. At this time the pit offering greater resistance to the further dragging movement of these pitter blades, the spring resistance of the spring 684 is now overcome and the pit stopping this dragging movement of the blades in their inward pit-locating movement, the blades then start to swing down through the flesh under the pit, around a common fulcrum or pivot point. The central axis about which these arms 700 and 706 now swing is the axis of the stationary shaft 656 and the axis of the coaxial oppositely disposed movable shaft 664. During the locating movement of the pitter blades, the axis about which each of the pitter blades swings is the axis of the elongated sleeve that carries such particular pitter blade. For instance, referring to Figs. 47-51, inclusive, during the pit finding or locating movement of the pitter blades, blade 714 will first swing about the axis of the shaft 678 carrying the sleeve 728, and blade 716 will first swing about the axis of the shaft 698 carrying sleeve 730. However, as soon as the pitter blade contacts the side walls of the pit, the pit will then form a fulcrum preventing further independent swinging of the arms 700 and 706 about their respective axes 678 and 698 and thereafter the said arms will swing about the common axis 656, which is the central axis of the coaxial shafts 656 and 664. By this means the pitter blades which swing with these arms will then follow closely, in a truly circular pathway, the marginal outlines of the pit, thus reducing to a minimum the amount of flesh cut from the fruit during the pitting operation. In short, the pitter blades will shift across the cut face of the half fruit, swinging on their respective axes 678 and 698, until each blade locates its respective edge of the pit, and thereafter each blade will then swing about the common axis 656 which is located very close to the cut face of the half fruit. The location of this shaft 656 is adjustably predetermined so that the arcuate swing of the pitter blades will be of just sufficient depth to cut cleanly around the under side of the pit without digging any extra amount of flesh of the peach.

The bevel gears of the gearing 668, 679 and 686 equalize and cause the pitter blades to move uniformly through their cutting strokes, i. e., they tend to prevent one blade running ahead of the other.

Each sleeve 728 and 730 is provided intermediate its length with an outstanding short furcation 732 and 734, to which is pivoted the bottom of an arm 736 and 738 (Figs. 32 and 43 to 46) curved outwardly at its bottom and extending upwardly. Means is provided to compensate for varying thicknesses of the half fruit to be pitted or cored. To this end the top of each arm 736 and 738 is slotted as at 740, 742, to slidingly engage a pin 744, 746 adjustably carried by a block 748 fastened to a vertical rack 750 supported by a guide 752 on the carriage 600. This rack 750 is reciprocated by a sector 754 pivoted at 756 on a mounting 758 on the carriage 600. This sector in turn is oscillated by an arm 760 having a slotted hole 762 engaging a pin 764 on a universal 766 on the end of an adjustable rod 768 operated by the vertically disposed oscillatable shaft 50 (Figs. 2 and 4) hereinbefore described.

Figure 43 shows the drive studs 744, 746 in the upper end of the slot, thereby holding the pitting blades in an open position as the assembly lowers down onto a half peach. Figure 44 shows the gauge plates 662 in contact with the fruit, and an example is depicted wherein the fruit is thick enough to raise the assembly to a point where the drive studs 744, 746 are in the center of the slots. If these slots were not provided, a thin piece of fruit would not get proper contact and a thick piece would be smashed, due to the fact that studs 744, 746 were rigidly placed at this time.

At the initiation of the pitting operation, in view of the fact that the successive half pits may be located either centrally of or to either side of the center of the half peach to be pitted, we have provided means for causing the pitting mechanism to travel laterally across the cut face of the half fruit and to contact the peripheral edge of the severed half pit before digging into the flesh of the fruit at the cut face thereof. In order to accomplish this action, the pitting means, which is shown particularly in Figs. 36, 37 and 38, is provided with one or more, preferably one, relatively sharp points centrally located, which is the only part of the pitting means which actually penetrates the flesh of the fruit at the cut face thereof prior to the actual pitting operation, during which operation the cutting edges of the pitting means actually cut into the body or flesh of the half fruit, starting at the cut face of the half fruit at the peripheral or marginal edges of the severed half pit and following along the under surface in a true circular path and substantially exactly cutting the flesh of the peach cleanly at the juncture of the pit curved surface and the flesh.

To carry this out, at the initiation of the pitting operation it is desirable to project the point or points of the cutting edge of each pitting blade a predetermined short distance slightly into the flesh of the fruit at the cut face of the half fruit and on each side of the severed half pit. This projection of each point on the pitter blade is relatively slight but is sufficient so that during the lateral shift of each blade across the cut face of the half fruit these relatively small points on each pitter blade cut through a slight superficial layer of the cut face of the half fruit, the cut being practically of a line width and being imperceptible, due to the stickiness and moist nature of the cut face of the half fruit, after it has been pitted and processed. This projection of each point on the pitter blade is sufficient, however, so that during the lateral shift these relatively small points on each pitter blade cut through the superficial layer of the cut face of the half fruit until they come into contact with the outer opposed edges of the half pit at the margins of the cut face, and since these points project slightly into the cut face this insures that the points of the pitter blades will contact the pit half slightly beneath the cut surface of the pit at its margin, whereby to insure that the pitter blades will thereafter be directed downwardly around the under surface of the half pit in their cutting movement, so that they will swing around, under or beneath the pit.

Thus means is provided for adjustably insuring and also determining this initial projection of the points of the pitter blades a desired relatively small depth into the cut face of the half fruit on opposite sides of the half pit. In the present embodiment of the invention there is provided means for contacting the cut face of the half fruit on opposite sides of the central seed containing section, to wit, in the case of a peach or apricot the half pit, and thereafter utilizing this contacting means adjustably to determine the depth of projection of the pitter blades into the cut face of the half fruit as before described. In the specific construction utilized, the presser plate 662 is preferably formed of two flat, shallow plates 770 and 772 (Fig. 40). The central edges of these plates are cut out, as at 774 and 776 and these cut-outs are in registration to provide an opening or aperture considerably larger than the greatest diameter of the half pit in order to accommodate variations in eccentric location of the various pits in successive half fruits. By spacing the plates apart as at 778, a sufficient aperture is provided. At opposite ends of these plates, blocks 780 and 782 (Figs. 41 and 42) are provided, which in general shape are similar except for a vertical guideway. Each block is formed with a pair of oppositely projecting arms 784 and 786 to which an end of the presser plate is secured, as at 788.

In addition, each block is formed centrally with an upstanding portion generally rectangular and provided with a vertically extending rectangular cut-out 790, 792, forming guideways to receive the bushing 720 at one end and the flattened portion 660 of shaft 656 at the other. This is for the reason that shaft 656 does not rotate and therefore the flattened portion 660 holds the presser plate in horizontal alignment and still permits vertical movement. Since shaft 664 rotates, a bushing is provided principally to take up undue wear in operation, otherwise the reduced shaft 718 could slide and rotate in a groove 792 made to fit its own diameter.

The top of each cut-out 790, 792 is closed by a plate 794 secured by a screw 796. The cut-out guideway 790 of block 780 is narrower than the cut-out guideway 792 of block 784. Cut-out 792 receives the bushing 720, Figs. 40 and 42, on the inner end of oscillating shaft 664. The vertical sides of this bushing and of the cut-out are parallel and vertical, whereby to permit the presser plate and bushing to have relative vertical movement while the plate is prevented from rotating. Similarly, the somewhat smaller cut-out 790 of block 780 has parallel vertical walls slidingly to receive the flat, parallel, vertical walls 660 of an otherwise round sleeve 656 held securely against rotation in the bearing 630 by the nut 658, Fig. 32. It will be remembered that shaft 656 is stationary, while coaxial shaft 664 oscillates, being oscillated by arm 674 integral with sleeve 728, in turn oscillated by lever 736 from the sector and rack mechanism shown in Fig. 32. In addition, each block is provided with a centrally depending portion 802, 803, each bored vertically and threaded to receive an adjusting screw 806, 808, the upper ends of which are adapted adjustably to contact, and in one position support, the bottom portion of the bushing 720 in the case of the block 784, and the circular sleeve 660 in the case of block 780. The height of each vertical guideway 790, 792 is sufficient to provide a space between the bushing 720 and the sleeve 660 when supported on their respective screws and the top plate 794 of each block. The adjustment of the screws through the blocks in a clockwise direction will raise the pitting blades relative to the presser plate so that they will not project downwardly through the apertures in the presser plate as far as they would project prior to turning the screws. Adjustment of the screws in the opposite direction will serve to lower the pitter blades relative to the presser plate, whereby when the presser plate contacts the cut face of the half peach the bottom edges of the pitting blades will adjustably project more or less into the cut face of the half fruit, which is to say that the pointed central tips 786 will so project.

On lowering movement of the pitter carriage 600, the presser plate is brought to its lowermost position. If no half fruit is in the cup the presser plate 662 will either rest upon the top of the cup, or if no cup is there, the top plates 794 closing the tops of the cut-out guideways 790, 792 will contact the tops of the pin 660 and bushing 801, respectively. This pin and this bushing rest upon the tops of the screws 806 and 808, respectively, when the presser plates rest on the fruit. These screws provide means for regulating the depth of projection of the cutting edges below the under surface of the presser pads or plates 770 and 772. These cutting edges must extend below far enough to assure closing in under the pit. Now, if upon lowering the pitter head a cup is in proper position and the head contacts a half fruit to be pitted, such as a half peach with its half pit unsevered from the half peach, the presser plate 662 will first contact the upper cut face of the half fruit and there will be relative vertical movement between the blocks 780 and 784 fixed to the now stationary presser plate and the still lowering pin and bushing 660 and 720 until said pin and bushing contact the tops of the adjusting screws 806 and 808. Thus when the presser plate contacts the cut face of the fruit and can move no lower, and when the presser plate screws 806, 808 have been adjusted to the correct setting, the points of the pitter blades will project through the opening in the presser plate the desired amount and the points 786 on the pitting blades will be projected the desired distance into the cut face of the half fruit on opposite sides and spaced from the half pit.

If too much of the half fruit should project above the upper rim of the fruit cup—that is, if the half section of the fruit should be of extraordinary size, then the entire main frame 608 will rise vertically relative to the pitter carriage 600 in the frame plate guideways, the springs 622 and 624 in this action taking the weight of the frame off the fruit face, the slots 740 and 742 between the actuating arms 736 and 738 and the rack 750 permitting this rise of the main frame. At this time the pitters are in an outwardly swung position, as shown in Fig. 47, and the sleeves 728 and 730 are pressed together by the spring 684. On preliminary downward movement of the rack 750, the arms 736 and 738 first swing the blades inwardly across the surface of the fruit, the points 786, Fig. 36, cutting slightly thereinto until these points strike the periphery of the pit. During this movement the pitter blades have swung about the individual axes 678 and 698. When the blades strike the periphery of the pit at the cut face of the fruit, the blades then swing or pivot about the common axis 656 of the coaxial shafts 656 and 664. If, during the swinging of the pitter blades about the separate axes 678 and 698 which are relatively remote from the cut face of the half fruit, the pit should be off center of the fruit, as in Figs. 52-56, inclusive, and one blade only contacts the pit, the other blade still approaching the pit, the approaching blade will continue its inward pit-locating motion until it also contacts the marginal edge of the pit. Thereafter, the blades striking the pit, the blades will then swing simultaneously about the common axis 656, thereby swinging the blades downwardly arcuately under the pit, cutting the flesh closely adjacent the pit, the blades tending to follow a true arc of a circle, the center of which is the axis 656 and the radius of which is the distance from the axis 656 and the underside of the pit wall.

As shown in Figs. 47-51, during the movement of the pitter blades from afar up to and around the pit for approximately the first one-third of the distance under the pit or somewhat less than the first one-third, the slotted arms 700 and 706 are out of contact with the rollers 652 and 654; but from the one-third distance on, these arms 700 and 706, due to their eccentric shape, will have their lower rounded bottom portions contact the upper surface of these rollers and will therefore be prevented from dropping and will compel the pitting blades to swing in an arc of a true circle, which will keep the pitting blades up against the under surface of the pit instead of digging down deeply into the flesh of the fruit beneath the pit. In short, these supporting rollers compel the pitting blades to make a shallow cut, thus following the natural contour of the pit. In addition, due to the construction wherein the pivoted actuating arms 736 and 738 moving downwardly are pivoted to arms 732 and 734 disposed substantially at 90 degrees to the face of the pitter blades, these actuating arms 736 and 738 tend to cause the blades to swing in a true circular arc closely following the curvature of the under side of the pit.

Just after the pitting blades 714 and 716 have started under the pit, the whole assembly rises so that the fruit is held clear from the cup, thereby causing the weight of the pitter pad assembly 662 to exert a force or pressure on the flesh only of the half fruit at its cut face in a direction away from the pitter blades, thus effecting a cut close to the under surface or peripheral curved wall of the pit. This action insures the cutting of a minimum of flesh of the pit, whether the pit is large or small.

The construction is such that the pit is discharged away from the pit cavity from which the pit has been severed. That is, the pit is released from the pitting blades in such a manner that the pit drops between the cups as the turret turns to place the succeeding peach in position for pitting. In this action the pitting cam operates to open the pitting blades at the proper timing intervals and in such a manner that the pit drops between the cups as the turret turns to place a succeeding peach in position for pitting.

The pitting blades

The preferred construction of the pitting blades 714 and 716 is shown clearly in Figs. 36, 37 and 38. These blades are drop forged from sheet metal. They include a straight, substantially rectangular portion 751 attached to the arms 710 and 712 of the pitter carrying sleeves 728 and 730 and are adapted to oscillate or swing in an arc toward and from the cut face of the half fruit. The main body 751 of each blade has integrally formed therewith a curved, relatively narrow blade member 753 curved laterally out of the plane of the body 751 and provided with an opening 755. The central portion of the curved cutting edge 757 is provided with a point located in the same plane of the curved portion 753 of the blade. The arcuate cutting edge 757 conforms somewhat to the elongated curvature of the peach pit when constructed for pitting peaches. The point 781 on the edge of the blade is desirable as it allows some portion of the blade to get down to the cut face of the fruit whereby to contact the edge of the pit without causing the main portion of the blade to mar the surface of the flesh during the pit locating operation. The opening 755 in the blade is provided to permit the maximum curvature of pit wall to pass or project therethrough during the pitting action, which eliminates tearing action which would otherwise occur if the blade were not apertured. A pit is wider than it is deep, and with a solid blade cutting would occur only part away and then the pit would be torn out, leaving a rough, jagged, unsightly cavity. This relief is due to the inner arcuate wall 759 forcing the pit upwardly away from the flesh of the fruit. It will be noted that each pitting blade during the actual pitting operation swings only approximately through one-fourth of an arc of a complete circle, the two blades finally meeting at the bottom of the pit to complete the severance of the half pit.

The function of the rollers 652 and 654 acting in conjunction with the slotted enlargement 704 and 709 on the rounded lower ends of arms 700 and 706 is to provide means for supporting the pitting knives after they have traversed part way along the under side of the half pit and thereby compelling the blades to follow the under side outline of the half pit. If the rollers were not present, after contacting the under side of the half pit and pivoting about the common axis 656 the pitting blades would tend to move downwardly into the flesh of the half fruit beneath the pit and would dig very deep cuts into the flesh, which would be wholly undesirable. By suitably shaping the arc or curvature of the portion 757, see Figs. 47–51, when the pitter blades have moved arcuately approximately one-third of the distance, and this length is preselected and may be changed by altering the shape of the portion 757, around the under surface of the half pit, the arms 700 and 706 by such time will have swung upwardly sufficiently so that the rounded cam-shaped portions forming the bottom portions of the arms 700 and 706 will have shifted to now rest upon the rollers, and from there on, during the subsequent swinging movement of the arms 700 and 706, these arms and hence the pitting blades will be confined to a circular movement which will closely follow the curvature of the under side of the half pit.

By reference to Figs. 2 and 39 of the drawings, it will be noted that when a half fruit is brought by the turret beneath the vertically shiftable pitting head, the pitting means 714 and 716 are positioned on opposite sides of the pit and that the pitting means moves about an axis substantially parallel with the longer or longitudinal axis of the pit, the blades conforming to the curvature of the pit that corresponds with this longitudinal axis. This is the preferred arrangement.

The half fruit holding means

Except for the size and round shape of the cups to accommodate peaches in lieu of pears as illustrated in the prior filed applications of Mark Ewald and except for the absence of grooves and except for a greater shallowness in the depth of these cups, their construction and operation is identical to the cup structures disclosed in said prior mentioned Ewald applications.

Referring to Fig. 6, the turret disc 276 is provided with a plurality of radially extending spokes 770' uniting with a rim or web 772' forming an intermittently rotating spider. At equally spaced angular intervals about this spider the web is formed with a vertical countersink suitably bored and threaded to receive a bolt 774'. The shank 776' of a half fruit holding means is thus removably mounted in each one of these countersinks on the web. In the present instance six half fruit holding means are so mounted. Each half fruit holding means preferably comprises a cup formed of two relatively hinged halves. One of the halves is stationary and is formed with the depending rigid shank 776' heretofore described as bolted to the turret web whereby to carry each complete cup intermittently to and past each operating station. The other half 780' of each cup is formed with rigid furcations 782' and 784' (Figs. 29 and 68). These furcations and the shank 776' of cup half 778' are provided with registering bores to receive a pivot pin 786', thereby pivotally holding the cup halves together in closed position or permitting the cup half 780' to swing outwardly from the fixed cup half 778'.

In order to cause an opening movement of the cup half 780', it is provided with a rigid depending arm 788' formed with a lateral offset 790' carrying a roller 792' which is adapted to be contacted by a lug 794' on the bottom of an arm 796' on the peeler head, soon to be described.

The peeling station

The construction of the peeling mechanism per se is claimed in pending application, Serial No. 78,508, filed May 7, 1936, by Mark Ewald and Henry Skog, now issued as Patent No. 2,242,243 of May 20, 1941. However, the combination of this peeling mechanism with the pitting mechanism with the fruit discharge mechanism and the scavenging mechanism in combination with the cup movements forms the subject matter claimed in the present application.

The present application also includes claims to the combination of half fruit holders spaced sixty degrees apart on a rotatable or otherwise movable carrier, in combination with means for depositing two half fruits in two of the adjacent fruit holders of said turret, and thereafter moving the turret and fruit holders and subsequently performing a pitting or peeling operation singly on a half fruit at one station and then sequentially and/or simultaneously performing the other peeling or pitting function upon the next succeeding half fruit and/or simultaneously upon the previously mentioned half fruit, whereby a sequence of half fruits is passed successively through the machine and whereupon eventually each half fruit will have sequential, individual peeling and pitting operations performed upon it as it is automatically passed in a predetermined path through the machine.

The important differences in the peeling mechanism and its cooperation with the fruit cups reside in the fact that in the operation of pitting the peaches, particularly the clingstone variety, the cups are more shallow than existing half pear holding cups, because it is important to have the gauge or presser plate 662 that determines the depth of penetration of the pitter blade points 787 into the cut face of the half fruit at the subsequent pitting station contact the cut face of the half peach and not the upper rim of the peach cup. By this means there is effected the positive positioning of the cutting edges of the pitting blades a predetermined distance into the cut face of the half fruit to initiate the pit locating action as hereinbefore described. It is not desirable to utilize an apertured paddle in pitting a peach as in coring a pear, because of the necessity of providing an aperture sufficiently large in diameter with relation to the different loci of the half pit in variant shapes of successive peaches operated upon as they pass through the machine. In short, in the average run of peaches the half pits will be eccentrically located with respect to the curved outer walls of the whole or half peach, which will require a larger range of locating or lateral travel of the pitter blades, which in turn demands a larger opening in the presser plate. If the presser plate were to be confined wholly within the inner wall confines of the half peach holding cup, the area of the cross section of the presser plate remaining would be too small and would tend to cut into the cut face of the half fruit, injuring its appearance. Therefore, in the case of pitting peaches the relatively large and wider presser plate is utilized—a presser plate which projects beyond the rim of the cup and this demands that the walls of the cup be cut down or be shallower.

At the peeling station it is important that the cup wall or that half of the cup which supports the half peach from or through which the peeling knife emerges be sufficiently high to support the entire curved wall of the half peach. Experience has shown that as the peeling knife comes up on its emerging travel through the flesh of the half fruit, if the outer wall at the peel is not supported, the presser foot which contacts the center portion of the half fruit will cause the outer peel carrying wall to project slightly over the cup rim so that as the peeling knife emerges it will form a diagonal cut in the flesh of the fruit at the juncture of the cut face of the half fruit and the peel. This is unsightly and ruins the appearance of salability of the half fruit. Hence in the present invention, in connection with the peeling mechanism and cup there is provided means for supplementally supporting that outer wall of the half peach or half fruit located at the arc or emergence of the peeling knife at the cut face of the half fruit.

Referring now to the details of construction of the peeling mechanism, and beginning with an inspection of Figs. 26, 29 and 30 of the drawings, shaft 14 is provided with cam yoke 800' formed with a roller 802' operating in cam race 804' on one face of the double faced cam 24. This cam yoke 800' is provided with a lateral arm 806' having a pin 808' adjustable in a vertical slot 810 formed in a depending ear 812 of a vertically reciprocable peeling slide 814 adapted to slide in guideways 816 of the main upstanding frame. In addition, the upright on which one of the guides 816 is attached is also provided with a bracket 818 having a lateral toe 820 threaded to receive an adjusting screw 822 adapted to contact the bottom of the slide 814 to adjustably limit its downward position, which in turn determines the thickness of the peel taken from the peach at the bottom of the cup. The adjustment 810 is for the same purpose, since it adjustably determines the throw of the slide 814. The screw stop 822 is provided to fixedly determine this adjustment in case the cam race 804' or roller 802' wear.

On the upper end of slide 814 is provided a horizontally disposed platform 824 bolted as at 826 to the top of slide 814. Platform 824 has bolted to its top, as at 828, a bearing 830 for shaft 832. This shaft has keyed thereto a short lever 834 connected at 836 to a universal 838 attached to a rod 840 connected to an arm in turn actuated by vertical shaft 36, see Fig. 2. The shaft 832 integrally has a toothed sector 842 oscillatably depending therefrom for actuating a pinion 844 on a shaft 846 in a bearing formed in depending arms 848 carried by the plate 824. These arms are spaced apart to receive therebetween this pinion 844. In like manner, the opposite side of the plate or platform 824 is provided with depending arms 850 and 852 forming spaced bearings to receive a shaft 854 on which is pinned a pinion gear 856 in turn actuated by a second sector 858 on the end of a depending arm 860 pinned to shaft 832; the end of this shaft has a second bearing 862 on the platform 824. In other words, shaft 832 on its opposite ends has sectors for driving pinion gears 844 and 856 on shaft 846 and 854 which actuate the peeling knife. This peeling knife is thus driven from both ends.

The inner ends of the two spaced short shafts 846 and 854 each have a rotatable block 858, 860, to each one of which is fixed a substantially triangularly shaped block 862, 864 with a groove and screw 866 and 868 for fixing thereto the end of the peeling knife 870. Thus the peeling knife is oscillated from each end. On each shaft 854 and 846, adjacent each block 858 and 860 is a round collar 872 and 874, loosely surrounding the shaft. The collar 874 has an integral curved arm 876 carrying a cross bar 880 which laterally interconnects with the arm 878 on the collar 872, and these two arms are generally horizontally arranged at one side of shafts 846 and 854, see Figs. 67 and 70. The cross bar 880 has extending from its edge a lug 881 which contacts a stud 883 which is attached or screwed into the peeling head 850, and thereby prevents the downward swing of the peeling cup extension 890 when the peeling head 824 rises, but will allow a sufficient movement upward to allow the peeling cup to close. This cross bar has two threaded openings 882 to receive threaded bolts 886 for fastening to the under side of the cross bar a detachable plate 888, the inner wall of which is arcuately formed, as at 890, and shaped to form a vertical extension of the cup rim 892 of the movable sector 780, see Fig. 31. By mounting the collars 874 and 872 loosely on the shafts 846 and 854, the plate 888 may rise and fall as the loose half 780 of the cup moves in under the action of its cam.

Keyed on shaft 846 adjacent to an arm 876 is a cam 882' which cooperates with a roller 891 on an arm 893 pivoted at 894 and having a depending arm 896 carrying screws 898 which pass through a slot 900 into threaded engagement with the arm 796. Another extension of the arm 893 which pivots at 894 is provided with a toothed extension 902, to which is connected spring 904. Teeth 902 provide an adjustment for soft or hard fruit. The farther out the greater the spring tension and the more the pressure of the cup segment upon the fruit in the cup. When fruit is hard it is harder to push over against the stationary section of the cup. Hence this adjustment 902. When the roller 891 is in the low part of cam 882, the arm 796 acts on roller 792 to close the cup sections. The spring 904 resiliently and yieldably holds the cup sections in closed position, and the cups may therefore accommodate fruit halves of various sizes. When the roller 891 is on the high side of cam 882, the finger 796 is moved away from roller 792, thereby releasing the movable section of the cup to allow it to open to normal size such that its inner walls are concentric to the axis of the shaft 854 and the axis of rotation of the peeling knife.

The upstanding platform 824 is provided with a substantially centrally disposed vertical bore to receive the presser foot mechanism, including the vertically operating pressure foot 910 which is adapted to keep the half fruit from turning in the cup during peeling and also to keep the half fruit down in the cup during peeling. The details of construction and operation of this presser foot mechanism are disclosed and claimed in the said pending application of Mark Ewald and Henry Skog, filed May 7, 1936, Serial No. 78,508, and therefore no further detailed disclosure is given here other than to say that when the peeling head descends to position the peeling blade relatively to the then stationary cup containing a half fruit with its cut face uppermost, the peeling pad mechanism is likewise brought down and is positioned so that the peeling pad 910 contacts resiliently and adjustably with the cut face of the half fruit and is locked by the rack mechanism 912 in such abutting position. During this contacting action the ejector pad 914 is resiliently forced upwardly into the countersink of the peeling pad until such time as the peeling head rises, carrying the peeling pad 910 with it. Since the inner spring 916 is urging the ejector foot downwardly, the ejector foot 914 will be held in contact with the cut face of the half fruit, whereas the entire peeling pad 910 will have risen out of contact with the cut face of the half fruit. This action will break the suction or adhesion between the face of the peeling pad and the wet, sticky, smooth surface of the half fruit. As soon as the peeling head 824 ascends sufficiently, it will likewise carry the ejector foot 914 out of contact with the half fruit. The adjustment 918 is to vary the tension of the peeling pad on the half fruit to accommodate the tension pressing down on relatively hard or relatively softer fruit so as to prevent injury thereto while maintaining the required pressure. The double rack teeth 912 provide a fine setting for the single pawl or tooth 920 which as the presser foot descends into contact with different sizes of successive half fruit, rides freely over the successive ratchet teeth and takes a desired setting of several vertical settings with respect to the series of teeth on the ratchet mechanism. This is due to the spring 924 constantly urging the racks 912 toward the tooth 920. As the peeling knife descends into the half fruit, the tooth 920 is incapable of rising against the rack teeth and therefore the presser foot is firmly held in its adjusted position until released by the cam roller 922 actuated by cam 924 on the shaft 832 to urge the ratchets 912 laterally out of contact with the pawl or tooth 920, thereby releasing the peeling pad and whereby to now permit the free ascent of the peeling pad with the ascent of the peeling head.

By reference to Figs. 2 and 29, it will be noted that when the half fruit is positioned under the peeler head, the axis of turning of the peeler mechanism will be substantially parallel to the longitudinal axis of the pit, whereby to facilitate the peeling operation.

*The processed half fruit discharge*

The fruit discharge mechanism is mounted on the vertically reciprocable frame that also carries the peeling and pitting heads and therefore operates in timed relation thereto. Referring to Figs. 57-60, inclusive, this discharge mechanism comprises a horizontal plate or support 930 having spaced upstanding bosses 932 and 934 through which pass vertical rods 936 and 938. Rod 936 has a bevel gear 940 fixed to its bottom, and rod 938 has a yoke 939 fixed to its bottom. A cross saddle or frame 942 is pivotally carried by the yoke 939 at one end and has a bearing 941 rotatably mounted on the rod 936 at the other end above the bevel gear 940. Cross saddle 942 has spaced depending arms 944 and 946 forming spaced bearings on which are mounted the opposite ends of shaft 948 carrying the half fruit discharge means. In the present instance this is shown as a paddle 950. One end of shaft 948 carries a bevel gear 952 meshing with bevel gear 940 whereby to oscillate the paddle 950 by means of the actuation of the shaft 948. The discharge paddle is preferably of the general type disclosed in certain of the prior Mark Ewald patents and applications. It is formed with flat, spaced apart members 954 and 956 forming therebetween a recess generally conforming to and slightly larger in cross section than the maximum diameter of the half pits of fruit being pitted. In addition, the upper surface of this paddle has pivoted thereto at 958 a flat kick-off member 960 which has an upstanding lug 962 above the pivoted part 958. This upstanding lug 962 is actuated by an arm 964 pivoted at 967 to that bearing 934 on the plate 930 through which rod 938 passes. The upper end 966 of pivoted arm 964 carries a roller 970 working in a cam slot 972 mounted on the upright corner frame 8 between the discharge station and the scavenging station. The rods 936 and 938 above their bearings on the plate 930 are provided with set collars 974 and 976 to prevent the yoke dropping below a predetermined point when the plate 930 is raised. These set collars are vertically adjustable. The upper ends of each rod are provided with caps 978 and 980, and between each cap and the upper portion of the rod bearing is located a coiled spring 981, 983 for normally resiliently supporting the saddle on the plate 930 so that when the plate is lowered the discharge paddle will be resiliently positioned upon the upper face of the half fruit in the fruit holder. Rod 936 is provided with a gear 982 and a keyway which receives a key pinned in the gear 982. This allows the rod 936 to slide freely through the gear and also provides a medium for transferring power from the gear to the rod 936, the rods 936 being disposed in a bearing between the bearing 932 for this rod and a yoke 974 against which the coiled spring 981 presses. This gear 982 meshes with a toothed sector 988 pivotally mounted on the plate 930. The sector 988 is reciprocated by a rod 990 in turn actuated by an arm 992 fixed to the upper end of oscillatable vertical shaft 36, see Fig. 2.

*The peel scavenging means*

After the processed half peach, properly peeled and pitted, is discharged from the machine by means of the fruit discharger or extractor, leaving the peeling in the cup, the cups then move with an intermittent movement to the peel scavenging station, whereat means is provided for discharging the peel from the cup and in such a manner as to permit the turret subsequently to convey the scavenged cup to the next station in the closed cycle, to wit, the half fruit receiving station, which is directly associated with the spreader plate, and to present a fresh cup to the peel scavenging means. See Figs. 61-66.

To this end, shaft 60 carries intermediate its ends mechanism for operating the scavenging mechanism. This comprises a gear sector 994 pinned to the shaft 60. Shaft 60 has pinned thereto a driving collar 1003 which has a laterally projecting lug 1005 (Figure 66) detachably insertable between two spaced driving shoulders 1007 on a friction collar 1004 hereinafter referred to. This sector has bevelled teeth 996 on its vertical side face meshing with teeth on a bevelled pinion 998 fixed on a cross shaft 1000 mounted on a bearing 1002 carrying a friction hub 1006. Shaft 60 oscillates through approximately 148 degrees. A friction collar 1004 is compressed about the hub 1006 by a spring 1008. This hub 1006 is rotatably mounted on shaft 60, while the segment gear 994, is keyed to shaft 60. Ninety-nine degrees of the 148 degrees of turning are used to turn the bearing with the shaft 60 to expel the peel. Shoulder 1010 on bearing 1002 then contacts a stop screw 1012. A continued rotation of shaft 60 causes the segment gear keyed to this shaft to turn the pinion 998, which now rotates the scavenger blade 1014 through 180 degrees. The friction band 1004 merely sets up a resistance so that the assembly will turn with the shaft until the stop shoulder 1010 contacts the stop 1012. On the reverse turning of shaft 60, the shoulder 1011 contacts the stop 1013. This is the position at which the peel is taken out of the cup.

The fruit receiving and discharging chute

By reference to Figs. 2 and 28, it will be seen that shaft 68 carries fixedly thereon an arm 1016 in turn carrying a fruit discharge trough 1018, which during the oscillation of shaft 68 as hereinbefore stated will be raised and lowered. In lowered position this fruit chute is provided with an arcuate portion 1020 carrying a rubber lip which is adapted to be lowered onto an edge of the cup and slightly to overlie the same in such a manner that when the fruit discharge mechanism shown in Figs. 57-60, inclusive, is operated, the rubber lip will serve to prevent the peeling from being discharged from the cup during the discharge of the half fruit. During this discharge movement the half fruit will be thrown by the ejector blade 960 laterally into the fruit discharge chute 1018, at which time said fruit discharge chute, through the instrumentality of a timed oscillation of shaft 68, will be thrown forwardly, whereby to positively discharge the processed half fruit away from the machine. During this forward movement of the chute 1018, the turret mechanism will have moved a succeeding cup into position so that upon a downward movement of the fruit chute 1018 as hereinbefore described, the rubber lip will be placed again into position to prevent the discharge of the peeling. The details of construction and operation of this type of fruit discharge mechanism are no part of the present invention, except as the same may enter into association with the elements of the present invention to form a new combination. The mechanism per se is disclosed in the prior filed application of Henry Skog, Serial No. 64,526, filed February 18, 1936, which has issued as Patent No. 2,242,242 of May 20, 1941.

Operation

In the operation of the machine, from the motor 21, when the clutch control handle, shown in Fig. 1, is properly thrown to actuate the main driving shaft from the motor 21, the various shafts, including the two horizontal shafts 14 and 16 and the various reciprocable slides shown in Figs. 27 and 28, are put in operation, whereby not only to advance the feed-in turret 162 step by step but also through the instrumentalities of the driving means shown in Fig. 6 of the drawings to actuate the main turret 276 carrying the cups intermittently in synchronism with the feed-in turret and at a speed twice as fast as that of the feed-in turret. In addition thereto, the endless screw 178 for actuating the transfer jaws will likewise be actuated to carry these jaws back and forth between the feed-in turret and the stationary blade 464 adjacent the oscillatable spreader blades. In addition, through the cam 156 the rotating saw will be oscillated between the feed fingers 232 and 234 of the feed-in turret and the stationary plate 464 as shown in Fig. 3. Likewise, through the instrumentalities of the various slides hereinbefore described, including the slide 814, see Fig. 1, as hereinbefore described, the slide 814 in its up and down reciprocation carries not only the peeling platform and pitting platform but also carries the whole fruit extracting and discharge mechanism, so that as the slide 814 moves upwardly the pitting, peeling and discharging mechanism will move upwardly away from the fruit cups, whereby to permit the main turret intermittently to move and present a fresh pair of cups to the oscillatable spreader plates while at the same time carrying a cup with a half fruit disposed therein with its cut face uppermost in correct position beneath the peeling head, and simultaneously therewith to convey a cup carrying a half peach, which has been properly peeled, to the pitting station for the pitting operation, and at the same time carrying the cup which has heretofore been at the pitting station to the fruit discharging station; and in addition shifting the cup which has been at the fruit discharging station and from which the fruit has been discharged, leaving the peel therein, to the scavenging station. In addition, that cup which has been scavenged at the scavenging station in the prior cycle of operations will thence be moved to the fruit depositing station. Inasmuch as the main fruit cup holding turret will move twice as fast as the main feed-in turret moves, there will always be two empty cups at the half fruit receiving station to receive the half fruits from the spreader jaws.

Referring now to the details of operations, the operator standing at the end of the machine as shown in Figs. 1 and 3, as the jaws 232 and 234 of the intermittently operated feed-in turret come opposite to such operator, the jaws are in open position. A whole peach is inserted in position with its butt end abutting the stationary jaw 230 and with the stem cavity end facing outwardly. The maximum diameter of the fruit is centered in the central plane of the jaws 232 and 234. Prior to the next intermittent movement of the feed-in turret, the jaws 232 and 234 will be permitted to close by the action of the cam means 246 acting on rollers 250, plus the action of the springs 237, so that before the feed-in turret moves, these fingers will have closed upon the peach, each finger moving a predetermined amount, which is equal exactly to the predetermined movement of the other finger. In other words, these two fingers 232 and 234 always center the peach with respect to a horizontal plane, uniformly at the same horizontal elevation.

In the next intermittent movement of the feed-in turret, the fingers 232 and 234 carrying the whole peach are moved to the peach stem cavity slitting station and stopped thereat so that through the instrumentalities of the mechanism shown in Fig. 9, the nose 197 will find the peach cavity and will hold the peach cavity firmly and gauge the depth which the blades will cut, while the spaced slitting blades 204 will move upwardly on either side of the nose 197 to slit the side walls of the peach at the stem cavity, forming two substantially vertical, substantially elliptical slits therethrough. Subsequent to this operation, the feed-in turret will again move intermittently to convey the whole peach to the position shown in Fig. 3. At this time the rotating saw 251 will be oscillating toward the left so that the saw will thence cut through the peach stationarily held between the two stationary fingers 232 and 234. The saw, in cutting through the peach, will pass through the slots in these fingers and also through a slot in the stationary finger 230. These fingers 232, 234 and 230 are preferably arranged to permit a complete severance of the whole peach into two halves, while stationarily held between the fingers 232 and 234. However, in some instances it is desirable to have the saw 250 swing inwardly, cutting through the half peaches to such extent as completely to sever the pit and to sever entirely all the flesh of the fruit except a small segment thereof, as shown by the dotted lines in Fig. 3, in which case the unsevered portion will serve to hold the peach sections together until grasped by the transfer jaws to avoid possible dropping out of the feed jaws. This also permits the utilization of a relatively smaller saw. During this cutting of the peach, the feed jaws press in on the peach only from the top and bottom and adjacent a line passing centrally approximately through the pit, thereby tending to spread and thereby eliminating any pressing action of the sides of the peach against the saw blade and whereby to provide a cleaner cut and preventing pit dust from embedding in the peach. In addition, this same operation gives the pit dust opportunity to pass out of the peach and not become embedded in the flesh.

Upon the completion of the severing operation, and through the instrumentality of the endless screw 178, the transfer jaws have now arrived opposite the severed peach held between the fingers 232 and 234, except that the transfer jaws are in open position. At this time the transfer jaws are moved laterally inwardly due to the mechanism illustrated in Figs. 12 and 13, whereby resiliently to grasp the peach from opposed lateral sides and intermediate the zones from which the peach is held by the fingers 232 and 234. Due to the resilient mounting of these transfer jaws as shown in Fig. 12 and as hereinbefore described, the variations in half peach sections are resiliently taken up by the transfer jaws, it being noted however that due to the intermeshing of the gearing as shown in Fig. 12, each transfer jaw will be bodily moved the same distance, yet due to the resilient mounting of the lower portions of the jaws, such portions can resiliently move to accommodate thicker or thinner half peach sections.

Slightly after the grasping of the peach by the transfer jaws, the fingers 232 and 234 are now positively opened and the transfer carriage is then carried forward away from fingers 232 and 234 before the feed-in turret starts to turn intermittently, and the transfer jaws are then carried in a straight line motion, as shown in Fig. 3, carrying the half peach sections across the saw 250. It is desirable to give the transfer jaw a greater speed of movement than the speed of oscillation of the rotating saw to the right, so that if there be any uncut portion of the flesh of the peach which has not been completely severed by the saw when the peach is stationarily held between the jaws 232 and 234, this remaining portion will be severed by being conveyed past the toothed cutting edge of the saw.

The two half peaches in the transfer jaws 481 are now conveyed to the right, as seen in Fig. 3, directly onto the stationary spreader plate 464 which is directly in the plane of the saw 250 and the entering edge of which is substantially of the same width as the saw. The spreader plate, if desired, is slightly thicker at its rear than at its front, so as to slightly spread the half sections on the stationary spreader plate 464 and as they are held between the jaws. The transfer jaws 481, continuing to move, next carry the half sections directly onto the oscillatable spreader plates which in this stage of the operation are in vertical juxtaposition, as shown Figs. 20 and 21, see particularly Fig. 21. In this movement the lower edge of the peach will contact the downwardly flared lip of the lower ledge of each spreader plate, while the upper periphery of each half peach will ride under the outwardly flaring lip 424 of each spreader plate, whereby resiliently to raise each clamping plate 414 of the spreader plate to permit the peach to be held on each vertical spreader plate between the lip 410 and this resilient clamping plate 414. This is shown in Fig. 21. At this time, through the action of the mechanism shown in Figs. 19-24, inclusive, the transfer jaws will move quickly outwardly at right angles to their direct line of travel, and after the jaws have so moved out, the spreader plates 386 and 388 will be shifted from a vertical position, shown in Fig. 21, to a horizontal position, shown in Fig. 19, it being noted that the outer ends of each spreader plate will move through a greater arc than the inner ends thereof. This is for the purpose of properly depositing one half peach into the radially aligned cups. In explanation, by reference to Fig. 2 it will be noticed that each cup has its central axis 390 radially of the vertical axis 136 of rotation of the main cup carrying turret, so that in order to prevent turning of a peach angularly from the parallel, straight line motion while carried in the transfer carriage, and while the half peaches are deposited onto the spreader plates and transferred thence to the cups, it is necessary to move the spreader jaws so that the peach pits will occupy the correct position in the peach cups when the cups carrying the half peaches with the pits are moved to the peeling and pitting stations. As the spreader plates are moved to downward horizontal position, through the action of the sector 328 intermeshing with the rack 372 and sector 330 intermeshing with the rack 376, and as the outer ends are moved arcuately through the action of the silent cams and rollers 392 and 394 running in the cam slots of the cam blocks 354 and 356, the trigger 426 of the releasing clamp will be opened by striking the angle plates 428 against the tension of the spring 422 to release the upper edges of the clamped peaches and at the same time the kicker discharge mechanism 430 will be actuated to positively kick the half fruit into the registering cups which are now immediately below the horizontally disposed presser plate by striking on the stop 438. It will be noted that during the transfer of the fruit sections by the transfer jaws, each fruit section is held in a predetermined plane by means of the relatively small pointed blades 518 and 520, see Fig. 12.

The action of the kick-off mechanism and of the trigger is accomplished by the stationary stops 428 and 438 as hereinbefore described.

Upon the depositing of each half fruit section in its cup, this being done simultaneously for the two half sections, the main feed turret carrying the cups will move in a counter-clockwise direction, as seen in Fig. 2, carrying one of said cups having a half fruit therein with its cut face uppermost and with the pit unsevered from the flesh thereof to the peeling station as shown in Fig. 2. Simultaneously the spreader plates will be swung back to vertical position to receive a subsequent severed whole peach.

Upon the arrival of the half fruit at the peeling station, in synchronized sequence the peeling head will descend through the operation of the slide 814. By reference to Fig. 29, upon the descent of this peeling head the half peach will be held in the cup, the two cup sections being in closed position at this time. The presser foot 910 will be resiliently brought down upon the cut face of the half fruit, the ejector foot 914 moving resiliently upwardly into the chambered presser foot. The reversed locking mechanism will then lock the presser foot in this adjusted position and in proper timed sequence the peeling knife, as shown in Fig. 31, will swing downwardly through the cup between the inner wall of the cup and the margin of the presser foot 910, whereby to start the peeling of the peach. As the peeling knife reaches the bottom of the righthand sector 780', and through the action of the arm 788' on the shiftable cup section, the latter will be thrown open. The peeling knife is constructed in accordance with the disclosure in the Mark Ewald application, Serial No. 750,151, filed October 26, 1934, now Patent No. 2,123,187, issued July 12, 1938. The blunt edge on the outer face of the peeling knife is formed at such an angle as to cause the knife not only to peel the fruit but likewise to force the half peach bodily toward the right, as seen in Fig. 31, whereby to cause the outer wall of the peach snugly to fit against the inner wall of the movable section 780'. In explanation, during the downward movement of the knife the two body sections have been forced together whereby firmly to force the half peach against the inner wall of the stationary section of the cup so as to cause the peeling knife always to pass through the peach at a uniform distance from the inner wall of the half fruit. Then as the knife reaches the bottom zone of the stationary section of the cup, the movable section of the cup will then open to a position such that its inner wall is exactly concentric with the center axis of the cup, and at this time the outer blunt face or inclined face of the peeling knife is formed at the proper angle, as disclosed in the aforementioned application, so as to force the half peach bodily over and firmly against the inner wall of the now shifted cup section so that the inner wall will present a true concentric continuation of the inner stationary wall of the cup, so that the peeling knife in its continued movement will swing upwardly through the peach, always at a uniform distance so as always to take the uniform thickness of peeling from the peach.

Due to the fact that in the subsequent pitting operation it is necessary to have a more shallow cup in order to permit the presser plate to flatly contact the cut face of the half peach as it comes down, and since the sections of half peaches are of variant size, it is necessary to have a shallow cup so that the presser plate will not contact the rim of the cup. In order to prevent the peeling knife, as it swings upwardly through the section 780' of the cup, from breaking off the flesh at the margin of the cup, it is necessary to reinforce the outer periphery of that portion of the peach which extends above the cup wall at this point. Therefore it will be noted that the reinforcing lip or rim 880, which is carried upon the peeling head, when the peeling head descends to peeling position will exactly coincide with the outwardly moved position of the cup section 780' and will form a continuation thereof, and that the peeling knife in swinging upwardly will act against this continuation, which reinforces the peach at this point.

Upon the completion of the peeling operation the peeling head will move upwardly in timed relation; the presser foot, being carried by the peeling head, will move upwardly, leaving the discharge foot 914 in contact with the sticky surface of the severed pit, thereby breaking any vacuum or adhesion between the presser foot 910 and the sticky surface of the half peach. As the peeling head continues to move upwardly, the presser foot is the last to be removed from the half peach. Upon the upward movement of the peeling head, the mechanism is unlocked for subsequent movement. When the peeling head has cleared the cups in the turret on its ascent, the turret is then given an intermittent motion in a counter-clockwise direction to carry the cup containing the peeled half fruit to the pitting station, as shown clearly in Fig. 2. At this station, the peeled half peach, lying on its severed peeling and lying in the cup, is brought under the pitting head and the releasing arm 788' has been removed from contact with the trigger 794' so that the sections of the cup grasp the half peach with its pit uppermost.

At the pitting station, when the slide 814 descends, the pitting head is brought downwardly, somewhat in the position shown in Fig. 32. The pitter gauge plates 770 and 772 are suspended by means of the slotted members 780 and 782, which in turn are slidably mounted on the stems 790 and 792. The members 780 and 782 have their adjusting screws 806 and 808 for the purpose of setting the gauge plates to a position where the points 787 of the pitting blades will extend below the peach contacting surface of the gauge plates a sufficient distance to insure contact with the pit as the blades close in to start the severing of the pit from the flesh of the fruit.

The blades must be opened a predetermined distance so that the cutting edges will always be away from the pit as the blades come down to sever the pit from the peach. The pitting blades, after contacting the cut flesh of the half fruit, will drag across the face of the fruit until they come to the pit before any cutting action of the blades takes place. The cutting blades are first opened by the upward movement of the arms 736 and 738. The predetermined distance of opening is governed by the slots 704 and 709. This is because the arms are parts of the sleeves 728 and 730 which carry the pitting blades, and since the ends of the slots come in contact with the shafts 656 and 664, no further outward movement of the pitting blades can take place. Upon descent of this pitter head, the gauge plate sections 662 are moved downwardly until they contact the cut face of the half peach, the cut face projecting above the upper rim of the cup sections. This downward movement through the proper adjustments heretofore described adjustably positions the points 787 slightly into the cut face of the half fruit on each side of the pit and in spaced relation therefrom.

Upon the actuation of the pitting arm 736, as hereinbefore described in detail, each pitter blade will swing about its individual pivotal axis 678 and 698, as shown in Figs. 47–51, thereby causing the blades to drag or move laterally across the cut face of the half fruit, the points digging only slightly into the cut face of the half fruit. To insure that the pitter blades preliminarily swing about their own individual pivots 678 and 698, the bevel gears 668, 679 and 686, together with spring 684 operate as follows: the spring 684 sets up on the shaft 640 and the pinion 679 keyed thereto a torsional urge which tends to turn the pinion. This turning is transferred through the pinion to the two intermeshing bevel gears 668 and 686. Bevel gear 686 is keyed to its sleeve 692 which is a part of the lever 694. This arrangement transmits the turning urge from the spring 684 to the lever 694, thereby creating a resistance to turning of the arm 694 about the fulcrum through the shaft 664. Bevel gear 668 creates a resistance to the turning of the arm 674 in the same manner but in the opposite direction. Since resistance has been set up to keep the arms 674 and 694 from turning about the fulcrum through shafts 664 and 656, the sleeves 728 and 730 will turn about the shafts 678 and 698, see Fig. 47, until the cutting edges of the pitting blades engage the pit. Now, since the pit offers a greater resistance than the spring urge from spring 684, the urge is overcome and the arms 674 and 694 turn about the fulcrum through shafts 664 and 656, thereby compelling the pitting blades to complete the cut around and under the pit. The bevel gears also function to compel the cutting blades to move about the pit at a uniform rate of speed whereby to insure a uniform cavity when the pit has been removed, by acting as stabilizers between the two arms. Since the gears 686 and 668 are meshed with the pinion 679, and since the arms 674 and 694 are keyed to the stems of these gears, the arms 674 and 694 must turn uniformly together about the common fulcrum through shaft 664.

The pit locating movement of each pitting blade brings each blade into contact with the outer curved wall of the pit at a point slightly below the cut face of the pit. At this time the blades form fulcrum points which thereafter causes each blade not to swing about its axis 678 and 698 but to swing about a common axis 656, which axis instead of being remote from the cut face of the half peach, as are the axes 678 and 698, is relatively close to the cut face of the half fruit. At this point the slot in each arm 700, 706 will shift with respect to the axial portion 656 so that as the end of each slot is reached by each respective shaft, the bottom portions of the arms 700 and 706 will have contacted the upper surfaces of the rollers 652 and 654. In other words, this contacting action takes place when the pitter blades have moved slightly less than one-third around the under surface of the pit. At this instant it is important that the pitter blades be supported so that they will swing in true circles about the axis 656 and snugly and closely follow the under wall of the pit until they meet at a point centrally of the under surface of the pit, thereby in their overlapping meeting completely severing the pit; for if these arms were to drop down they would be permitted to open, whereas it is necessary to keep them together to complete the severance of the under side of the half pit along the line closely following the outline of the pit. By inspection of Figs. 52–56 it will be noted that through the bevel gearing and the action of the spring 684, the spring serves to keep the arms 700 and 706 substantially together vertically or in their uppermost position and provides sufficient spring resistance, greater than the drag of the pitter blades across the face of the fruit flesh until the time of contact of the blades with the pit, which offering greater resistance to the further movement of the pitter blades, the spring resistance is now overcome and the pit forming the stopping movement of the blades, the blades will then start down through the flesh, which causes the arms now to swing about the central or common axis 656 instead of their own separate axes 678 and 698 as heretofore. The bevel gears 668 and 679 and 686 cause the blades to move uniformly through the cutting stroke; that is, they tend to prevent one blade running ahead of the other in the cutting, all as hereinbefore described.

In the preferred embodiment of the construction of the present application, the peach is raised slightly out of the cup after the pitting blades have started cutting under the pit, which action creates a downward pressure or force on the peach by the presser or gauge plates equal in intensity to the weight of these plates 662 and the weight of the end castings 780 and 784 secured thereto. While this lifting action at this point in the cutting operation is not wholly necessary in so far as the actual severing of the pit is concerned, it does tend to eliminate marring or bruising of the fruit during the pitting operation.

Upon the completion of the pitting operation the pitter head moves up in synchronized relation, the cup carrying the half fruit, peeled and pitted, and the half peach overlying the loose peeling. Upon intermittent succeeding counter-clockwise rotation of the cup-carrying turret, the cup carrying this pitted and peeled half peach is next brought under the half peach extractor and ejector, as shown in Fig. 2. Upon the next succeeding downward movement of the vertically reciprocating main slide, the discharge and extractor mechanism carried thereby, the details of which are shown in Fig. 57, is brought down upon the cut face of the half fruit. The paddle mechanism is first brought into the position shown in Fig. 59. At this time the paddle mechanism is turned to the position approximately shown in Fig. 60, which as shown is not completely inverted but is slightly at an inclination. This action inverts the half fruit. During this turning of the half fruit by the paddle mechanism, the rubber lip upon the fruit discharging chute 1018 slightly overlies the inner wall of the cup directly in the path of the loose peeling so as to prevent the peeling being turned out of the cup during this inversion. The direction of turning is in such a manner that the rubber lip prevents dislodgment of the peeling in the cup while permitting the turning.

As the paddle mechanism reaches the inverted position shown in Fig. 60, the cam 972 will actuate the striking finger 964 whereby forcibly to flip the discharge ejector 960 so as to kick the fruit laterally into the fruit chute 1018 and at this time simultaneously the fruit discharge chute is given an oscillatory movement by the shaft 68 to throw the chute forwardly to project the processed half peach completely out of the machine to a desired point, the ejection being sufficiently gentle so as not to injure the fruit, but causing it to be ejected from the machine.

The vertical movement of the paddle carriage in no wise interferes with the oscillatory movement of the fruit chute, since the latter is mounted laterally thereof. Upon the completion of this ejection of the processed half fruit the paddle mechanism rises with the main sliding head heretofore described and since the fruit chute has carried the flexible lip from the fruit cup, this cup upon the next intermittent counter-clockwise movement of the main feed turret, and with the loose peeling therein, will next move to the scavenging station. The cup, with the loose peeling therein, is positioned under the scavenging mechanism, which is shown in Figs. 61-66, inclusive, the scavenging mechanism is then swung downwardly to horizontal position and is thence turned to scavenge the peeling from the cup in the manner hereinbefore described. Subsequent to this scavenging movement the scavenging blade is then moved away from the cup and upon the next successive intermittent counter-clockwise movement of the cup carrying turret this cup will be carried to the next station, which as shown in Fig. 2 brings the cup to the first of the stations on one side of the spreader plates. In this construction the opening of the pitter blades after the severance of the pit is delayed to such a point as to release the pit to cause the pit to drop between the cups as the turret turns to place a succeeding peach in position for pitting.

The mechanism for raising the carriage that vertically shifts the pitting head carrying the pitting blades is the same mechanism that raises the slide 814. The cam race 804', see Fig. 26, is so designed that the slide 814 is maintained in downward position sufficiently long for the peeling knife, the fruit extractor and the peeling scavenger to have completed their work before the said slide 814 starts to raise. In certain constructions the cam race 804 is constructed and arranged so that after the slide has moved to position the pitting head to start the pitting cut as hereinbefore described, and during which time the pitting knives have begun their cuts in approaching directions around the under side of the pit, the slide is raised about ⅝ inch and then held there until the pitting blades have finished their cut, at which time the slide is then raised the full amount to clear the turret in its next intermittent turning movement. This raising of the pitter head slightly out of the cup after the pitting blades have started cutting under the pit causes the creation of a downward pressure or force on the peach by the presser or gauge plate as hereinbefore described.

In another design or construction of the cam race 804', the race is formed so as to make one gradual rise of the slide in its upward movement, which upward movement includes a portion of the finishing operation of the pitting cut. By this modification in the operation of the machine, a much smoother running machine is provided and at the same time there is secured the same effect of causing the pitting blades, as the pitting head rises, to tend bodily to lift the pit, due to the fact that the pitting knives have moved around and beneath the curved walls of the pit while at the same time the presser or gauge plate is still, by its weight, pressing downwardly solely on the flesh of the half peach and not on the pit, which as hereinafter described causes the pitting knives more closely to follow the curved under walls of the pit so as to cut the minimum of flesh from the half peach during the pitting operation. The pitting mechanism is claimed in our copending application, Serial No. 293,252, filed September 2, 1939, which matured as Patent No. 2,216,165, granted October 1, 1940, and the claims to the stem cavity trimming and peeling mechanisms and method are contained in our copending application, Serial No. 293,253, filed September 2, 1939.

It is thus apparent that the present invention comprehends a machine wherein a whole fruit, herein illustrated as a whole peach, while held in predetermined position and specifically with its suture plane disposed vertically is, while so held, cut into halves along a plane parallel to and closely adjacent such suture plane and thereafter the fruit halves are swung bodily to a predetermined position such that their cut faces lie substantially in a common plane and with the projections of their longitudinal stem axes intersecting at angles of sixty degrees. It is apparent that each one of the half fruits is thus disposed at an angle of sixty degrees from its next adjacent half fruit, whereby as the half fruits pass in succession through the fruit cups of the second turret they are maintained in uniformly spaced apart relation at angles of sixty degrees one to the other, with their cut faces in a substantially common horizontal plane. It is while the two half fruits are in this latter position and with their stem axes so positioned that they are both pitted and peeled, by forming cuts through the flesh of the half fruits arcuately about centers lying substantially on such longitudinal stem axes. In the case of the pitting cut the cuts are preferably provided by forming two simultaneous cuts beginning at the cut face of the half fruit and proceeding downwardly through the flesh arcuately around the half peach section, the line of cut being formed with the longitudinal stem axis as a center, and such stem axis lies substantially at the cut face of the half fruit.

It is within the contemplation of this invention to have the pitting cut made by a single pitting cut. The peeling cut is formed by a single arcuate cut beginning at the cut face of the half fruit and formed arcuately therethrough beneath the peel and terminating at the cut face of the half fruit, the arcuate line of cut being formed with the longitudinal stem axis as a center.

It will be noted from the above that the two half fruits simultaneously are deposited into the fruit holders or cups and are then shifted by the second turret so that the first cup with its contained half fruit is presented to the pitting station, at which station the half fruit is pitted, and thereafter the turret again moves sixty degrees to carry this pitted half fruit in its fruit holder to the peeling station where the above described peeling operation is carried out. At this second station and simultaneously with the peeling operation, the pitting operation is carried out on the second half fruit at the same time that the peeling operation is carried out on the first half fruit. It will thus be seen that the series of half fruits are carried through the machine sequentially, one being peeled at a time at the peeling station and the other half being simultaneously pitted at the pitting station, the pitting and peeling operations being carried out simultaneously and the turret shifting sixty degrees between operations.

What we claim is:

1. In an automatic machine for treating peaches, the combination of a shiftable turret having spaced means for receiving and holding a succession of whole peaches each with the plane of the maximum diameter of its pit when held being disposed parallel to the plane of action of flesh and pit severing means, means for severing the flesh and pit of the held peach into halves along a plane parallel to the plane of maximum diameter of the pit, a second turret having a plurality of spaced apart holding means each adapted to receive a severed half peach, said holding means being spaced on the periphery of the second turret, means for simultaneously conveying the two halves of each such severed whole peach in parallel paths while maintaining the halves in the same predetermined position and with their stem axes lying parallel to each other, means for bodily swinging said halves to deposit one of said half peaches in each of two adjacent holding means of said radially extending holding means of the second turret with the cut faces of the half peaches uppermost and lying in substantially a common plane and with the projections of their longitudinal stem axes intersecting at an angle of substantially sixty degrees, movable peeling means operably related to said turret, and adapted to peel the half fruit while held in the holding means, the axis of movement of the peeling means being parallel to the longitudinal axis of the pit, pitting means operably related to said turret and adapted to pit one of the half peaches while held in said holding means, the axis of movement of the pitting means being parallel to the longitudinal axis of the pit of said half peach, means operable for discharging the peeled and pitted half peach from the holding means, and means associated with said holding means for scavenging peel from the holding means.

2. In an automatic machine for treating peaches, the combination of a shiftable carrier having spaced means for receiving and holding a succession of whole peaches each with the plane of the maximum diameter of its pit when held being disposed parallel to the plane of action of flesh and pit severing means, means operable for severing the flesh and pit of the held peach into halves along a plane parallel to the plane of maximum diameter of the pit, a second rotatable carrier having a plurality of spaced apart holding means each adapted to receive a half peach, said holding means being equally spaced on the second carrier, means for simultaneously conveying the two halves of each such severed whole peach in parallel paths with their cut faces confronting and parallel while maintaining the halves in predetermined position, means for bodily swinging each of said halves about axes transverse and parallel to the axis of rotation of the second carrier to deposit one of said half peaches in each of two adjacent holding means of said holding means of the second carrier with the cut faces of the half peaches uppermost in a substantially common plane and with the projections of the stem axes of said half peaches intersecting at an angle of substantially sixty degrees, movable peeling means operably related to said second carrier, and adapted to peel one of the half fruits while held in the holding means, the axis of movement of the peeling means being parallel to the longitudinal axis of the pit of said half peach, pitting means operably related to said second carrier and adapted to pit the half peach while held in said holding means, the axis of movement of the pitting means being parallel to the longitudinal axis of the pit.

3. In an automatic machine for treating peaches, the combination of an intermittently rotatable first turret having spaced means for receiving and holding a succession of whole peaches, each with its plane of maximum diameter disposed vertically and centrally of the holding means and with the longitudinal pit axis of the peach disposed horizontally and radially of said turret, means for severing the flesh of the peach and pit substantially along and parallel to the plane of maximum diameter of the peach, a second intermittently operable turret having a plurality of spaced apart radially disposed holding means, said holding means being equally spaced around the entire circumference of the turret, each adapted to receive a half peach when severed, means for simultaneously conveying the two halves of each such severed whole peach in parallel paths with their cut faces parallel and confronting while maintaining the longitudinal pit axes of the half peaches in horizontal position and radially of said turrets, means for shifting said halves out of their former position simultaneously to deposit one of said half peaches in each of two adjacent ones of said radially extending holding means of the second turret with the cut faces of each half peach uppermost and lying in a substantially common plane, and with the longitudinal pit axis intersecting, peeling and pitting means each operable about an axis substantially parallel to the longitudinal axis of the pit of one of said half peaches for peeling and pitting the half peach in one of said holding means during the rest period of the second turret, said peeling means leaving the severed peeling in the holder with the peeled half peach resting thereon, pitting means operably associated with said turret and adapted to operate upon the peeled half fruit held in said holder during a rest period of the turret, said pitting means being shiftably operable about an axis parallel to the longitudinal axis of the pit, fruit discharge mechanism shiftable relatively to the turret and adapted to be actuated into contact with the peeled and pitted half peach during a rest period of the turret for discharging said half peach from the fruit holder leaving the peeling in the fruit holder, scavenging means associated with said second turret and adapted to sweep through the fruit holder containing the peeling to discharge the same therefrom, and mechanism for actuating said turrets, said fruit dividing and transfer means, said peeling, pitting, discharging and scavenging means in synchronized relation.

4. In combination, means providing an intermittently rotatable turret having a plurality of spaced apart cups adapted to receive and hold a half fruit with its cut face uppermost, means associated with and acting in synchronism with the movements of the turret for depositing simultaneously two severed halves of a whole peach into spaced cups of said turret, each half peach being cut on a plane substantially through and parallel to the maximum diameter of the half pit, means for shifting the turret to a peeling station, means at the peeling station for peeling the half peach during a pause in the intermittent movement of the turret, leaving the peeling therein and underlying the half peach, said turret shifting means thereafter intermittently shifting the turret to a pitting station, means at said station for pitting the half pit from the half peach during a pause in the intermittent movement of the turret, means thereafter shifting the turret and the pitted and peeled half peach to a discharge station, and means disposed at the discharge station and shiftable into contact with the cut face of the peeled and pitted half peach for inverting the half peach and for discharging it from the cup.

5. In a peach pitting machine, the combination of means providing a rotating turret having a pluraltiy of spaced apart cups for receiving and holding in each a pitted half peach with the peeling severed therefrom and loosely underlying the half peach, and means providing a half peach discharge station including mechanism for bodily discharging the half peach from its cup while maintaining the cup in normal horizontal position, including means for retaining the peel in said cup while the half peach is being discharged from the cup, and means for thereafter scavenging the loose peeling from the cup.

6. In a peel scavenging device, the combination of means providing a cup adapted to hold a loose peeling, scavenging means therefor which comprises a driving shaft, means to turn said shaft approximately 148 degrees, said shaft having a driving collar pinned thereto and a toothed sector pinned thereto, a bearing loose in said shaft between said collar and sector and forming a bearing for a cross shaft, a scavenging device on said cross shaft adapted to operate in said cup to discharge contents from said cup, a pinion on said cross shaft meshing with the teeth of said sector, a friction band surrounding said bearing and resiliently and frictionally clamped to said bearing, means for rotating said friction band with said driving shaft, frictionally to rotate said bearing with said shaft, said bearing having a stop shoulder formed thereon, a stationarily mounted stop member adjustably positioned in the path of movement of the stop on said bearing, said stationary stop member being constructed and arranged to limit the turning of the bearing with said driving shaft approximately 99 degrees, said friction band permitting the independent rotation of the scavenging device after turning movement of said bearing has been stopped.

7. In an automatic machine for treating peaches, the combination of an intermittently rotatable turret having spaced means for receiving and holding a succession of whole peaches each with the plane of the maximum diameter of its pit disposed parallel to the plane of action of the pit severing means, means operable while said turret is at rest for severing the flesh and pit of the peach into halves along a plane parallel to the plane of maximum diameter of the pit, a second intermittently operable turret having a plurality of spaced apart radially disposed holding means each adapted to receive a half peach, said holding means being equally spaced around the entire circumference of the turret, means for simultaneously conveying the two halves of each such severed whole peach in parallel paths while maintaining the halves in the same predetermined position they formerly occupied prior to severance, means for bodily shifting said halves out of their former position and for depositing one of said half peaches in each of two adjacent holding means of said radially extending holding means of the second turret with the cut faces of the half peaches uppermost and lying in substantially a common plane and with the longer or stem axes of the half pits intersecting, movable peeling means operably related to said turret and adapted to peel the half fruit while held in the holding means while said turret is at rest, the axis of movement of the peeling means being parallel to the longitudinal axis of the pit, pitting means operably related to said turret and adapted to pit the half peach while held in said holding means and while the turret is at rest, the axis of movement of the pitting means being parallel to the longitudinal axis of the pit.

8. In an automatic machine for treating peaches, the combination of an intermittently rotatable turret having spaced means for receiving and holding a succession of whole peaches, each with its plane of maximum diameter disposed vertically and centrally of the holding means and with the longitudinal pit axis of the peach disposed horizontally and radially of said turret, means for severing the flesh of the peach and pit along the plane of maximum diameter of the peach, a second intermittently operable turret having a plurality of spaced apart radially disposed holding means, said holding means being equally spaced around the entire circumference of the turret, each adapted to receive a half peach when severed, means for simultaneously conveying the two halves of each such severed whole peach in parallel paths while maintaining the longitudinal pit axes of the half peaches in horizontal position and radially of said turrets, means for shifting said halves out of their former position and for depositing one of said half peaches in each of two adjacent radially extending holding means of the second turret with the cut face of each half peach uppermost, and with the longitudinal pit axis extending radially of said second turret, peeling means operable about an axis substantially parallel to the longitudinal axis of the pit for peeling the half peach in one of said holding means during the rest period of the second turret, said peeling means leaving the severed peeling in the holder with the peeled half peach resting thereon.

9. In a fruit processing apparatus, the combination of a shiftable cup-like holder adapted to hold a halved peach of a diameter generally corresponding to the size of the holder, the rim of the cup-like holder being below the upper cut face of the held peach whereby the peach projects beyond the upper plane of the rim of the holder, means forming peach peeling and pitting stations, said stations being associated with the path of movement of the holder whereby said holder sequentially registers with said peeling and pitting stations, peeling means at said peeling station adapted to be brought into juxtaposition to the holder when in registration with the peeling station, said peeling means including a knife adapted arcuately to move through the flesh of the half fruit just beneath the peel starting at the cut face of the half fruit at one side of the pit section and emerging from the flesh of the half fruit at the opposite side thereof and means shiftable relatively to the holder for reenforcing that edge of the rim of the cup-like holder at which the peeling blade emerges from the flesh of the half fruit, said reenforcing means being shiftable away from the rim or edge of the holder after the peeling operation to permit movement of the holder away from the peeling station and cooperative peach holding means having substantially flat under surfaces adapted to be associated with the pitting means and shiftable into contact with the cut face of the half peach when the peach while supported in the holder is in registry with the pitting station, said fruit contacting surfaces being substantially spaced apart to provide an opening registering with the area about the pit of the half peach, and pit cutting means operable through said opening for removing the pit, means for thereafter shifting the pit cutting means and the contacting means away from the cut face of the half fruit and for thereafter shifting the holder containing the half fruit away from the pitting station.

10. In a fruit processing machine, the combination of a cup-shaped holder adapted to hold a half fruit with its cut face projecting above the rim of the cup-shaped holder, including means adapted firmly to contact the entire cut face of the half fruit except at a zone surrounding the pit at the cut face of the half fruit, pit cutting means adapted to be brought into contact with the cut face of the half fruit at said zone to pit the half fruit, means for relatively shifting the cup carrying the contained half fruit, and the pitting and fruit contacting means away from each other to permit movement of the cup and contained fruit away from the pitting means, and peeling means adapted to be brought into registration with the cup and contained half fruit, said peeling means including a blade adapted arcuately to cut through the flesh of the half fruit just beneath the peel, and means positioned at a portion of the rim of the cup-like holder during at least a portion of the peeling operation to provide a continuation of the inner wall surface of said cup whereby to reenforce and support the periphery of the half fruit at the mouth of the cup during a portion of the peeling operation and means for shifting the peeling means and said rim reenforcing means away from the cup after the peeling operation to permit the cup and peeled fruit to move away from said peeling means.

11. In a peel scavenging device the combination of means providing a cup adapted to hold a loose peeling, scavenging means therefor comprising an oscillatable shaft, a driving collar pinned on said shaft for oscillation therewith and having a driving lug, a bearing oscillatably mounted on said shaft and having a transversely disposed cross shaft bearing thereon, a cross shaft rotatably mounted in said cross shaft bearing, a scavenging blade mounted on said cross shaft and adapted to be placed into registration with the mouth of said cup upon rotation of said bearing, said bearing having a friction drum thereon, a friction clamp surrounding said drum and resiliently clamped thereabout, said clamp having means adapted to be driven by the driving lug of said collar whereby to oscillate said clamp with said shaft, a toothed sector rigidly mounted on said oscillatable shaft and a pinion rigidly mounted on said cross shaft and meshing with said sector, and stationary stop mechanism disposed in the path of said oscillatable bearing, said oscillatable bearing providing spaced stop mechanism adapted to contact the stationary stop mechanism to position the scavenging blade with respect to the mouth of the cup, said friction clamp on continued oscillation of said oscillatable shaft permitting the gear and pinion to rotate the cross shaft independently of the oscillatable bearing thereby to swing the scavenging blade through the peeling cup to scavenge the peeling therefrom.

12. In a device for processing half fruit, the combination of a support, a turret rotatable on said support, a plurality of half fruit holders mounted in uniformly spaced relation sixty degrees apart on said turret to move in a predetermined path on movement of the turret on said support, means for cutting a succession of whole fruits into halves and for thereafter simultaneously depositing said halves into adjacent fruit holders of the turret, means associated with said turret and adapted to be brought into simultaneous registration with the fruit halves of each of said whole fruits so cut for performing a peeling operation on one of said fruit halves while simultaneously performing a pitting operation on the other of said fruit halves while contained in said fruit holders, means on said support and associated with said turret and said fruit holders and adapted to be brought into registration with each half fruit while held in a fruit holder for thereafter discharging the peeled and pitted half fruit from said fruit holder leaving the peeling therein, and means associated with said turret and adapted subsequently to be brought into registration with each fruit holder for scavenging the peeling from said fruit holder, and means for causing said pitting, peeling, discharging and scavenging mechanism to be operated in synchronism and simultaneously.

13. In a machine for treating half fruit, the combination of a support, a turret on said support, said turret carrying a succession of fruit holders disposed with their mouths in a common plane and arranged in uniformly spaced relation sixty degrees apart on said turret, means associated with said turret for supporting a whole fruit with its suture plane disposed transversely to the common plane of the mouths of said fruit holders of said turret, means for halving each whole fruit while so positioned, and means for thereafter swinging each half fruit substantially ninety degrees and for depositing said fruit halves into adjacent fruit holders of the turret with their cut faces exposed and in substantially the common plane of the mouths of said fruit holders and with the projections of the longitudinal stem axes of said half fruits angularly disposed and intersecting at angles of substantially sixty degrees.

14. In a device for treating fruit, the combination of a support, a turret mounted on said support and having a succession of half fruit holders mounted thereon in uniformly spaced relation of sixty degrees apart, the mouths of said fruit holders lying in a common plane, means associated with said turret for holding a whole fruit with its suture plane disposed transversely to the common plane of said fruit holders, means for halving the whole fruit while so positioned, means for thereafter swinging each half fruit substantially ninety degrees so that the fruit halves thereof are deposited into adjacent fruit holders of the turret so as to lie spaced apart with their cut faces exposed and in a substantially common plane and with the projections of their longitudinal stem axes intersecting at an angle of substantially sixty degrees, and means associated with said turret for forming an arcuate cut through the flesh of one of the half fruits while so positioned, said arcuate cut being formed about an axis substantially parallel to the longitudinal stem axis of said half fruit while maintained substantially in said common plane.

15. In a device of the class described, the combination of means forming a support, a turret mounted on said support, a plurality of fruit holders spaced thereon at a uniform angle of sixty degrees apart and with the mouths of said fruit holders disposed in a substantially common plane, means for supporting the whole fruit with its suture plane disposed transverse to said common plane, means for halving the whole fruit while so positioned along a line parallel to and substantially close to said suture plane, means for thereafter swinging each half fruit substantially ninety degrees and for depositing each half fruit into adjacent fruit holders of the turret so that the cut faces of the half fruits are exposed and lie in a substantially common plane with the projections of their longitudinal stem axes intersecting at an angle of substantially sixty degrees, and means for simultaneously forming arcuate cuts through the flesh of two adjacent half fruits while said half fruits are so positioned, said arcuate cuts being formed about axes substantially parallel to the longitudinal stem axes of said half fruits.

16. In a device of the class described, the combination of means forming a support, a turret mounted on said support, a plurality of fruit holders spaced thereon at a uniform angle of sixty degrees apart and with the mouths of said fruit holders disposed in a substantially common plane, means for supporting the whole fruit with its suture plane disposed transverse to said common plane, means for halving the whole fruit while so positioned along a line parallel to and substantially close to said suture plane, means for thereafter swinging each half fruit substantially ninety degrees and for depositing each half fruit into adjacent fruit holders of the turret so that the cut faces of the half fruits are exposed and lie in a substantially common plane with the projections of their longitudinal stem axes intersecting at an angle of substantially sixty degrees, and means for forming arcuate cuts through each of the adjacent half fruits while so positioned, one of the arcuate cuts so formed being about the longitudinal axis of one of said adjacent half fruits and the other arcuate cut being formed about an axis parallel to and relatively close to the longitudinal stem axis of the half fruit.

17. In a device of the class described, the combination of means forming a support, a turret mounted on said support, a plurality of fruit holders spaced thereon at a uniform angle of sixty degrees apart and with the mouths of said fruit holders disposed in a substantially common plane, means for supporting the whole fruit with its suture plane disposed transverse to said common plane, means for halving the whole fruit while so positioned along a line parallel to and substantially close to said suture plane, means for thereafter swinging each half fruit substantially ninety degrees and for depositing each half fruit into adjacent fruit holders of the turret so that the cut faces of the half fruits are exposed and lie in a substantially common plane with the projections of their longitudinal stem axes intersecting at an angle of substantially sixty degrees, and means for simultaneously forming arcuate cuts through the flesh of the two adjacent half fruits while held in their fruit holders, said arcuate cuts being formed with varying radii and about respective axes substantially coinciding with the stem axes of the two severed half fruits so positioned, whereby to peel one of the half fruits while pitting the other half fruit.

18. In a device of the class described, the combination of means forming a support, a turret mounted on said support, a plurality of fruit holders spaced thereon at a uniform angle of sixty degrees apart and with the mouths of said fruit holders disposed in a substantially common plane, means for supporting the whole fruit with its suture plane disposed transverse to said common plane, means for halving the whole fruit while so positioned along a line parallel to and substantially close to said suture plane, means for thereafter swinging each half fruit substantially ninety degrees and for depositing each half fruit into adjacent fruit holders of the turret so that the cut faces of the half fruits are exposed and lie in a substantially common plane with the projections of their longitudinal stem axes intersecting at an angle of substantially sixty degrees, and means for forming arcuate cuts through the flesh of adjacent half fruits about axes lying parallel to the longitudinal stem axes of the adjacent half fruits, whereby simultaneously to pit one of said half fruits and to peel the other of said half fruits while so positioned.

19. In an apparatus of the class described, the combination of means forming a support, a turret rotatable on said support and carrying a sequence of fruit holders uniformly spaced thereon sixty degrees apart and each adapted to receive a half fruit so that the cut faces of the half fruit when deposited therein lie in substantially a common plane, means for positioning a succession of whole fruits with relation to said turret and with their successive suture planes parallel to a plane transverse to said common plane, means for successively halving each whole fruit while so positioned, means for thereafter swinging the first and second halves of each whole fruit substantially ninety degrees and for successively depositing the said fruit halves into adjacent fruit holders of the turret, whereby said fruit holders of the turret are successively filled each with half fruits the cut faces of all of which lie in substantially a common plane and with the projections of their longitudinal stem axes intersecting at an angle of substantially sixty degrees, means forming an arcuate cut through the flesh of only the first half fruit so deposited, such cut being formed about an axis coinciding with the longitudinal stem axis of such half fruit whereby to pit the half fruit, means for thereafter moving the two half fruits, while maintained in such position in said common plane, substantially sixty degrees, whereby the next adjacent empty fruit holders of the turret receive two additional cut half fruits, means for operating the arcuate cutter first mentioned through the flesh of the second half of the first pair of fruit halves first deposited in the fruit holders, said arcuate cut being formed about the longitudinal stem axis of said half fruit, whereby to pit the half fruit and for simultaneously forming a second arcuate cut through the first deposited adjacent pair of half fruits while in said cups and forming a peeling cut just beneath the skin of said half fruit, said arcuate cut being formed about the longitudinal stem axis of said half fruit, said peeling and pitting mechanism thereafter simultaneously operating on the next adjacent half fruits whereby said succession of half fruits lying in their holders and carried by the turret are individually and sequentially peeled and pitted.

20. In a machine for treating half fruit, in combination with a support, a turret on said support, said turret carrying a succession of fruit holders disposed with their mouths in a common plane and equally spaced at a uniform angle about the axis of said turret, means associated with the turret for supporting two fruit halves with their cut faces in confronting relation and disposed transversely to the common plane of the mouths of the fruit holders of the turret, and means for thereafter swinging each half fruit substantially ninety degrees and for depositing each fruit half into adjacent fruit holders of the turret with their cut faces exposed and in substantially the common plane of the mouths of said fruit holders and with the projections of the longitudinal stem axes of said fruit halves angularly disposed and intersecting the same angles as the uniform angle of spacing of said cups.

21. In a device of the class described, the combination of means forming a support, a turret mounted on said support, a plurality of fruit holders equally spaced thereon at a uniform angle and with the mouths of said fruit holders disposed in a substantially common plane, fruit feeding means including means for supporting two fruit halves with their cut faces substantially contiguous and confronting and disposed transversely to said common plane, the fruit halves having been cut along a plane parallel to and substantially close to the suture plane of the fruit, means for thereafter swinging each half fruit substantially ninety degrees and for depositing each half fruit into adjacent fruit holders of the turret so that the cut faces of the half fruits are exposed and lie in a substantially common plane with the projections of their longitudinal stem axes intersecting at the same angle as said uniform angle of spacing of said holders, and means for forming arcuate cuts through each of the adjacent half fruits while so positioned, one of the arcuate cuts so formed being about the longitudinal axis of one of said adjacent half fruits and the other arcuate cut being formed about an axis parallel to and relatively close to the longitudinal stem axis of the half fruit.

RAYMOND L. EWALD.
HENRY A. SKOG.